(12) United States Patent
Ziemer et al.

(10) Patent No.: US 7,108,628 B2
(45) Date of Patent: Sep. 19, 2006

(54) MULTI-STAGE TRANSMISSION

(75) Inventors: Peter Ziemer, Tettnang (DE); Peter Tiesler, Meckenbeuren (DE); Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 182 days.

(21) Appl. No.: 10/514,086

(22) PCT Filed: May 2, 2003

(86) PCT No.: PCT/EP03/04649

§ 371 (c)(1),
(2), (4) Date: Nov. 10, 2004

(87) PCT Pub. No.: WO03/095865

PCT Pub. Date: Nov. 20, 2003

(65) Prior Publication Data

US 2005/0202927 A1 Sep. 15, 2005

(30) Foreign Application Priority Data

May 11, 2002 (DE) ................................ 102 21 095

(51) Int. Cl.
*F16H 3/62* (2006.01)
(52) U.S. Cl. ..................................... 475/278
(58) Field of Classification Search ................ 475/275, 475/277, 278
See application file for complete search history.

(56) References Cited

U.S. PATENT DOCUMENTS

| | | | |
|---|---|---|---|
| 3,941,013 A | 3/1976 | Miller | |
| 5,106,352 A | 4/1992 | Lepelletier | |
| 6,634,980 B1 * | 10/2003 | Ziemer | 475/275 |
| 6,723,018 B1 | 4/2004 | Hayabuchi et al. | |
| 6,802,795 B1 * | 10/2004 | Miyazaki et al. | 475/275 |
| 6,860,831 B1 * | 3/2005 | Ziemer | 475/296 |
| 6,991,578 B1 * | 1/2006 | Ziemer | 475/296 |

(Continued)

FOREIGN PATENT DOCUMENTS

DE 101 15 983 A1 10/2002

(Continued)

OTHER PUBLICATIONS

Tenberge, Prof. Dr. P., "Automatikgetriebe mit Esprit", VDI-Berichte, Nr. 1610, Jun. 20, 2001, pp. 455-479.

*Primary Examiner*—Dirk Wright
(74) *Attorney, Agent, or Firm*—Davis & Bujold, P.L.L.C.

(57) ABSTRACT

A multistage transmission with a drive shaft (3) is connected with a shiftable primary planetary gear set (10), having an output shaft (4), connected with a shiftable principal planetary gear set (20) and being provided with a plurality of shifting elements (A to F), via selective closings of at least six forward gear stages, without group shifting, can be attained. One output element of the primary planetary gear set (10), via a first shifting element (A), can be connected with a first input element of the principal planetary gear set (20) and via a second shifting element (B) can be connected with a second input element of the principal planetary gear set (20). The input drive shaft (3) is, via a fifth shifting element (E), connectable with a third input element of the principal planetary gear set (20). Advantageously, a sun gear (11) of the primary planetary gear set (10) is fixed in location, via a sixth shiftable element placed on that side of the primary planetary gear set (10) which is remote from the principal planetary gear set (20). The primary planetary gear set (10) is designed as a plus-transmission with inner and outer planet gears (12, 13), the spiders thereof being bound together.

72 Claims, 35 Drawing Sheets

U.S. PATENT DOCUMENTS

| | | | |
|---|---|---|---|
| 7,018,319 B1 * | 3/2006 | Ziemer | 475/296 |
| 2004/0097324 A1 | 5/2004 | Ziemer | |
| 2004/0116238 A1 | 6/2004 | Ziemer | |

FOREIGN PATENT DOCUMENTS

| | | |
|---|---|---|
| DE | 101 15 987 A1 | 10/2002 |
| EP | 0 962 680 A2 | 8/1999 |
| EP | 0 984 203 A2 | 3/2000 |
| JP | 2000-55152 | 2/2000 |
| JP | 2001-182785 | 7/2001 |
| JP | 2001-349390 | 12/2001 |
| JP | 2001-349391 | 12/2001 |

* cited by examiner

CLOSED SHIFTING ELEMENTS

| SPEED | CLUTCH | | | BRAKE | | | GEAR RATIO | STEP |
|---|---|---|---|---|---|---|---|---|
| | A | B | E | C | D | F | | |
| 1 | o | | | | o | o | 4.73 | |
| | | | | | | | | 1.70 |
| 2 | o | | | o | | o | 2.78 | |
| | | | | | | | | 1.51 |
| 3 | o | o | | | | o | 1.84 | |
| | | | | | | | | 1.51 |
| 4 | o | | o | | | o | 1.22 | |
| | | | | | | | | 1.22 |
| 5 | o | o | o | | | | 1.00 | |
| | | | | | | | | 1.22 |
| 6 | | o | o | | | o | 0.82 | |
| | | | | | | | | 1.21 |
| 7 | | | o | o | | (o) | 0.68 | |
| | | | | | | | | TOTAL |
| R | | o | | | o | o | −3.83 | 7.00 |

STATIONARY GEAR RATIO $i_{ORS1} = +2.19$
$i_{ORS2} = +2.57$
$i_{ORS3} = -2.08$

Fig. 2A

CLOSED SHIFTING ELEMENTS

| SPEED | CLUTCH | | | BRAKE | | | GEAR RATIO | STEP |
|---|---|---|---|---|---|---|---|---|
| | A | B | E | C | D | F | | |
| 1 | o | | | | o | o | 4.73 | |
| | | | | | | | | 1.70 |
| 2 | o | | | o | | o | 2.78 | |
| | | | | | | | | 1.51 |
| 3 | o | o | | | | o | 1.84 | |
| | | | | | | | | 1.51 |
| 4 | o | | o | | | o | 1.22 | |
| | | | | | | | | 1.49 |
| 5 | | o | o | | | o | 0.82 | |
| | | | | | | | | 1.21 |
| 6 | | | o | o | | (o) | 0.68 | |
| | | | | | | | | TOTAL |
| R | | o | | | o | o | −3.83 | 7.00 |

STATIONARY GEAR RATIO $i_{ORS1} = +2.19$
$i_{ORS2} = +2.57$
$i_{ORS3} = -2.08$

Fig. 2B

CLOSED SHIFTING ELEMENTS

| SPEED | CLUTCH | | | BRAKE | | | GEAR RATIO | STEP |
|---|---|---|---|---|---|---|---|---|
| | A | B | E | C | D | F | | |
| 1 | o | | | | o | o | 6.03 | |
| 2 | o | | | o | | o | 3.39 | 1.78 |
| 3 | o | o | | | | o | 2.20 | 1.54 |
| 4 | o | | o | | | o | 1.25 | 1.76 |
| 5 | o | o | o | | | | 1.00 | 1.25 |
| 6 | | o | o | | | o | 0.80 | 1.24 |
| 7 | | | o | o | | (o) | 0.69 | 1.16 |
| R | | o | | | o | o | −4.91 | TOTAL 8.70 |

Stationary Gear Ratio $i_{ORS1}$ = +2.20
$i_{ORS2}$ = +2.74
$i_{ORS3}$ = −2.23

Fig. 35

MULTI-STAGE TRANSMISSION

This application is a national stage completion of PCT/EP03/04649 filed May 2, 2003 which claims priority from German Application Ser. No. 102 21 095.0 filed May 11, 2002.

FIELD OF THE INVENTION

The present invention concerns a multistage transmission.

BACKGROUND OF THE INVENTION

In U.S. Pat. No. 5,106,352 A, there is made known a plurality of schematic drawings and descriptions for automatic transmissions with one non-shiftable primary gear set followed by one after gear set, with which, by selective closure of five shifting elements, six forward gear stages can be achieved without group shifting. The after gear set is designed as a shiftable two-spider, four shaft, gear train with two connected planetary gear sets. The non-shiftable primary gear set can be built as a single spider planetary gear set or alternately as a forward power transmission means with two spur-gear pairs of differently determined ratios, which operate as a reducing gear train. One element of the primary gear set is bound securely to the transmission housing. The primary gear set is driven at the input speed of rotation of the transmission and produces a reduced output rotational speed. This reduced output rotational speed is transferred by two shifting elements to two different elements of the after gear set. Additionally, a third element of the after gear set can be directly driven by an additional clutch at the transmission input speed of rotation.

A six-gear stage automatic transmission 6HP26, which is derived by the applicant according to a concept from U.S. Pat. No. 5,106,352 A is described in, Prof. Dr. P. Tenberg: E-Automat—Automatic Transmission with Esprit, VDI Report No. 1610, 2001, pages 455 to 479. Relying on the basis of this report, Prof. Dr. Tenberg proposes to design the sun gear of the originally non shiftable, primary planetary gear set, to be actually shiftable by means of an additional brake. When this is accomplished, then, the now shiftable primary planetary gear set is designed, unchanged, as a so-called "minus-gearing", the internal gear of which is driven at the input drive shaft speed of rotation and the spider thereof forms its output element. In regard to the "minus transmission", what is to be understood is a simple planetary gear set with a negative fixed gear ratio. The ratio of the speeds of rotation of the internal gear and the sun gear, when the planet gear holder is fixed, is negative. The additional brake can be employed as an integral startup shifting element in the transmission. In accordance with corresponding toothing design, even seven forward stages can be provided, with a gear spread equivalent to that of a basic transmission, disadvantaged however, with an unfavorable succession of gear stages.

U.S. Pat. No. 3,941,013 A discloses a gear train schematic of an automatic transmission, with six forward stages. This transmission has one primary gear set designed as a single spider planetary gear set and one drive gear train consisting of two single spider planetary gear sets coupled together. Two of the three input elements of the second drive gear sets are, in this arrangement, connected together. The primary gear set is designed as a so-called "plus gear drive" with double planetary gear sets, the spiders of which are connected together and operate up to the sixth stage, in which it then revolves as a piece, serving as a reducing gear set. As far as "plus gear drive" is concerned, what is meant thereby is a simple planetary transmission with a positive fixed gear ratio. Further, the ratio of the speed of rotation of the internal gear and the sun gear is also positive during the imagined fixed spider. The sun gear of the primary gear is immobilized by means of a brake abutting the transmission housing. This brake is set spatially between the primary gear set and the after gear train. The primary gear set is driven at the speed of rotation of the input drive shaft by means of its coupled spider, its output drive is executed by means of the internal gear. The output speed of rotation of the following gear set can be transmitted by two clutches onto two different input elements of the following gear set, whereby these two different input elements of the following gear set, together with an additional clutch can be directly connected to run at the transmission input drive shaft speed of rotation. This additional clutch is placed on that side of the primary gear set which is remote from the subsequent gear set. Because of spatial positioning of the brake, by means of which the sun gear of the primary gear set is fixed, and the spatial placement of the clutch, by means of which the transmission input speed of rotation can transferred to the following gear set, a guide for input drive and output drive of the primary gearing is created. In this way, the torque of the primary gear set is directed outwardly and radially by its internal gear. That is to say, the drive of the primary gear set completely encompasses it. Further, the output drive of the primary gear set is directed centrally through the sun gear of the primary gear set to the input elements which are constructed as external disk carriers of the two clutches. The gear set concept of the U.S. Pat. No. 3,941,013 A additionally requires several group shiftings for the shifting of the six forward stages.

Thus, the purpose of the invention is to develop further, from the cited state of the technology, a multistage transmission, with at least six forward gear stages, without group shifting, wherein, one shifting element of the multistage transmission is to be an integrated startup shifting element, wherein the whole is made without excessive expense in construction, with a favorable stage succession, and an increased gear spread.

SUMMARY OF THE INVENTION

Using as a base, the generic state of the technology as set forth by Prof. Dr. P. Tenberge, the multistage transmission possesses a shiftable primary planetary gear set on a multi-membered, shiftable, principal planetary gear set, which, for example, is designed as a double spider, four shaft, planetary gear set. The principal planetary gear set encompasses at least three input elements, which are independent of one another. One input element of the principal planetary gear set can be connected to an input drive shaft of the transmission by means of a shifting element. The other two input elements of the principal planetary gear set are connectable respectively, to an output element of the primary planetary gear set by means of an additional shifting element.

Contrary to the state of the technology of the U.S. Pat. No. 3,941,013, the input element of the principal planetary gear set which is bound to the transmission input drive shaft, can never be connected to the output element of the primary planetary gear set.

Again, different from the generic transmission schematic as proposed by Prof. Dr. P. Tenberge, the primary planetary gear set is designed as a shiftable plus-gear set with positive fixed-gear ratio, with double planetary gears, the spiders of which are bound together. An element of the primary planetary gear set can be fixed in position by means of a brake or a shaft or hub assembly anchored to the transmission housing. The brake is advantageously on that side of the primary planetary gear set remote from the principal planetary gear set.

By means of a corresponding shifting logic of a total of six shifting elements, at least six forward gear stages can be achieved without group shifting. In the case of a change of stage from one gear position to the next successive, higher or lower gear, then by the immediately activated shifting element, respectively, only one shifting element is opened and another shifting element is closed.

The brake, by which the one element of the primary planetary gear set is made immobile, can be provided as a startup shifting element, whereby, advantageously, any additional startup element, for example, a hydrodynamic torque converter, would no longer be required. A placement of a brake of large diameter enables, in an advantageous manner, a high torque transmitting capability in spite of the need for restricted axial construction space. Obviously, it is possible, that the invented multistage transmission can nevertheless be combined with other, separate startup elements of optional types.

The design of the primary planetary gear set calls for a plus-gear set, and makes possible in an advantageous manner, a greater gear spread even with an unchanged, favorable succession of stages, this being an advantage which is contrary to the conventional state of the technology.

The spatial placement of the brake on that side of the primary planetary gear set which is remote from the principal planetary gear set, by means of which an element of the primary planetary gear set is made fast, gives rise to a constructive, simple and space-saving encapsulation of the components. A corresponding example is, that the rotating disk carrier of the brake can be rotationally carried on a projection of a transmission housing wall, which said projection could be preliminarily installed. In other words, the disk carrier is borne on a hub assembly which is already integral with the transmission housing wall. The pressure medium feed to the brake can, in a very simple way, be introduced through this said hub assembly or even be conducted in channels integrally within the housing wall.

A further essentially economic advantage, is the possibility of being able to make multiple use of many of the currently available manufactured apparatuses of a basic transmission upon which the invented development has been based. In addition, the invented changes concern only input side components of the transmission.

In one advantageous embodiment of the invention, the proposal has been made, to drive at the input shaft speed of rotation the primary planetary gear set by means of its coupled spider. At the same time the internal gear of the primary planetary gear set can be connected with the input elements of the two clutches, by means of which the output speed of rotation of the primary planetary gear set can be communicated to the principal planetary gear set. With this arrangement, the sun gear of the primary planetary gear set can be immobilized.

In another embodiment of the invention, the proposal is to drive the shiftable, primary, planetary gear set by its sun gear at the speed of rotation of the input shaft of the transmission and to connect the internal gear thereof, as an output element of the primary planetary gear set, with the input element of the two clutches, by which the output speed of rotation of the primary planetary gear set can be transmitted to the principal planetary gear set. With this arrangement, the coupled spiders of the primary planetary gear set can be made immovable.

The principal planetary gear set can, for example, be designed as a Ravigneaux gear set, which is a well known, very compact form of a two spider, four shaft gear set. Obviously, the primary planetary gear set, which is designed as a plus-gear set, can be placed in combination with other planetary gear set assemblies, which at least possess three input elements which are not coupled together.

BRIEF DESCRIPTION OF THE DRAWING

The invention will now be described, by way of example, with reference to the accompanying drawings in which:

FIGS. 2a and 2b show two shifting schematics of the transmission in accordance with FIG. 1;

FIG. 35 is a schematic view of the transmission in accordance with FIG. 34.

DETAILED DESCRIPTION OF THE INVENTION

In all the Figures, the reference numbers of comparative components are used in the same manner. FIGS. 1 to 33 treat the original, invented primary planetary gear set variant, by means of which, the primary planetary gear set is driven by its coupled spider, and its internal gear can be connected to the principal planetary gear set and the sun gear of the primary planetary gear set remains still.

Figure 1:
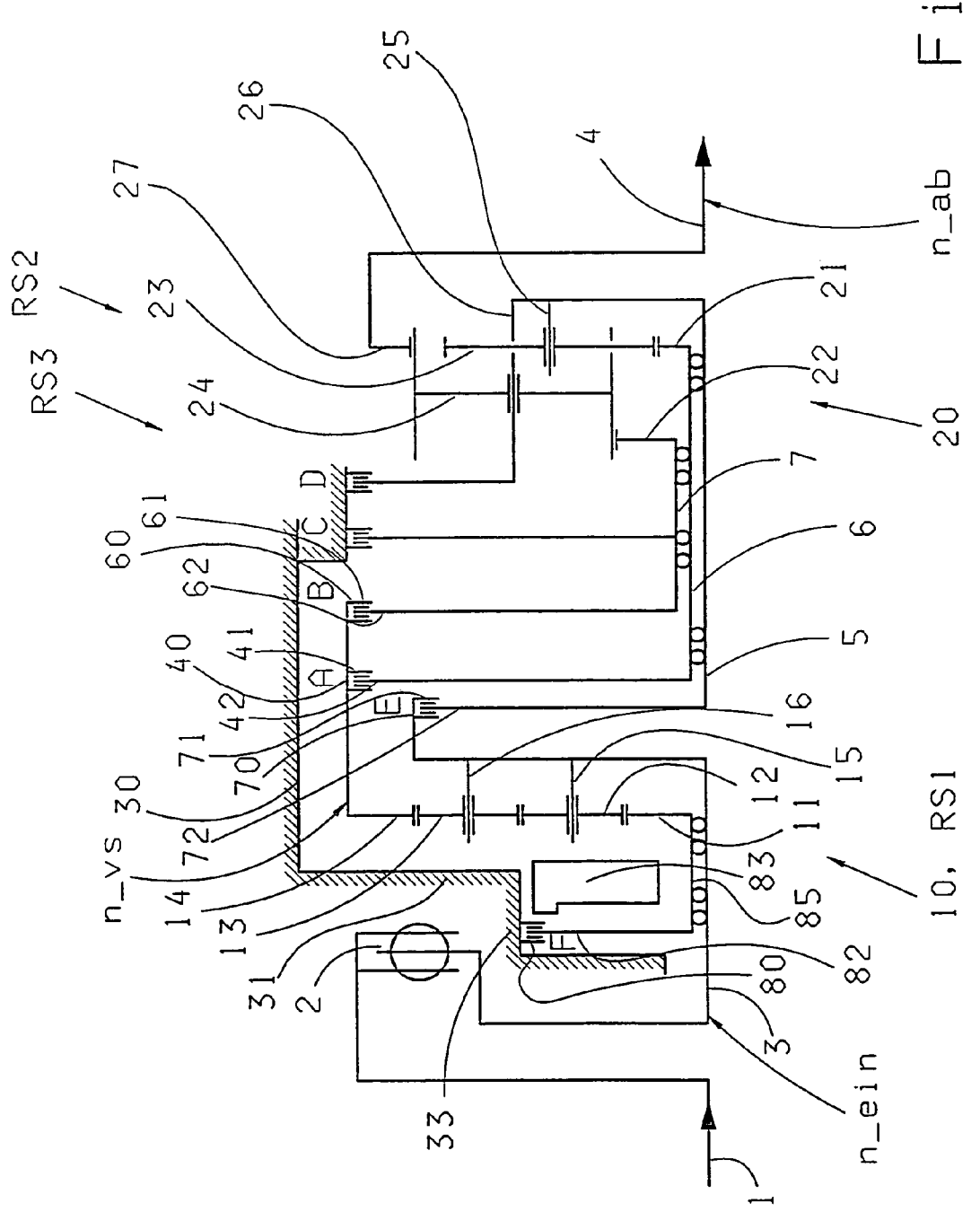
FIG. 1 is an exemplary schematic view of a transmission of a primary planetary gear set variant.

FIG. 1 now shows an exemplary transmission scheme of the first invented, primary planetary gear set variant. The motor driven shaft 1 is designated with the reference number 1, the motor being, for example, an internal combustion engine. The subject multistage transmission is driven by being coupled to this motor and said motor shaft 1. On the grounds of vibratory interference, this coupling is, in detail, between the motor shaft 1 and a conventional torsion damper 2, with the interpositioning therebetween of an input drive shaft 3 rotating at the input speed $n_{ein}$. As an alternate, the torsion damper 2 can also be replaced, for example, by a double mass flywheel. A rotating output drive shaft of the transmission, which rotates at a transmission output speed of rotation, namely $n_{ab}$, has the reference number 4. The transmission encompasses a primary planetary gear set, which, in accordance with the invention, serves as a plus-transmission with a positive fixed-gear set as well as a shiftable principal planetary gear set 20, which, for example is designed as a two spider, four shaft gear set made in the Ravigneaux style. There are, all together, six shifting elements A to F.

The primary planetary gear set 10, which is also designated as RS1, includes a sun gear 11, inner and outer planet gears 12 and 13, as well as an internal gear 14. A spider 15 of the inner planet gear 12 and a spider 16 of the outer planet gear 13 are bound together. The driving shaft 3 is bound to these coupled spiders 15, 16, which can be spatially seen on the side of the primary planetary gear set 10 which is remote from the motor shaft 1 and therefore also remote from the motor. The internal gear 14 forms the output element of the primary planetary gear set 10. The sun gear 11 is made motionless, by means of a sixth shifting element F, which is designed as a brake and which brake can abut against a transmission wall.

The principal planetary gear set 20 encompasses two gear sets RS2 and RS3. The small sun gear 21 and the forward planet gears 23 are assigned to the gear set RS2. The large sun gear 22 and the principal planetary gears 20 are assigned to the gear set 24. A common internal gear is designated 27. A spider 25 of the forward planet gears 23 and spider 26 of the after planet gears 24 are rigidly connected together. The internal gear 27 is bound to the output shaft 4. The coupled spiders 25, 26 are, first, affixed to a third shaft 5 and by means of this third shaft 5 and the fifth shifting element E, which serves as a clutch, can be connected to the input drive shaft 3 and second, the spiders are affixed by means of the fourth shifting element D, serving as brake and which can immovably abut the housing 30 of the transmission. The small sun gear 21 of the principal planetary gear set 20 is connected to a first sun shaft 6 and the first shifting element A, which is designed as a clutch, can be affixed to the internal gear 14 of the primary planetary gear set 10. the large sun gear 22 of the principal planetary gear set 20 is first connected with a second sun shaft 7 and, by means of the second shaft 7 and the second shifting element B, serving as a clutch, can be affixed to the internal gear 14 of the primary planetary gear set 10, and second, the shifting element C, which is designed as a brake, can be affixed to the transmission housing 30.

The design in FIG. 1 of the principal planetary gear 20 as a Ravigneaux gear set is to be regarded as an example. The following gear set can also be constructed from other combinations of individual planetary gear sets. The essential point is, that an output speed of rotation $n_{vs}$ of the primary planetary gear set 10, can be transmitted by means of two shifting elements (here, these being clutches A and B) onto two different, input elements, which are not bound together, of the principal planetary gear set, and that the transmission input speed of rotation $n_{ein}$, by means of an additional shifting element (here, clutch E) can be transferred to a third free input element of the principal planetary gear set. The coaxial arrangement of input drive, primary planetary gear set and the principal planetary gear set is to be regarded, likewise, as exemplary. Obviously, the invented multistage transmission can also possess a spur gearing between the output element of the principal planetary gear set and the output shaft 4, and/or possess an angular or parallel axis connection between the forward and the principal planetary gear sets.

Likewise, to be regarded as exemplary, is the design of the brakes C and D, shown in FIG. 1 and following figures, as disk brakes. Obviously it is possible that the brake C and/or the brake D can also be made as band brakes, with the thereto attributable advantage of a very small, radial space requirement.

In the proposed embodiment example as shown in FIG. 1, the sixth shifting element F is spatially located between a (not shown) motor and the primary planetary gear set 10. This element F is further bordering, motor sided, on the torsion damper 2, and on the transmission side, proximal to the primary planetary gear set 10. The shifting elements A to E are spatially placed between the primary planetary gear set 10 and the principal planetary gear set 20. Under these circumstances, the clutch E borders directly against the primary planetary gear set 10. The coupled spiders 15, 16 of the primary planetary gear set 10 are bound to an outer disk carrier 70 of the clutch E. The disks 71 of the clutch E, in this illustrated example, are first, arranged to be of the same diameter as that of the internal gear 14 of the primary planetary gear set 10, and second, to be restricted to a smaller diameter than that of the disks 41 of clutch A, which lie in the direction of the principal planetary gear set 20 and proximal to the clutch E. The output drive of the primary planetary gear set 10 is to be seen being conducted radially above the clutch E to an outer disk carrier 40 of the clutch A. The outer disk carrier 40 of the clutch A, in turn, is bound to an outer disk carrier 60 of the clutch B, the disks 61 of which, seen in the direction of the principal planetary gear set 20 connect directly with the disks 41 of the clutch A.

The placement of the clutch E radially below the clutches A, B enables both a savings in length of construction of the clutch E with the least possible number of disks, while maintaining assured transmission capability of the drive torque introduced by the motor shaft 1, as well as a length-saving design of the clutches A, B, along with, again, the least possible number of disks with maintaining an assured transmission capability of the augmented (in most transmissions) input drive torque transferred by the primary planetary gear set 10. The design of the input elements of both clutches A and B as outer disk carriers 40, 60 permits an advantageously simple construction of a common component. The placement of the brakes C and D, which connect themselves in the direction of the clutch B, when considered in relation to the previously described placement of the clutches A, B and E gives rise, all in all, to a very compact, length-sparing construction of the transmission.

The inner disk carriers 72, 42 and 62 of the clutches E, A, and B are, respectively, directed centrally inward, whereby in the inner disk carrier 72 of the clutch E becomes bound to the third shaft 5 which runs centrally in the middle of the transmission. The inner disk carrier 42 of the clutch A is bound to the first sun gear shaft 6, which runs radially above the third shaft 5. The inner disk carrier 62 of the clutch B is bound to the third sun shaft 7, which runs radially above the first sun gear shaft 6. The third shaft 5 and the two sun gears 6, 7, are also coaxial with one another and are placed directly above each other. In the illustrated embodiment, the gears 6, 7 are also coaxial with input drive shaft 3 and output drive shaft 4. The third shaft 5 is bound to the coupled spiders 25, 26 of the principal planetary gear set 20, which is of the Ravigneaux design, serving as the third input element thereof. This connection is made on that side of the principal planetary gear set 20, which is remote from the primary planetary gear set 10. In this case, the third shaft 5 is conducted centrally and penetratively through the principal planetary gear set 20. The large sun gear 22 of the principal planetary gear set 20 is on that side of the principal planetary gear set 20 which is proximal to the primary planetary gear set 10 and—as a second input element of the principal planetary gear set 20—is bound with the second sun shaft 7. The first sun shaft 6 is coaxial with the third shaft 5, and centrally within the principal planetary gear set 20 up to its small sun gear 21, and bound to this said sun gear 21, serving as a first input element of the principal planetary gear set 20.

The spatial placement of the brake F on that side of the primary planetary gear set 10 which is remote from the principal planetary gear set 20, enables, in an advantageous manner, a constructively simple and space saving encapsulation of additional elements which allow the sixth gear stage, as compared to a basic transmission, to possess only five shifting elements. In the presented embodiment example, an outer disk carrier 80 of the clutch F affixes itself in or on an axial projection 33 integral with a transmission wall 31. The axial projection can also be constructed as a separate component, which is then securely bound to the transmission housing wall 31, i.e., to the transmission housing 30. An inner disk carrier 82 of the brake F extends itself radially in the direction of the input drive shaft 3 up to a sun gear 85 of the primary planetary gear set 10, which said gear set is bearingly carried on the input drive shaft 3 and is connected, by means of the inner disk carrier 82 with the sun gear 11 of the primary planetary gear set 10. In another embodiment, of the placement of the rotating inner disk carrier 82, it is possible make a provision, that this finds its rotational bearing directly on a projection 33 from the transmission housing wall 31, that is to say, to be situated on a hub assembly protruding from the wall. In the depicted example, is shown a servo apparatus 83 for the activation of the brake F, spatially located between the inner disc carrier 82 and the sun gear 11, i.e., the inner planet gear 12 of the primary planetary gear set 10. The feed of pressurized medium to the servo apparatus 83 of the brake F can, in a simple way, be integrated into the projection, i.e., hub assembly, 33 or else be placed directly in the transmission housing wall 31.

The placement of the brake F on a relatively small diameter, requires for torque transfer-capability a relatively large number of disks and therewith a relative lengthily constructed assembly of the brake F. However, in an advantageous manner, the torsion damper 2 is located above the cylindrical projection 33 of the housing wall 31, thus also being above the brake F and in this way the available constructive space underneath the torsion damper 2 is put to an advantageous use.

An input speed of rotation $n_{ein}$ of the input drive shaft 3, by means of selective closing of the shifting elements A to F is so transmitted by means of a drive shaft 4, wherein shaft 4 has a speed of rotation of $n_{ab}$, that at least six forward gear stages are acquired, without a group shift. That is to say, that in the case of a shift change from an existing gear stage into a successively following higher gear stage, or into the successively next following lower gear stage, respectively, thus only one shifting element need be opened and another shifting element need be closed. In FIG. 2A is to be found a first shifting logic of the multistage transmission in accordance with FIG. 1, with, in total, seven forward gear stages, as well as the thereto belonging ratios, gear stages and total gear spread. Likewise presented are the stationary ratios of the individual gear sets RS1, RS2, RS3. Advantageously compared to the Tenberge-proposed seven-stage-transmission, especially, the spread is clearly increased. Thereby the attained stage stepping is in harmony. The spread of the gear stages from the first into the second gear is, conversely to that of the Tenberge proposed seven-stage-transmission, is not as large, and thereby, also more effective. The fifth stage is optimally designed in efficiency level as a direct gear stage.

By means of a simple omission of the direct gear stage, it is possible to operate the multistage transmission of FIG. 1 also as an advantageously stepped six-stage-transmission. In FIG. 2B the corresponding second shifting logic is shown in a table, as well as thereto corresponding ratio and gear stage steps and—as compared to the first logic of FIG. 2A, the spread is unchanged.

As may be inferred from the shift logic in FIG. 2A as well as 2B, the brake F can be provided as a startup element of the multistage transmission. The reason for this is, that the brake F is in engagement with the relevant gears for startup in both travel directions, i.e., forward gear first to fourth, as well as reverse gear. In this way, an additional startup element, for instance, a torque converter can be eliminated.

Figure 3:
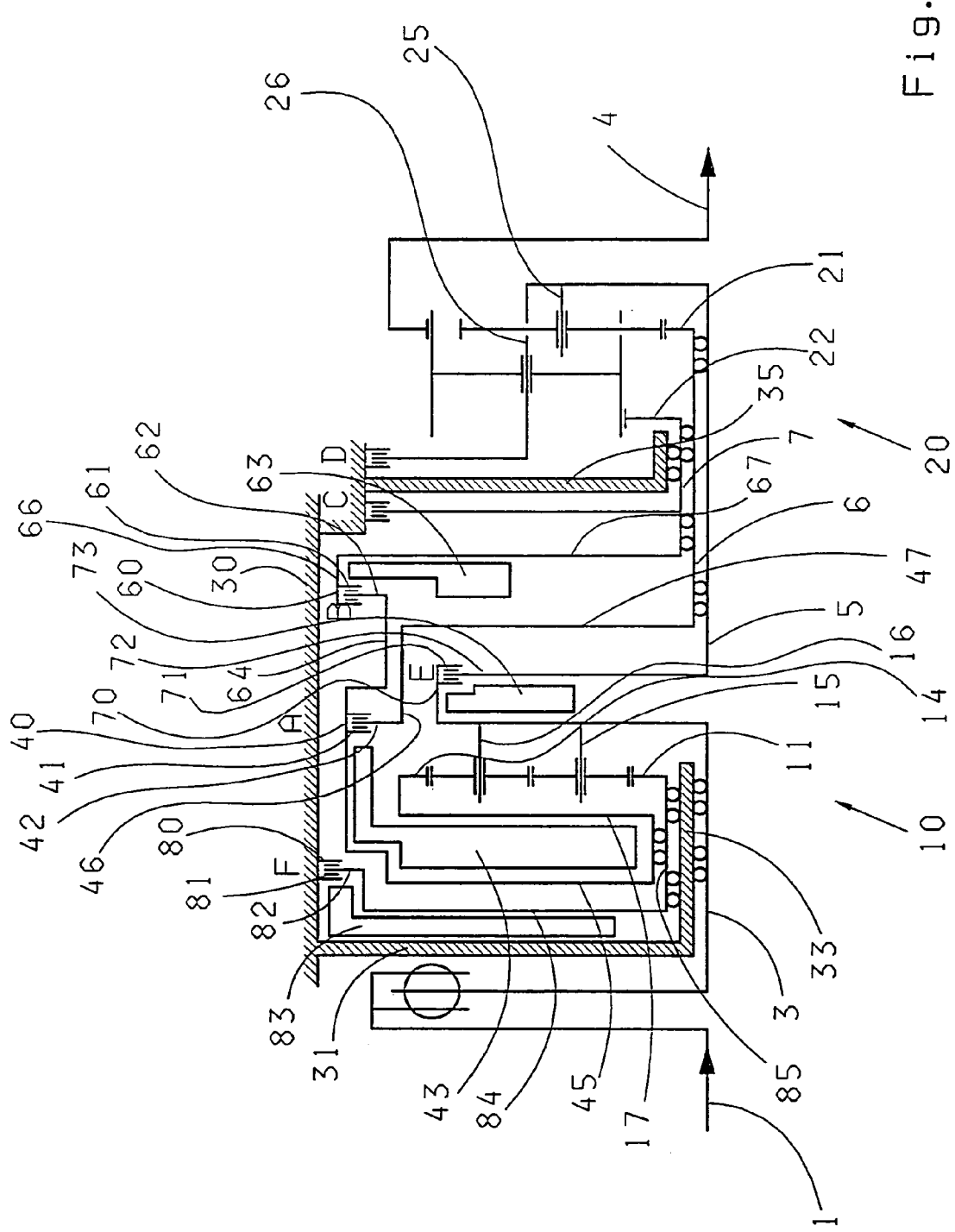
FIG. 3 is a primary component arrangement variant of the transmission in accordance with FIG. 1, wherein the input and output shafts are coaxial.

FIG. 3 shows a first component assembly variant of the multistage transmission in accordance with FIG. 1 with a coaxial input and output drive. Compared to the proposed component assembly of FIG. 1, in particular, the assembly of the shifting elements F, A and B have been modified. Also altered is the design of the input and output gear elements of the shifting elements A and B, by means of which, the output speed of rotation, $n_{vs}$ of the primary planetary gear set 10 on the first and second input elements—the small and the large sun gear 21, 22 remain unchanged in the depicted example—of the principal planetary gear set 20 can be transmitted. The design of the input drive and the output drive of the multistage transmission correspond to those designs shown in FIG. 1.

As may be seen in FIG. 3, the brake F remains without change on that side of the primary planetary gear set 10 remote from the principal planetary gear set 20 and is adjacent to the transmission housing wall 31. However, brake F is now at the greatest possible diameter directly on the outer diameter of the transmission housing 30, directly on the outer diameter of the transmission housing 30 and, in a radial direction, at least partially above a cylindrical projection 33 of the transmission housing wall 31, which extends itself axially in the direction of the primary planetary gear set 10. In a simple manner, it is possible that the outer disk carrier 80 of the brake F can be integrated into the transmission housing 30, whereby, in the axial space between the transmission housing wall 31 and the inner disk carrier 82, there can be provided a servo apparatus 83 for the activation of the brake F. Obviously, in this arrangement, the transmission housing wall 31 can be designed as a part of the of the transmission housing 30 or as a separate interposed plate, securely bound to the transmission housing 30. The inner disk carrier 82 of the brake F possesses a disk shaped section 84, which is mounted centrally inward toward the interior and is bound to the sun gear 85 of the primary planetary gear set 10. This sun gear 85 is connected to the sun gear 11 and is held, with bearings, in place on the cylindrical projection 33 of the transmission wall 31, which said projection extends itself axially in the direction of the primary planetary gear set 10. In the axial space between the transmission housing wall 31 and the disk shaped section 84 of the inner disk carrier 82 of the brake F, in a simple manner, individual components of the servo apparatus 83 of the brake F can be placed. For instance, a respective element of the individual components could be a reset spring 88 of a piston of the brake F. In an advantageously simple manner, the feed line of the pressure medium for the activation of the brake F can be by means of channels, designed especially for that purpose and which run within the transmission housing wall 31 and/or within the cylindrical projection 33 of the transmission housing wall 31. A input drive shaft 3 of the multistage transmission can be supported in the cylindrical projection 33 of the transmission housing wall 31.

The input element of the first shifting element A is designed as an outer disk carrier 40, and, differing from the assembly in FIG. 1, now shows itself bound to an inner disk carrier 62 of the clutch B, which forms the input element of the second shifting element B. The clutch A is adjacent, in the axial direction, to the brake F, whereby the disks 41 of the clutch A are placed, at least partially, above the primary planetary gear set 10, and have a diameter, which is only very little less than that of the disks 81 of the brake F. The disks 61 of the clutch B are to be found, in an axial direction between the disks 41 of the clutch A and the principal planetary gear set 20 and said disks 61 have a diameter at least approaching that of the disks 41 of the clutch A.

The fifth shifting element E borders on the coupled spiders 15, 16 of the primary planetary gear set 10 and is located in the axial direction between primary planetary gear set 10 and the principal planetary gear set 20. The input element of the clutch E is designed as the outer disk carrier 70. The inner disk carrier 72 of the clutch E is centrally directed toward the transmission middle and is bound to the third shaft 5. The third shaft 5, in turn, is—as shown in the assembly as per FIG. 1—penetrates centrally through the principal planetary gear set 20 and on that side of the principal planetary gear set 20, which is remote from the primary planetary gear set 10 is bound to the spiders thereof, namely 25, 26 which are coupled thereto. Corresponding to the power flow connection of the three clutches A, B and E, to the principal planetary gear set 20, the clutch E is spatially located underneath the clutches A and B, in order in spite of making possible a greater diameter of the disks 71, that a cylindrical section 46 of the output element of the clutch A which serves as the inner disk carrier 42 on the one hand, can run at least approximately in an axial direction above the clutch E and bypass thereby the outer disk carrier 70, the disks 70 and inner disk carrier 72 of the clutch E. Otherwise, the cylindrical section 46 of the output element of the clutch A runs, at least sectionally, in radial direction underneath the clutch B and especially, again radially below a cylindrical shaped section 64 of the input element of the clutch B, forms an inner disk carrier 62. Continuing, the cylindrical section 46 subsequently is led above a disk shaped section 47, central to the transmission mid-section up to the first sun shaft 6, which forms the connection between the output element of the clutch A and the first input element of the principal planetary gear set 20, while running coaxially above the third shaft 5. In this way, the output element of the first shifting element A at least partially penetrates a clutch space radially below the disks 61 of the second shifting element B.

A servo apparatus 43, for the activation of the clutch A, in an advantageous way, is placed between the primary planetary gear set 10 and the transmission housing wall 31, especially between the primary planetary gear set 10 and the disk shaped section 84 of the inner disk carrier 82 of the clutch F. With the arrangement so situated, the input element of the clutch A, which serves in the depicted example as the outer disk carrier 40, possesses a disk shaped section 45, which runs directly along the disk shaped section 84 of the inner disk carrier 82 of the brake F, centrally to the transmission mid-section, up to a bearing section, which is placed on the sun shaft 85 of the primary planetary gear set 10. The disk shaped section 84 of the inner disk carrier 82 is connected to the output of the primary planetary gear set 10 by means of a disk shaped output element 17 of the internal gear 11. The servo apparatus 43 of the clutch A is, in this design, advantageously at least partially spatially located between this disk shaped section 45 of the input element of the clutch A and this disk shaped output element 17 of the internal gear 14. This arrangement of the servo apparatus 43, which can also exhibit a dynamic pressure compensation for the clutch A, advantageously prevents an empty run of a piston space, that is to say, thus a pressure compensation space of the clutch A in its non-shifted condition, since the servo apparatus 43 rotates continually at the output speed of rotation $n_{vs}$ of the primary planetary gear set 10. In this way, the shifting ease, upon a renewed shifting of the clutch A is improved, especially after a longer idle time in the non-shifted condition.

The output element of the clutch B is designed as an outside holder for disks 60. A cylinder shaped section 66 of this output element of the clutch B extends itself in the direction of the principal planetary gear set 20. An at least partially disk shaped section 67 of the output element of the clutch B, which is connected to this said cylindrical shaped section 66, is bound by an inner disk carrier of the brake C and extends itself radially in the direction of the transmission mid-point up to the second sun shaft 7, is connected to the first sun gear 6, and by means of this second sun shaft 7 is also connected to the principal planetary gear set 20. Additionally, the second sun gear shaft 7 is located by means of a support plate 35 spatially set between the brakes C and D and on the transmission housing 30. In the illustrated example, this support plate 35 is made as a separate component, which is connected to the transmission housing 30. Obviously, it is possible that a one-piece design of the support plate 35 with the transmission housing 30 can be provided.

A servo apparatus 63 for the activation of the clutch B is, for example, located axially, between the disks 61 of the clutch B and the principal planetary gear set 20, preferably immediately bordering on the disk-like section 47 of the output element of the clutch A, which section, for example, is designed as an inner disk carrier 42 for the clutch A.

The servo apparatus 73, for the activation of the clutch E is, for example, placed axially between the primary planetary gear set 10 and the disks 71 of the clutch E, in particular, directly bordering on the coupled spiders 15, 16 of the primary planetary gear set 10 on that side thereof, which is proximal to the principal planetary gear set 20. In an advantageous manner, a piston space of the servo apparatus 73 rotates and an eventually available pressure compensation space of the clutch E likewise continually rotates with the transmission input speed of rotation $n_{ein}$ or $n_1$, whereby an unwanted empty run of the piston space and the pressure compensation space of the clutch E in a non-shifted condition is prevented and the ease of shifting is improved. In another embodiment, it is possible that provision can be made that the servo apparatus of the clutch E could be placed on that side of the disks 71 of the clutch E which is proximal to the principal planetary gear 20, and axially between the inner disk carrier 72 of the clutch E and the disk shaped section 47 of the output element of the clutch A.

By means of this arrangement in FIG. 3 of the clutches F, A, B and E, in an advantageous manner, a very small length of construction—especially the least possible numbering of disks—of the four shifting elements F, A, B and E is achieved. The design of the input elements of the clutch A as outer disk carrier 40 and of the input elements of the clutch B as inner disk carrier 62 makes possible an advantageously simple design of the torque directing connection points between these two input elements, since, for instance, a correspondingly designed element of the inner disk carrier 62 is included in a disk-come-along of the outer disk carrier 40 and is also axially secured in the outer disk carrier 56.

Figure 4:
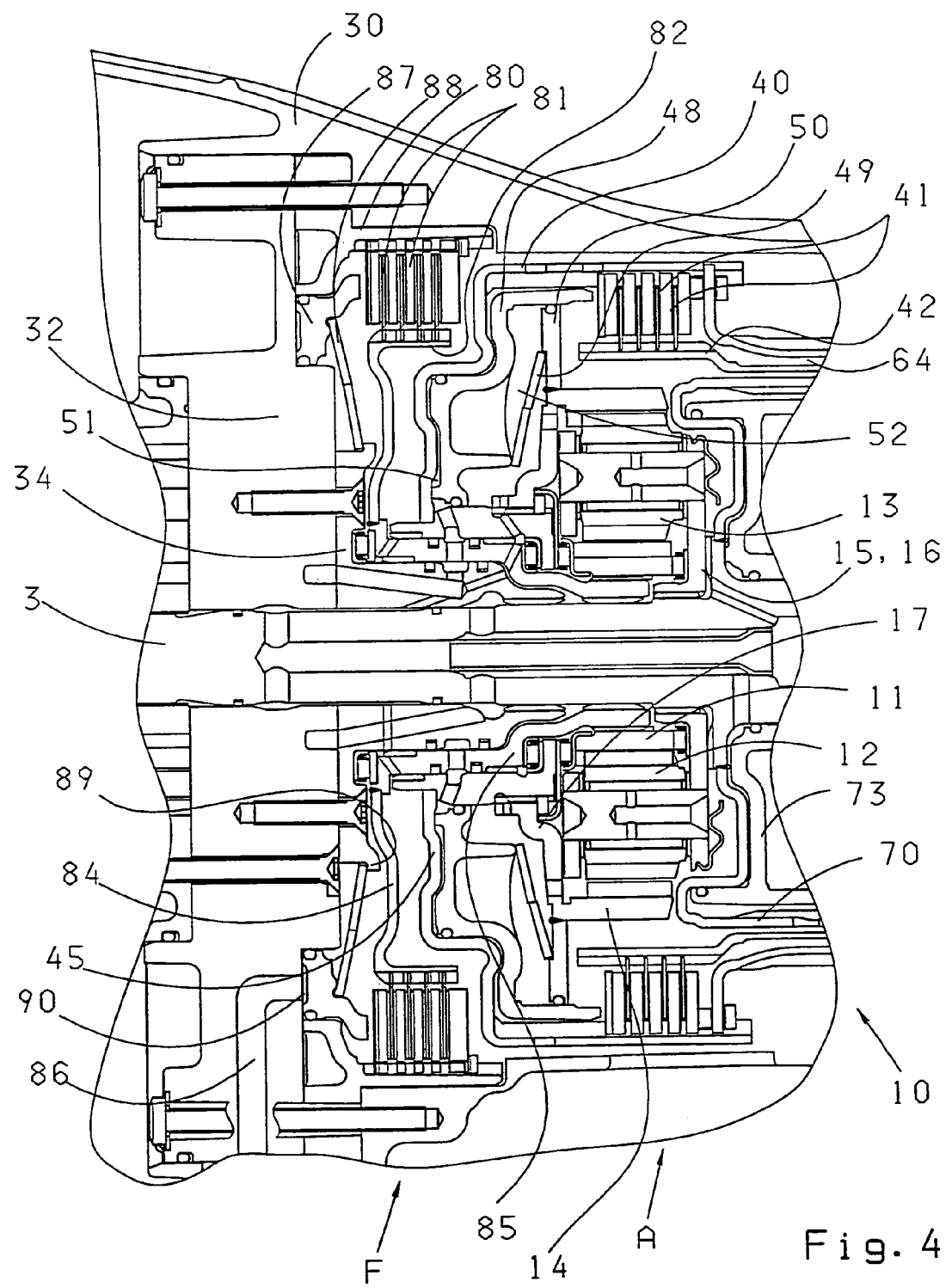
FIG. 4 is a detailed design of the component arrangement per FIG. 3.

Regarding FIG. 4, which shows a portion of a transmission cross-section as an exemplary detail drawing, the component arrangement of the sixth shifting element F, in accordance with FIG. 3 need not be explained in any greater detail. In this, one—not shown—area of the transmission housing 30 proximal to the drive motor is placed an interposed plate 32 which is screwed to the transmission housing 30, and said plate serves here as an outer wall of the transmission housing. In the central part of the interposed plate 32, is included a cylindrically shaped hub assembly 34, which extends itself axially into the interior space of the transmission housing 30 and is connected by screws to the interposed plate 32. The power connected drive shaft 3 of the (not shown) drive motor of the multistage transmission runs centrally through the interposed plate 32 and hub assembly 34 and is there supported on bearings. On the transmission side, the drive shaft 3 is connected with the coupled spiders 15, 16 as an input element of the primary planetary gear set 10, as well as with the outer disk carrier 70, here serving as an input element of the clutch E, up to the servo apparatus 73 of said clutch and not further indicated on the drawing. The torque conducting connection of the primary planetary gear set 10 to the input drive shaft 3 is done, in this arrangement, on that side of the primary planetary gear set 10 remote from the interposed plate 32, also on that side thereof proximal to the (not shown) principal planetary gear set 20. The input drive shaft 3 runs thus centrally through the primary planetary gear set 10 and is connected to the coupled spiders 15, 16 of the planet gears 12, 13 of the primary planetary gear set 10. On that side of the coupled spiders 15, 16 proximal to the interposed plate 32, the sun gear 11 of the primary planetary gear set 10 is located on the drive shaft 3 and connected with a—axial to the drive shaft 3—sun gear shaft 85 of the primary planetary gear set 10. This sun gear shaft 85 is again radially and rotationally borne on a particularly designed cylindrical section of the hub assembly 34 and axially supported. Obviously, it is possible that the sun gear 11 and the sun gear shaft 85 can be made as a one-piece object.

The sixth shifting element F, designed as a brake, is placed bordering on the interposed plate 32. In this way, the outer disk carrier 80 of the brake F is designed as a separate component and placed on the largest possible inner diameter of the transmission housing 30, directly bordering onto the interposed plate 32 and held secure against the transmission housing with screw connections. In another embodiment, it can be obviously provided, that the outer disk carrier 80 of the brake F be integrated into the transmission housing 30. The come-along toothing for the outer disks of the brake F is then molded into the transmission housing 30. The servo-element of the brake F includes a piston 87 and a reset spring 88. The piston 87 of brake F is directly contiguous to the interposed plate 32. Thus, the piston 87, in the embodiment shown, is placed to be axially movable in an annular space between a cylindrical section of the outer disk carrier 80 and a cylindrical section of the interposed plate 32 and is provided with sealing against these two cylindrical sections. This cylindrical section of the outer disk carrier 80, this cylindrical section of the interposed plate 32, the piston 87 and a somewhat recessed to the piston 87, perpendicular section of the interposed plate 32, altogether form the piston space 90 for the brake F. For the activation of the brake F, the piston space 90 can be loaded with a pressure medium by means of a pressure medium channel 86. In the described and illustrated example, this pressure medium channel 86 runs within the interposed plate 32.

In another embodiment for the assembly of the piston 87 of the brake F, it is possible to also provide, that the interposed plate 32 possess an annular recess for the acceptance of the piston 87. Also, the interposed plate 32 can be made in two parts, with a disk-like, flat first plate and a second disk-like channel plate, whereby the outside diameter of the second channel plate simultaneously forms the inside diameter of the piston space 90 of the brake F. Likewise, it is possible that a cylindrical section of the hub assembly 34 which is contiguous to the interposed plate 32 can form the inside diameter of the piston space 90 of the brake F. In accordance with the design of the piston space 90, also in accordance with the spatial arrangement of the same in the area of the interposed plate 32 and per the size thereof, it is possible that the pressure channel 86 can run inside of the hub assembly 34 to its goal, i.e., the piston space 90.

In the designed embodiment example the reset spring 88 of the piston 87 is constructed as a plate spring and supports itself on a support binding 89 of the hub assembly 34. In another embodiment a separated disk can be provided as an abutment apparatus for the reset spring 88. This would be inserted in a complementarily constructed groove of the hub assembly 34. Obviously it is possible that other constructive measures of the piston/reset-spring can be provided, for instance, a helical spring could be used.

The inner disk carrier 82 of the brake F, which is placed radially underneath the disks 81 of the brake F possesses at least a predominately disk shaped section 84, which borders in an axial direction the interposed plate 32, that is, is contiguous with the reset spring 88, and is conducted centrally in the direction of the input drive shaft 3 up to the sun gear 85 of the primary planetary gear set 10, with which it is connected. In this way, the inner disk carrier 82 of the brake F is located on the hub assembly 34.

The disks 41 of the first shifting element A, which is designed as a clutch, is at least predominately located above the internal gear 14 of the primary planetary gear set 10. The outer disk carrier 40 forms the input element of the clutch A, and the inner disk carrier 42 forms the output element thereof. On that side of the disks 41 distal from the interposed plate 32, the outer disk carrier 40 of the clutch A is bound to the (not shown) clutch B. Thereby, presented in FIG. 4 is principally the cylindrical shaped section 64 of this input element of the clutch B.

The servo apparatus of the clutch A is placed spatially between the brake F and the primary planetary gear set 10.

This servo apparatus includes a piston 48, a reset spring 49 for the piston 48, as well as a baffle plate 50 for a dynamic pressure compensation of the rotating clutch A. The piston 48, in this arrangement, is placed pressure tight, and axially movable within a piston space 51 of the outer disk carrier 40. In the interest of saving in length of assembly, the baffle plate 50 is welded directly to the internal gear 14 of the primary planetary gear set 10 and sealed against the piston 48 of the clutch A, thus forming on that side thereof, remote from the primary planetary gear set 10, a pressure compensation space 52. The reset spring 49, which, for example, may be constructed in the form of a plate spring, supports itself between correspondingly constructed, axial contact surfaces of the piston 48 and the baffle plate 50. The feed of pressure medium to the piston space 51 of the clutch A and to the pressure compensation space 52 of the dynamic pressure compensation of the clutch A is done by means of pressure medium channels, which run in the drive shaft 3, the hub assembly 34 and the sun shaft 85 of the primary planetary gear set 10. Both the piston space 51 as well as also the pressure compensation space 52 of the clutch A are spatially situated between the clutch F, in particular, the piston space 80, and the primary planetary gear set 10. In another embodiment, of the pressure compensation space 52, it is possible that the baffle plate 50 can also be made in the conventional manner, as a separate disk, which, in an appropriate manner, is radially and axially affixed on the hub shaped section of the outer disk carrier 40 which is carried on the sun gear shaft 85 of the primary planetary gear set 10. Also, other constructive measures of the pressure-reset spring of the clutch A could be provided, for instance a helical spring package.

The input element of the clutch A, which is designed as an outer disk carrier 40, which is bound with the internal gear 14 of the primary planetary gear set 10, possesses an at least partially, disk shaped section 45 which—directly bordering on the disk shaped section 84 of the inner disk carrier 82 of the brake F—extends itself centrally in the direction of the input drive shaft 3, up to a cylinder shaped bearing section, which extends itself axially in the direction of the primary planetary gear set 10 and is rotatable supported on the sun gear shaft 85 of the primary planetary gear set 10. This cylindrical bearing section defines at the same time, the inside diameter of the piston space 51 of the clutch A. The outer disk carrier 40 of the clutch A, by means of this cylindrical bearing surface connected with a disk shaped output drive element 17, which is placed on that side of the primary planetary gear set 10 which is proximal to the interposed plate 32, and is connected to the internal gear 14 of the primary planetary gear set 10. The feed for pressurized medium to the piston space 51 and the lubricating oil feed to the pressure compensation space 52 is carried out by means of correspondingly designed borings of the input drive shaft 3, the hub assembly 34, which is affixed to the housing, and the sun gear 85 of the primary planetary gear set 10 and the cylindrical shaped bearing section of the outer disk carrier 40.

As may be seen in FIG. 4, the concern here is for the greatest possible compactness and space saving assembly of components from the sixth shifting element F, the first shifting element A and the primary planetary gear set 10.

Figure 5:
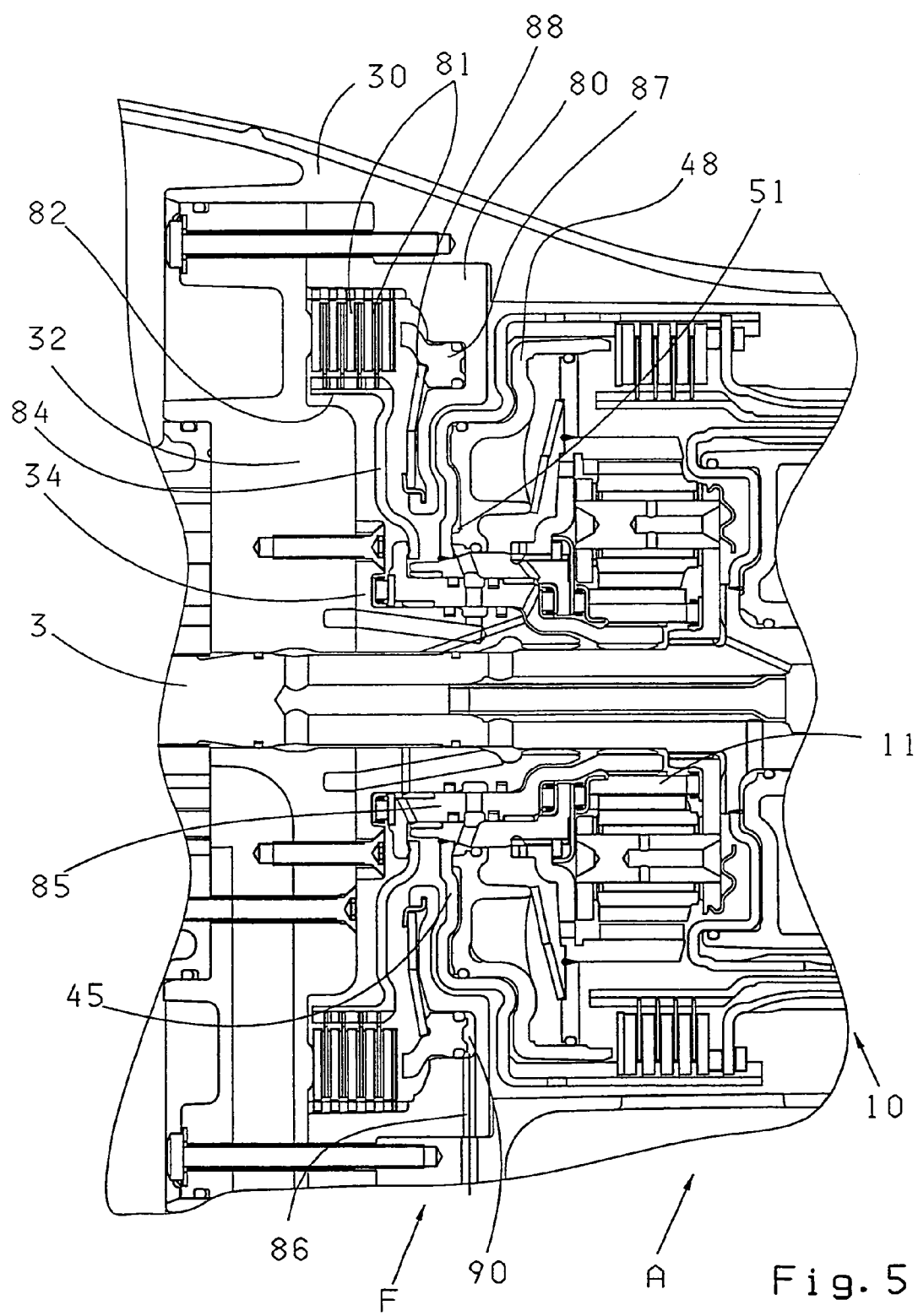
FIG. 5 is a variant embodiment example for the detailed construction of FIG. 4.

Turning to FIG. 5, a detailed embodiment variant based on FIG. 4 is shown, with a graphic explanation of a modified spatial arrangement of the servo apparatus of the brake F. The brake F remains unchanged and is still located radially at such a diameter that it locates itself above the hub assembly 34 and bordering the interposed plate 32 axially and centrally, in the direction of the primary planetary gear set 10, which said plate is connected by screws to the transmission housing 30. Also unchanged is a disk shaped section 84 of the inner disk carrier 82 of the brake F, spatially located underneath the disks 81 of the brake F, directly axially bordering and predominately parallel to the interposed plate 32 in the direction of input drive shaft 3 up to the sun gear 85 of the primary planetary gear set 10, which—coaxial to the input drive shaft 3—is secured upon the hub assembly 34 and forms the torque transmission connection between the disk shaped section 84 of the inner disk carrier 82 and the sun gear 11 of the primary planetary gear set 10. Likewise unchanged, the servo apparatus of the brake F embraces the piston 87 and the reset spring 88 of the piston 87, which said spring could be, for example, made as a plate spring.

Differing from the exemplary detailed design as drawn in FIG. 4, the servo apparatus 83 of the brake F is now placed on that side of the disks 81 of the brake F, which side is remote from the interposed plate 32, which said plate 32 forms an outer wall of the transmission housing 30 proximal to the drive motor. The servo apparatus of the brake F is now, first, placed axially between the disks 81 of the brake F and the primary planetary gear set 10, and second, is also axially located between the disks 81 of the brake F and the clutch A, especially being a direct neighbor to the servo apparatus of the clutch A, which is represented especially by piston 48 and piston space 51. Further, in this assembly, the piston 87 of the brake F is placed within an annular recess of the outer disk carrier 80 of the brake F. The piston space 90 of the brake F is also integrated into the outer disk carrier 80 of the brake F. Correspondingly, the pressure medium feed channel runs, for pressurized medium addition, into the piston space 90 within the outer disk carrier 80.

Figure 6:
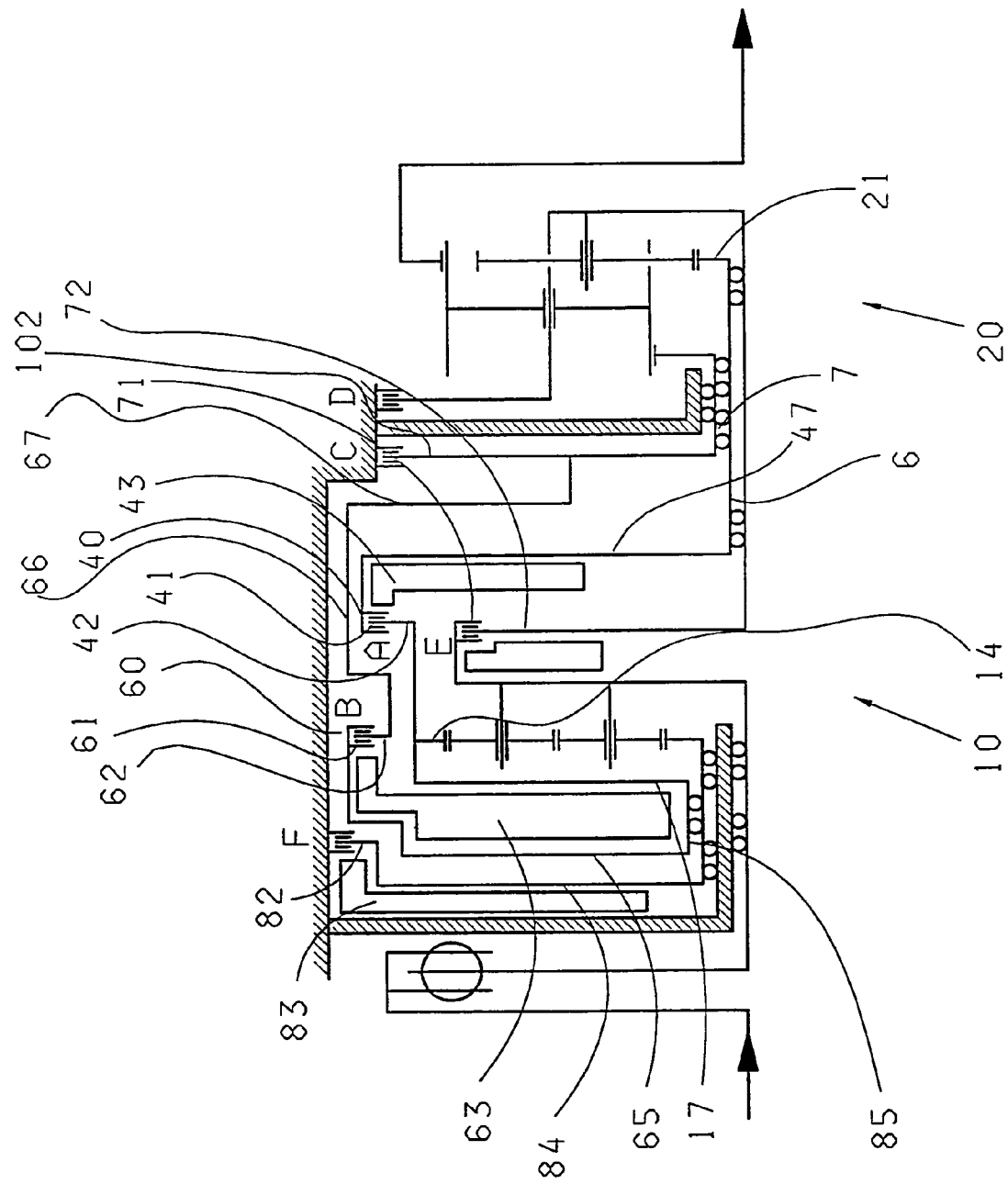
FIG. 6 is a second component arrangement variant of the transmission in accordance with FIG. 1, wherein the input and output drive shafts are coaxial.

FIG. 6 shows a second variant of the component arrangement for a multistage transmission in accordance with FIG. 1, again with coaxial placement of input and output drives. As a difference from the component arrangement as shown in FIG. 3, in FIG. 6 only the spatial arrangement of the first and second shifting elements A and B are switched in their axial direction.

The clutch B now borders, in axial direction, on the sixth shifting element F, which element is designed as a brake, whereby the servo apparatus 63 of the clutch B is at least predominately placed axially between the brake F and the primary planetary gear set 10. This placement is especially set axially between the servo apparatus 83 of the brake F, that is the disk shaped section 84 of the inner disk carrier 82 of the brake F and the disk-like output drive element 17 of the internal gear 14 of the primary planetary gear set 10. The disk 61 of the clutch B is placed at least approximately above the internal gear 14 of the primary planetary gear set 10.

The input element of the clutch B is designed as an outer disk carrier 60. One, at least extensive disk-like section 65 of this input element of the clutch B directly borders in axial direction against the disk shaped section 84 of the inner disk carrier 82 of the brake F and extends itself radially in the direction of the center of the transmission up to a cylindrical bearing section, which once again is placed on the sun gear shaft 85 of the primary planetary gear set 10. By means of this cylindrical bearing section, the outer disk carrier 60 is bound to the disk-like output element 17 of the internal gear 14, which said element 17 forms the output element of the primary planetary gear set 10. Thus, the servo apparatus 63 of the clutch B is at least partially directly between the disk-like section 65 of the input element of the clutch B and the disk-like output element 17 of the internal gear 14. Obviously, it is possible that the servo apparatus 63 of the clutch B, besides being a device for the activation of the disks 62, can also provide dynamic pressure compensation for the clutch B.

The arrangement of the servo apparatus 63, of the clutch B, carried out in this way, prevents, in an advantageous manner, an empty run of the clutch space, that is to say, the pressure compensation of the clutch B, in the non-engaged condition thereof. This is because the servo apparatus 63 is always run with the rotational speed of the output $n_{vs}$ of the primary planetary gear set 10. In this way, the shifting comfort upon a reshift of the clutch B is improved, especially after a lengthy idle time in a non-engaged condition.

The output element of the clutch B is designed as an inner disk carrier 62, with a cylindrical section 66, which extends itself axially in the direction of the principal planetary gear set 20 and bypasses the clutch A as well as the disks 41 of the clutch A, and connects with an at least partially disk shaped section 67, which connects itself onto the cylindrical section 66 and is connected with an inner disk carrier 102 of the brake C and the second sun shaft 7.

The clutch A is placed between the primary planetary gear set 10 and the principal planetary gear set 20, whereby the disks 41 of the clutch A are contiguous in an axial direction with primary planetary gear set 10 and also with the disks 61 of the clutch B. Relative to the clutch E, which likewise borders on the primary planetary gear set 10, again between the primary planetary gear set 10 and the principal planetary gear set 20, the disks 41 of the clutch A are at least partially radially above the disks 71 of the clutch E.

The input element of the clutch A is designed as an inner disk carrier 42 and is directly bound to the internal gear 14, serving as an output element for the primary planetary gear set 10. The output element of the clutch A is designed as an outer carrier 40 and possesses a disk-like section 47, which, runs centrally to the middle of the transmission up to the first sun gear shaft 6, by means of which it is connected to the small sun gear 21 of the principal planetary gear set 20. Inner disk carriers 42, disks 41 and outer disk carrier 40 of the clutch A also over lap the clutch E.

The servo apparatus 43 of the clutch A, in a simple way, is placed on that side of the disks 41 of the clutch A which side is proximal to the principal planetary gear set 20 thus being first, between the disks 41 of the clutch A, that is to say, the disk-like inner disk carrier 72 and second, the disk-like section 47 of the outer disk carrier 40 of the clutch A, advantageously directly contiguous to the components.

In another embodiment it is possible, that provision can be made, that the servo apparatus 43 of the clutch A can be placed in axial direction between the disk-like section 47 of the output element of the clutch A and the disk-like section 67 of the output element of the clutch B, advantageously directly bordering on these components, whereby a piston of the clutch A bypasses the outer disk carrier 40 of the clutch A axially in the direction of the primary planetary gear set 10 and the disks 41 of the clutch A are activated from their side proximal to the primary planetary gear set 10.

Figure 7:
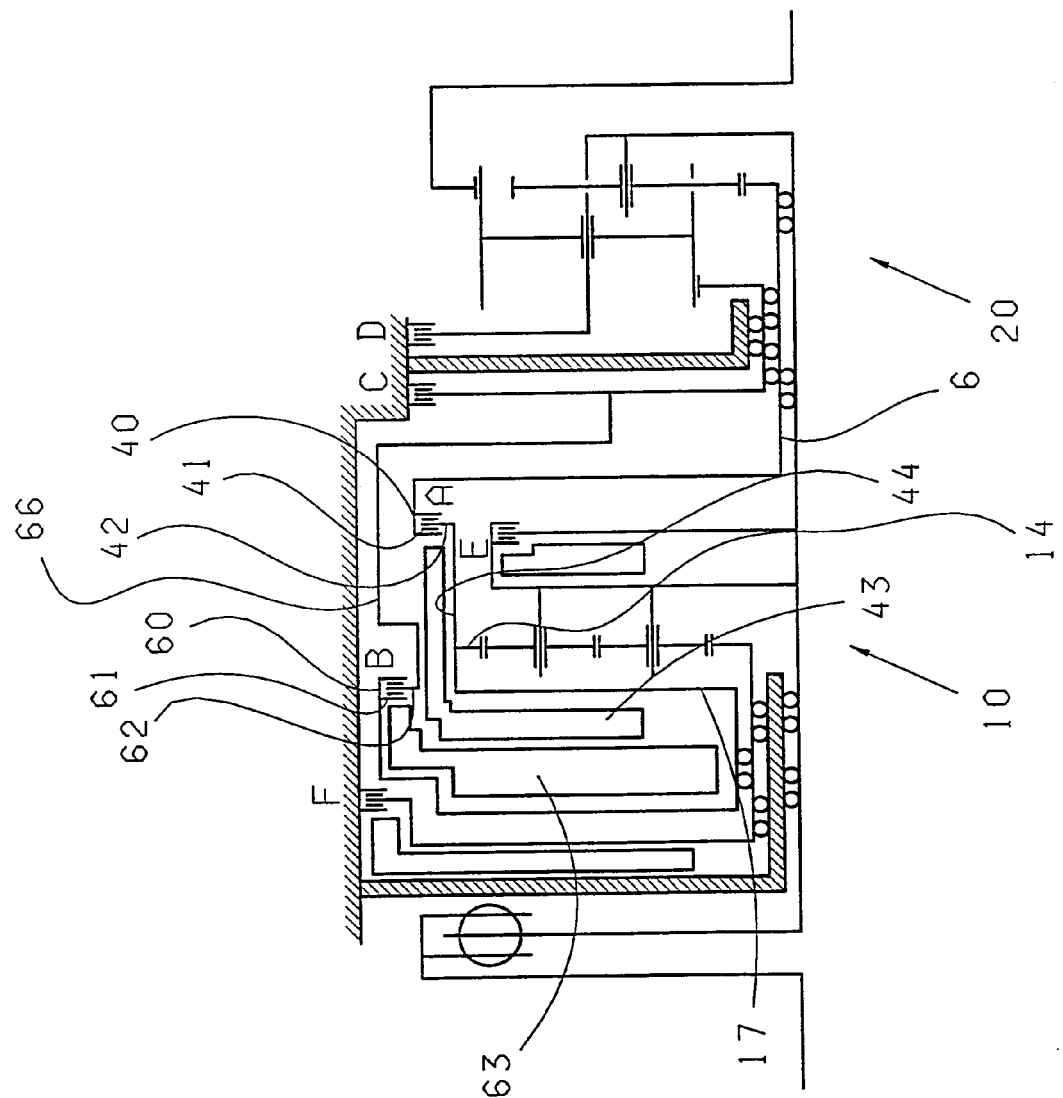
FIG. 7 is a presentation of the second component arrangement variant in accordance with FIG. 6.

Derived from the exemplary component arrangement as per FIG. 6, FIG. 7 shows an additional embodiment of an arrangement of the servo apparatuses 43, 63 of the clutches A and B. In this embodiment the spatial positioning of the disks 41, 61 of the two clutches A, B, relative to the primary planetary gear set 10 and the principal planetary gear set 20 and relative to the other shifting elements C to F remain unchanged. Likewise, in an unchanged manner, the respective inner disk carrier 42 and the outer disk carrier 60 form the respective input elements of the clutches A, B and in the same manner outer disk carrier 40 and inner disk carrier 62 form the respective output elements of the clutches A, B.

A different feature from FIG. 6, is that now provision is made for the servo apparatus 43 of the clutch A is placed on that side of the primary planetary gear set 10 which is remote from the principal planetary set 20, and axially between the servo apparatus 63 of the clutch B and the disk-like output element 17 of the internal gear 14, advantageously directly bordering on the servo apparatus 63 and the disk-like output element 17. The disks 41 of the clutch A were also activated on their side which is remote from the principal planetary gear set 20. In this regard, an activation element of the servo apparatus 43 bypasses the internal gear 14 of the primary planetary gear set 10 and extends itself—radially above a cylindrical section 44 bound with the internal gear 14 of the input element of the clutch A which said element is in service also as inner disk carrier 42, and also, radially underneath the cylindrical section 66 of the output element of the clutch B serving as inner disk carrier 62—in axial direction up to the disks 41 of the clutch A. Advantageously, with this arrangement of the servo apparatuses 43, 63 of the clutches A and B is their interlocking positioning within the outer disk carrier 60 of the clutch B, whereby a simple preassembly as an individual component becomes possible.

Since the placement of the other components in FIG. 6 and FIG. 7 correspond to the order presented in FIG. 3, any further detailed description at this point would be superfluous and such is accordingly omitted.

By means of these arrangements described in FIGS. 6, 7 relative to the planetary gear sets and shifting elements—in a similar manner to the proposed assembly in FIG. 3—in an advantageous way, a very small assembly length has been achieved for the multistage transmission with coaxial input drive and output drive.

Figure 8:
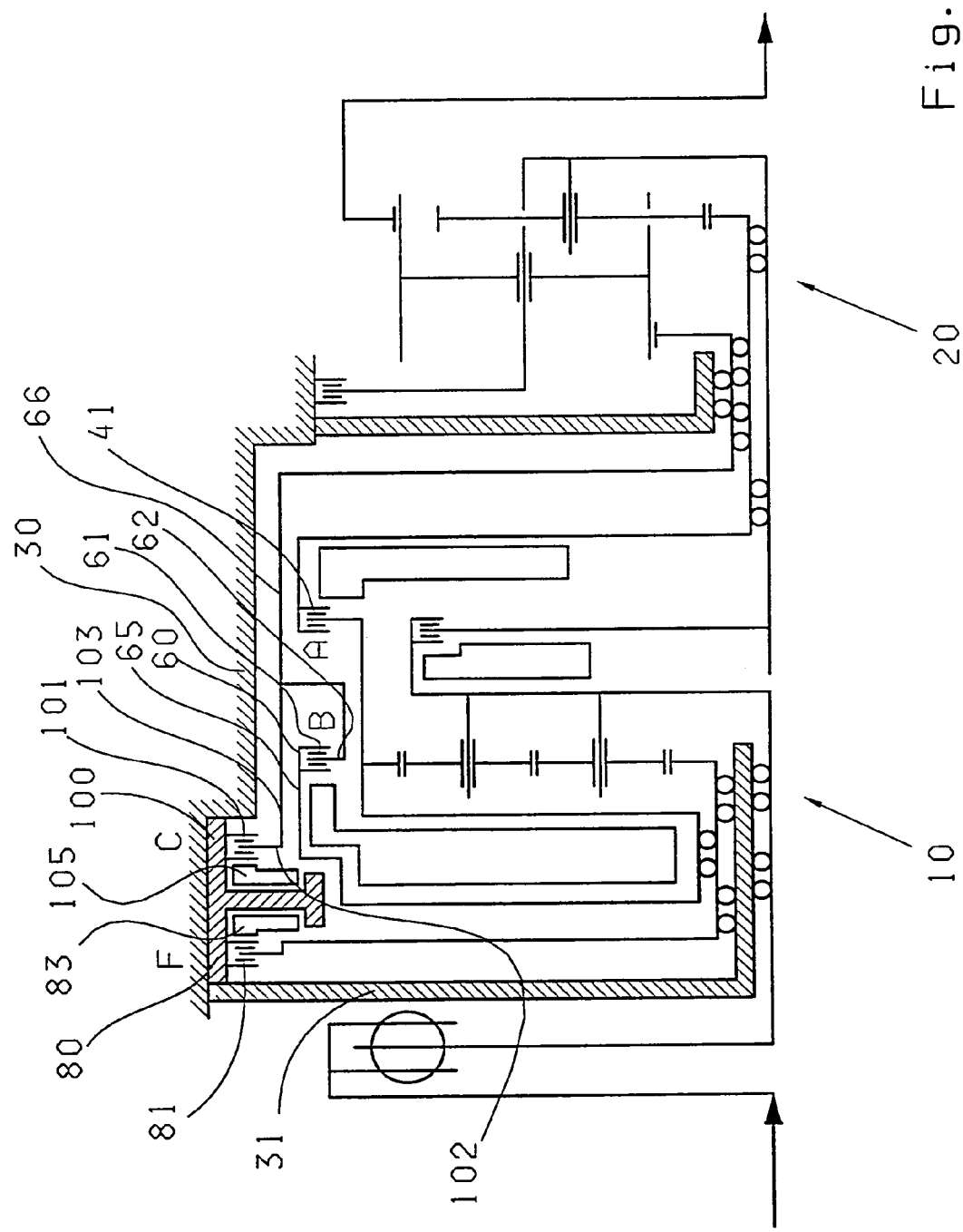
FIG. 8 is a third component arrangement variant of the transmission in accordance with FIG. 1, wherein the input and output drive shafts are coaxial.

FIG. 8 shows a third exemplary alternate of a component assembly of a multistage transmission with the first invented primary planetary gear set variant, basing itself on the second component assembly alternate as shown in FIG. 6. A difference, when compared to FIG. 6, lies essentially only in the arrangements of the brake C, which now is to be found in an axial direction between brake F and clutch B, and also that side of the clutch B which is remote from the principal planetary gear set 20. Advantageously, the brake C is placed to be proximal to the brake F. The disks 101 of the brake C possess, for example, the same diameter as do the disks 80 of the brake F and are, when seen in the radial direction, located partially above the primary planetary gear set 10. In the depicted example, the outer disk carriers 100, 80, of both brakes C, F are made as a one-piece component, which is securely bound to the transmission housing 30. In another embodiment, it is possible that the outer disk carriers 100, 80 of both brakes C, F can also be integrated into the transmission housing 30.

In the presented example, the servo apparatuses 105, 83 of the brakes C, F are integrated in this common outer disk carrier. The servo apparatus 105 of the brake C activates the disks 101 of the brake C then, in the direction of the principal planetary gear set 20 while the servo apparatus 83 of the brake F activates the disks 81 of the brake F in the opposite direction, namely in the direction of the transmission housing wall 31, onto which the disks 81 directly border. In another embodiment, the servo apparatus 105 of the brake C can obviously be placed on that side of the disks 101 which is proximal to the principal planetary gear set 20. Likewise, in yet another embodiment of the present invention, it is possible that the servo apparatus 83 of the brake F—as in FIG. 6—can be placed between the transmission housing wall 31 and the disks 81 of the brake F.

The assembly shown in FIG. 8 of the one-piece outer disk carrier for both brakes C, F, with the servo apparatuses integrated in the outer disk carrier of both brakes C, F, gives rise to a very compact and simple preassembled component group.

The inner disk carrier 102 of the brake C possesses an approximately cylindrical shaped section 103, which extends in the axial direction radially above the cylindrical section 65 of the input element of the clutch B, which element is doing duty as outer disk carrier 60. Further, in the area of the disks 61 of the clutch B is connected with the cylindrical shaped section 66 of the output element of the clutch B, which, for example, is designed to act as an inner disk carrier 62 and radially bypasses the clutch A axially in the direction of the principal planetary gear set 20. The inner disk carrier 102 of the brake C also passes over the disks 61 of the clutch B. The disks 41 of the clutch A possess in an advantageous manner, at least an approach to the same diameter as that of the disks 61 of the clutch B. Excellently, in fabrication techniques, it is possible that in both clutches A, B, for instance, even the same disks can be employed.

Figure 9:
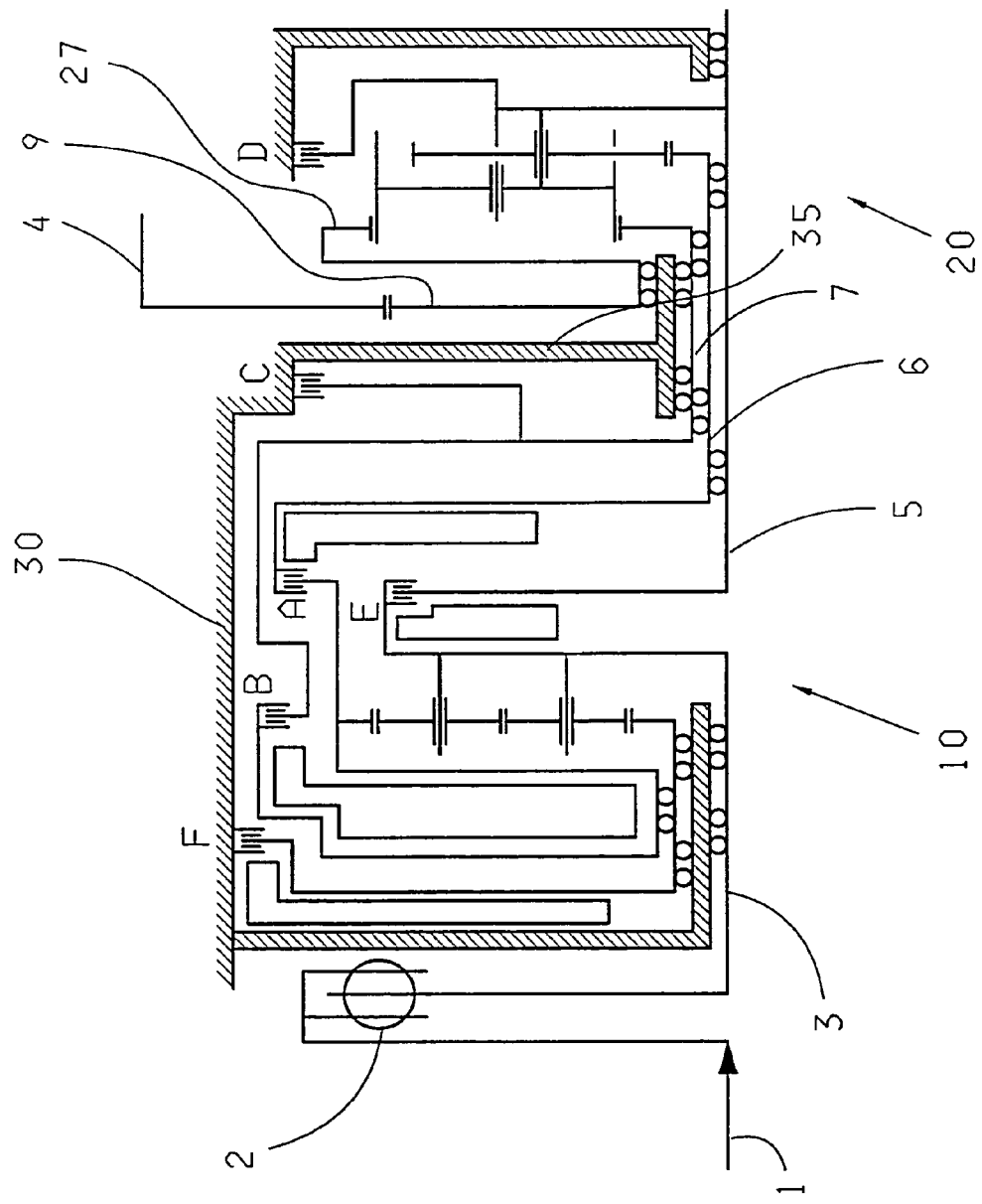
FIG. 9 is a fourth component arrangement variant of the transmission in accordance with FIG. 1, wherein the input and output drive shafts are axially parallel.

In FIG. 9 through FIG. 33 are various additional component arrangement variants of an invented multistage transmission with non-coaxial input and output drives. FIG. 9 shows, in particular, a fourth exemplary component arrangement variant of the multistage transmission with the first invented primary planetary gear set variant, based on the previously discussed FIG. 6 arrangement for coaxial input and output drives.

As may be seen in FIG. 9, the component group comprised of the primary planetary gear set 10 and the shifting elements F, B, A, E and C and their arrangement in the transmission housing 30 and also their force related connection to the principal planetary gear set 20, all as set forth in FIG. 6, remains unchanged. That is to say, the entire transmission section between the motor shaft 1 and the support plate 35, that is, the three shafts 5, 6 and 7 which are carried in the support plate 35 are identical. Even so the Ravigneaux-gear set, identical to the case in FIG. 6, is proposed as a principal planetary gear set 20 with its connection to the three shafts 5, 6 and 7. The internal gear 27 of the principal planetary gear set 20 forms the output element thereof and is now connected by means of a spur gear 9 coaxially placed to the principal planetary gear set 20 and connected to the output drive shaft 4. The output drive of the principal planetary gear set 20 is not coaxial to the motor drive shaft 1, that is, the input drive shaft 3, but rather advantageously is at right angles to the motor connected shaft 1, that is to say to the drive shaft 3. Accordingly, the output shaft 4 is parallel to the motor shaft 1, that is, the input shaft 3. In this way, the proposed multistage transmission adapts itself especially for a motor vehicle with an installed motor which is positioned transversely to the longitudinal axis of the vehicle. In a favorable manner, the spur gear 9 is axially placed by means of a correspondingly designed bearing unit and radially on the already available support plate 35, which is placed on that side of the brake C which is proximal to the principal planetary gear set 20. The spur gear is also directly between the support plate 35 and the principal planetary gear set 20.

The brake D, by means of which the coupled spiders 25, 26 of the principal planetary gear set 20 can be made fixed, is now on that side of the principal planetary gear set 20 which is remote from the primary planetary gear set 10, bordering on an outer wall of the transmission housing 30.

In order to achieve the smallest possible count of disks for the brake D and therewith a favorable installation condition for the multistage transmission, the disks for the brake D are placed at the greatest possible outside diameter, radially above the principal planetary gear set 20. A servo apparatus of the brake D in this arrangement, can now be placed advantageously between the spur gear 9, that is, the output drive shaft 4 and the disks of the brake D. For example, the servo apparatus can even be integrated into the outer wall of the transmission housing 30 which wall borders the principal planetary gear set on that side of the principal planetary gear set 20 which is remote from the motor, whereby this outer wall can also serve as a cover.

In the multistage transmission shown in FIG. 9 the torsion damper 2 and the (not shown) driving motor are place on that side of the multistage transmission, on which the sixth shifting element is placed. The torsion damper 2 and the drive motor are also placed closer to the primary planetary gear set 10 than to the principal planetary gear set 20.

Figure 10:
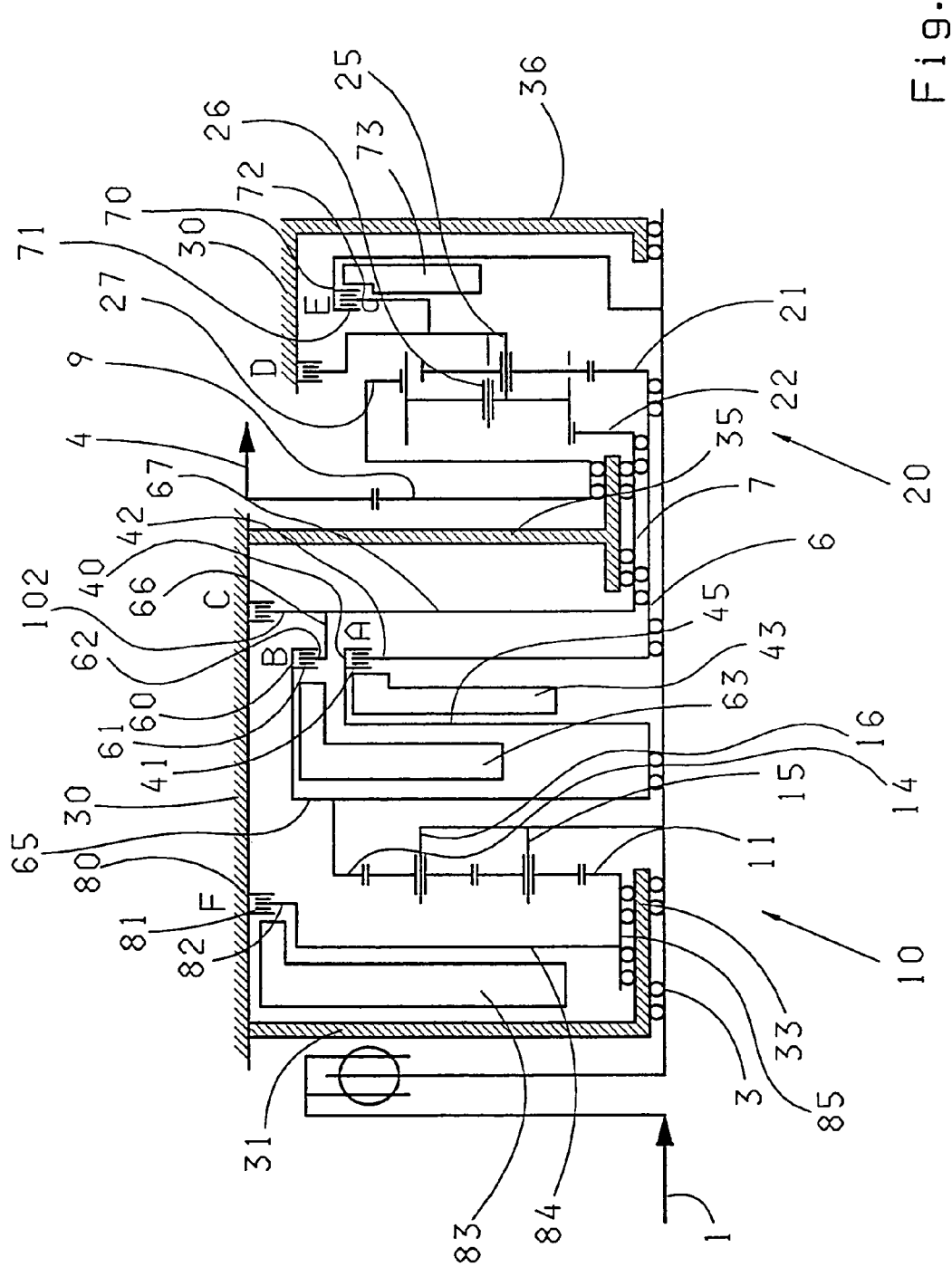
FIG. 10 is a fifth component arrangement variant of the transmission in accordance with FIG. 1, wherein the input and output drive shafts are axially parallel.

FIG. 10 now shows a fifth exemplary component arrangement variant of a multistage transmission with the first invented primary planetary gear set-variant and advantageous axially parallel input and output drives. In this arrangement is provided the basic structure of the buildup of the transmission, the brake F, the primary planetary gear set 10, the clutches A and B as well as the brake C are all shown placed together in a first part of the transmission housing 30, which extends itself between the transmission housing wall 31 and the support plate 35. Correspondingly, the spur gear 9 with the output shaft 4, the principal planetary gear set 20, the brake D as well as the clutch E are all together in a second part of the transmission housing 30, which extends itself from the support plate 35 to a cover 36, which lies oppositely on the side of the transmission housing wall 31. Obviously, it is possible that the cover 36 and the transmission housing 30 can be made as a one-piece component.

Entirely different than all of the previously described embodiments of the invented multistage transmission is the third shifting element E, by means of which the transmission input speed of rotation, namely $n_{ein}$, is applied to the third input element of the principal planetary gear set 20, is now placed on that side of the principal planetary gear set 20 which is remote from the primary planetary gear set 10. In the illustrated example, the principal planetary gear set 20 and the clutch E are upon that side of the primary planetary gear set 10 which is remote from the motor input shaft 1. The clutch E borders directly on a housing wall of the transmission housing 30, which is located on that side of the transmission housing which is oppositely situated from the input shaft 1 of the motor. The input drive shaft 3 of the multistage transmission completely penetrates the transmission centrally, up to the cover 36. For a simplified assembly of the transmission, it is possible, that the input drive shaft 3 can be construction in more than one section.

The placement of the brake F greatly corresponds to the arrangement as shown in FIG. 3. As may be seen in FIG. 10, the brake F is unchanged on that side of the primary planetary gear set 10 which is remote from the principal planetary gear set 20, and bordering on the transmission housing wall 31 of the transmission housing 30, at the greatest possible diameter directly at the outer diameter of the transmission housing 30. The outer disk carrier 80 of the brake F can be integrated into the transmission housing 30 in a simple manner. In the axial space between the transmission housing wall 31 and the inner disk carrier 82 is provided a servo apparatus 83 for the activation of the brake F. Obviously, it is also possible that, the transmission housing wall 31 can be constructed as a separate, intervening plate securely bound to the transmission housing 30. The inner disk carrier 82 of the brake F possesses a disk shaped section 84, which extends centrally toward the interior and is connected with the—in this example short—sun gear shaft 85 of the primary planetary gear set 10. This sun gear shaft 85 is connected with sun gear 11 of the primary planetary gear set 10 and is placed on the cylindrical projection 33 of the transmission housing wall 31, which extends itself axially in the direction of the primary planetary gear set 10. The servo apparatus 83 of the brake F borders likewise especially on the transmission housing wall 31 and on the disk-like section 84 of the inner disk carrier 82 of the brake F. The pressurized medium channels for the activation of the brake F, can run inside the transmission housing wall 31, and/or inside the cylindrical projection 33.

The primary planetary gear set 10 borders axially directly on the brake F, especially directly on the disk-like section 84 of the inner disk carrier 82, whereby the disks 81 of the brake F, at least partially, could be located, in a space saving measure, above the internal gear 14 of the primary planetary gear set 10. The input shaft 3 of the multistage transmission is, for example, carried by the projection 33 of the transmission housing wall 31 and, on that side of the primary planetary gear set 10 remote from the brake F is connected with the coupled spiders 15, 16 of the primary planetary gear set.

The clutches A, B are spatially placed between the primary planetary gear set 10 and the principal planetary gear set 20, upon that side of the primary planetary gear set 10 which is remote from the brake F. The plates 41, 61 of the clutches A, B are, as to spatial location, predominately set, one over the other, whereby the disks 61 of the clutch B possess a larger diameter than do the disks 41 of the clutch A. The input elements of both clutches A, B are designed to serve as outer disk carriers, respectively, 40, 60, the corresponding input elements being 42, 62.

In input element of the clutch B is designed as an outer disk carrier 60, this being a cylinder opening in the direction of the principal planetary gear set 20 with a disk-like section 65, which borders directly on the primary planetary gear set 10, especially onto the coupled spiders 15, 16 of the primary planetary gear set 10 and is connected with the internal gear 14 of the primary planetary gear set 10. This disk-like section 65, in this arrangement, extends radially to the centerline axis of the transmission and, by means of a support section, which extends itself axially in the direction of the principal planetary gear set 20, the section 65 is connected to the input drive shaft 3. The outer disk carrier 40 of the clutch A, acting as the input element thereof, is likewise constructed as a cylinder opening in the direction of the principal planetary gear set 20. A disk-like section 45 of this input element of the clutch A extends radially to the transmission centerline axis from the support section of the outside disk carrier 60 of the clutch B on the input drive 3. In the area of this support section of the outer disk carrier 60 are bound the two outer disk carriers 40, 60 of the clutches A, B.

The inner disk carrier 42 of the clutch A is predominately designed in a disk shape, and is so placed, that it aligns centrally with the longitudinal axis of the transmission, extending up to the first sun gear shaft 6. The said sun gear shaft 6, in this particular embodiment, is located directly on the input shaft 3. The output element of the clutch A connects with the small sun gear 21 of the principal planetary gear set 20. The output element of the clutch B, which said element serves as inner disk carrier 62 embraces a short cylindrical shaped section 66, which runs axially toward the principal planetary gear set 20, as well as a disk-like section 67, which attaches itself to the cylindrical shaped 66. The section 67 is further connected with the inner disk carrier 102 of the brake C and extends itself radially in the direction of the transmission central axis up to the second sun gear shaft 7. Sun gear shaft 7 runs coaxially above the first sun gear shaft 6 and is affixed thereto. The output element of the clutch B is connected to the large sun gear of the principal planetary gear set 20.

The servo apparatus 63 of the clutch B is axially placed between the disk-like section 65 of the input element of the clutch B, which serves as outer disk carrier 60 and the disk-like section 45 of the input element of the clutch A, which said section serves as outer disk carrier 42. Said servo apparatus 63 further advantageously borders on these two disk-like sections 65, 45. The servo apparatus 43 of the clutch A is placed axially between the disk-like section 45 of the input element of the clutch A and the predominately disk-like inner disk carrier 42 of the clutch A. Advantageously, the servo apparatus 43 of the clutch A is found to be directly bordering on the disk-like section 45.

The clutch A lies thus completely within the clutch space of the clutch B, wherein its position is fixed, by means of the cylindrical shaped outer disk carrier 60 and the cylindrical shaped section 66 of the inner disk carrier 62 of the clutch B.

In an advantageous manner, both servo apparatuses 43, 63 of the clutches A, B rotate continually with the output speed of rotation, namely $n_{vs}$ of the primary planetary gear set 10. In this way, an empty run of the piston space—and insofar as foreseen, also the pressure compensation space—of the two clutches A, B, in their non-engaged state, is avoided and thus the shifting comfort upon successive shiftings is improved.

The support plate 35 connects axially and in the direction of the principal planetary gear set 20 to the brake C and the disk-like section 67 of the output element of the clutch B. Accordingly, the support plate 35, in the illustrated example, is shown as a separate component and connected with the transmission housing 30, whereupon it takes over additional support functions, namely for the second sun gear shaft 7 as well as the bearing for the spur gear 9, which is directly contiguous to the support plate 35, on that side thereon which is proximal to the principal planetary gear set 20.

As has already been explained in the introductory passages of the description of FIG. 10, the principal planetary gear set 20, the brake D and the clutch E are located likewise on the that side of the support plate 35 which is remote from the primary planetary gear set 10. Accordingly, the principal planetary gear set 20 borders directly on the spur gear 9 and the output shaft 4 which is actively bound with the spur gear 9. The principal planetary gear set 20 is also placed on that side of the spur gear 9, which is remote from the support plate 35. Without change, the internal gear 27 forms the output element of the principal planetary gear set 20 and is connected to the spur gear 9. The brake D, by means of which the coupled spiders 25, 26 of the exemplary Ravigneaux Gear Set are secured, operates without disks, and on this account is economical in assembled length and is located radially above the internal gear 27 of the principal planetary gear set 20. The clutch E borders directly on a housing outer wall of the transmission housing 30, which lies on the side of the transmission housing which is opposite to the transmission housing wall 31. The input drive shaft 3 of the multistage transmission is installed centrally through the principal planetary gear set 20 and on that side of the principal planetary gear set 20 which is remote from the spur gear and bound to the outer disk carrier 70 of the clutch E. Accordingly, the outer disk carrier 70 of the clutch E is advantageously designed as a cylinder, open in the direction of the principal planetary gear set 20. The disks 71 of the clutch E are advantageously designed to be of large diameter, which thereby brings about the result of having a lesser number of disks. The inner disk carrier 72 forms the output element of the clutch E and is bound to the coupled spiders 25, 26 of the principal planetary gear set 20. The servo apparatus 73 of the clutch E is, for example, placed within the cylindrical shaped outer disk carrier 70 and borders, in an axial direction, the inner disk carrier 72 of the clutch E. In an advantageous manner, the servo apparatus 73 rotates always with the transmission input shaft rotary speed $n_{ein}$, whereby an empty run of a piston space of the clutch E—and, to the extent it may be present, an empty run of the pressure compensation space of a dynamic pressure compensation of the clutch E—is avoided.

In an assembly of the arrangement of components, as set forth in FIG. 10, provision can be made that the motor shaft 1 and therewith the (not shown) drive motor can be placed on that side of the multistage transmission on which the principal planetary gear set 20 and the clutch E find themselves, also, on that side of the planetary gear set 10 which is remote from the principal planetary gear set 20, on that side of the clutch E which is remote from the principal planetary gear set 20. In such an arrangement, the cover 36 can be correspondingly placed on the transmission housing wall 31 where it could also be made of one-piece construction therewith. The placement of the principal planetary gear set 20 proximal to the motor has acoustic advantages because of the lessened noise radiating surfaces in the area of the multi-membered, principal planetary gear set 20 and is especially of value, when the principal planetary gear set 20 is built as a Ravigneaux Gear Set. The Ravigneaux Gear Set is a very compact, space saving design of a two-spider, four shaft gear drive, yet known to be acoustically critical because of the stepwise planetary construction.

Figure 11:
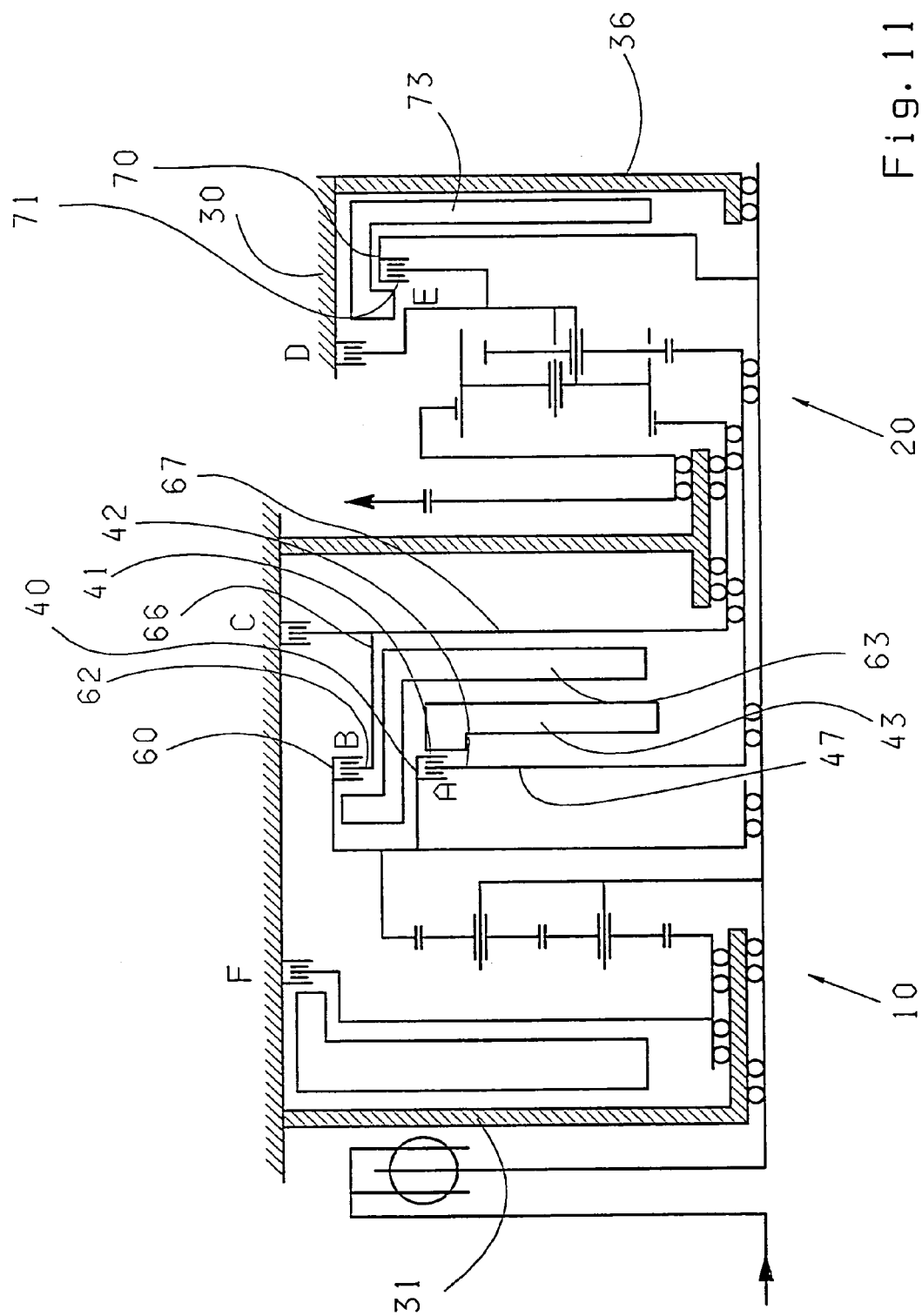
FIGS. 11 and 12 is a forward and a second embodiment of the fifth component arrangement in accordance with FIG. 10.
Figure 12:
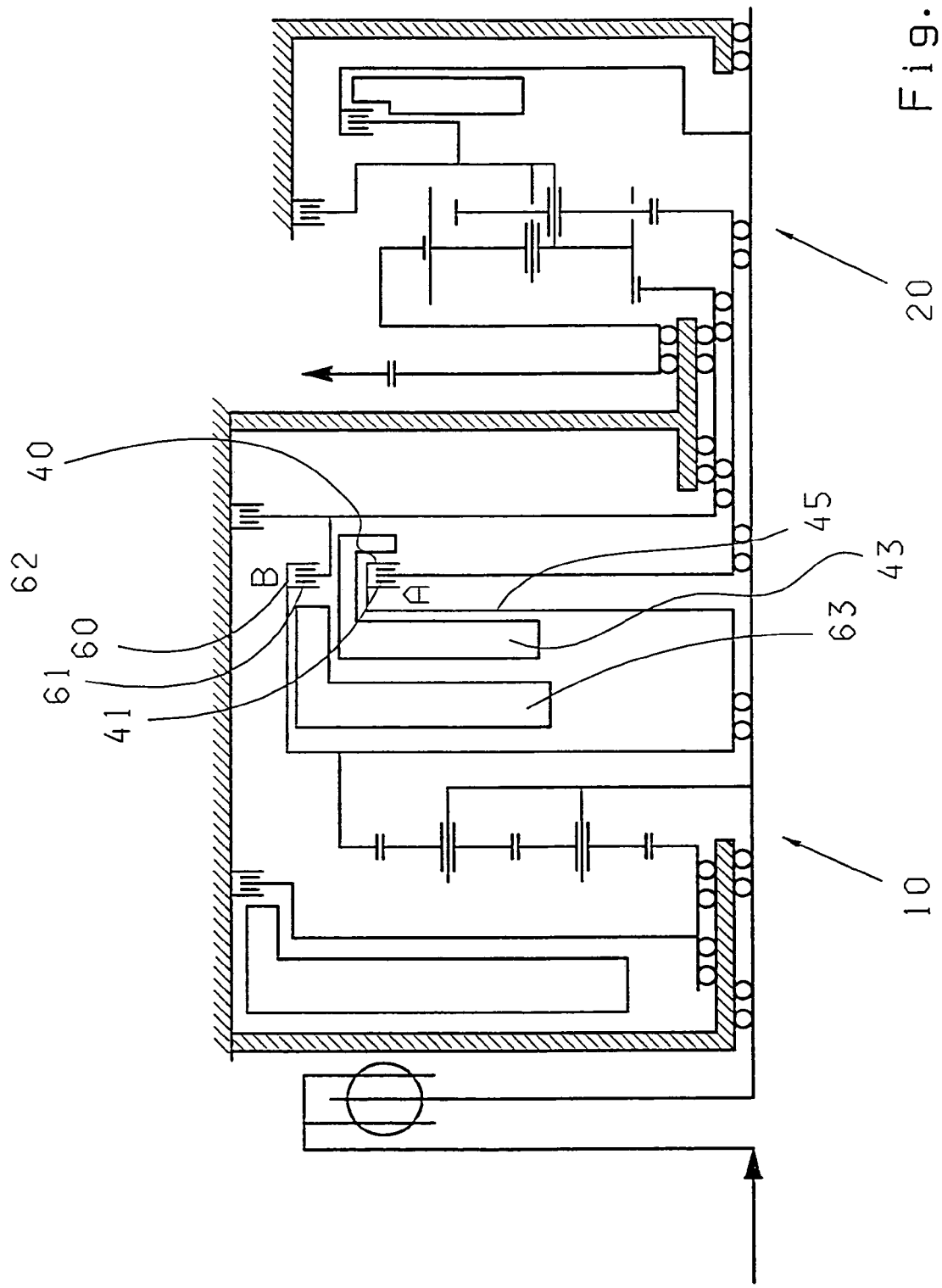

Derived from the described, exemplary component assembly as shown in FIG. 10, FIGS. 11 and 12 show two different versions for the spatial arrangement of the servo apparatuses 43, 63, and the clutches A and B. Here, the spatial apportionment of the disks 41, 61 of the two clutches A, B, relative to the primary planetary gear set 10 and the principal planetary gear set 20, to the spur gear 9 and to the other shifting elements C to F, remains unchanged as compared to the arrangement exhibited in FIG. 10. Even so, without change, the outer disk carriers 40, 60 form the respective input elements of the clutches A, B and inner disk carriers 42, 62 represent the respective output elements.

As a difference from FIG. 10, in the formation in accordance with FIG. 11, the proposal is that the servo apparatus 43 of the clutch A, which is placed on that side of the disks 41 of the clutch A, which side is remote from the primary planetary gear set 10, and be directly axially bordering to the inner disk carrier 42 of the clutch A, especially, the servo apparatus 43 is to be directly bordering on the disk-like output element 47 of the clutch A. The disks 41 of the clutch A are also now activated by their side which is remote from the primary planetary gear set 10.

Further, the proposal in accordance with the embodiment shown in FIG. 11, is that the servo apparatus 63 of the clutch B, at least partially axis-parallel, in the direction of the principal planetary gear set 20, is to directly border on the servo apparatus 43 of the clutch A, whereby an activation element of the servo apparatus 63 of the clutch B extends radially underneath the cylindrical section 66 of the output element of the clutch B, which is serving as inner disk carrier 66 of the clutch B, but radially above the servo apparatus 43 and the outer disk carrier 40 of the clutch A, and running axially in the direction of the primary planetary gear set 10 bypasses the disks 61 of the clutch B due to their inside diameter but activates the same disks on their side which is proximal to the primary planetary gear set 10. On their side, which is proximal to the principal planetary gear set 20, the servo apparatus 63 of the clutch B borders on the disk-like section 67 of the inner disk carrier 62 of the clutch B.

In an advantageous manner, it is possible that the two servo apparatuses 43, 63 respectively of the clutches A, B can be preassembled within the cylindrical shaped inner disk carrier 62 of the clutch B, thus forming an assembled component together with the inner disk carriers 42, 62 of the two respective clutches A, B.

Likewise in FIG. 11, shown as an example in FIG. 10, is shown an alternative arrangement of the servo apparatus 73 of the fifth shifting element E. The servo apparatus 73 now borders directly on an outer wall of the transmission housing 30, otherwise designated as cover 36, which finds itself on that side of the multistage transmission which lies opposite to the transmission housing wall 31. In the illustrated embodiment shown in FIG. 10, the cover 36 is designed as a separate component which is affixed to the transmission cover 30. However, provision can also be made, that the cover 36 and the transmission housing 30 can be made as a one-piece construction. The servo apparatus 73 of the clutch E, in this embodiment, is no longer located within the cylindrical shaped outer disk carrier 70 of the clutch E. In the arrangement shown, an activation element bypasses the servo apparatus 73 in the axial direction, radially above the outer disk carrier 70 and activates the disks 71 of the clutch E on the side thereof, which is proximal to the spur gear 9.

Obviously, it is possible that the exemplary arrangement shown in FIG. 10 of the servo apparatus 73 of the clutch E can be replaced by the alteration as shown in FIG. 11 of the servo apparatus 73. The same applies in the following FIGS. 12 to 16, in regard to the respective presentations of the servo apparatus 73.

FIG. 12 shows, as compared to FIG. 10, an alternative formation for the spatial placement of the servo apparatuses 43, 63 of the clutches A and B. The spatial arrangement of the servo apparatus 63 of the clutch B corresponds to that shown in FIG. 10. However, as a difference from FIG. 10, the servo apparatus 43 of the clutch A is now to be found bordering directly on the servo apparatus 63 of the clutch B. The servo apparatus 63 of the clutch B is thus nearer to the primary planetary gear set 10 than is the servo apparatus 43 of the clutch A. Spatially, the servo apparatus 43 of the clutch A is placed on that side of the outer disk carrier 30 which is proximal to the primary planetary gear set 10 and the disks 41 of the clutch A and advantageously directly bordering on the disk-like section 45 of the outer disk carrier 40. In this case of this arrangement, an activation element of the servo apparatus 43 of the clutch A bypasses—radially underneath the disks 61 of the clutch B—axially in the direction of the principal planetary gear set 20 and radially above the outer disk carrier 40 and the disks 41 of the clutch A to activate the disks 41 on their side which is distal from the primary planetary gear set 10.

Both servo apparatuses 43, 63 of the clutches A, B are also placed at least predominately within the cylinder shaped outer disk carrier 60 of the clutch B and, in common with the two outer dick carriers 40, 60 of the clutches A, B can be preassembled as a compact component. Is in the case of the arrangement in accordance with FIG. 10, both servo apparatuses 43, 63 rotate continually with the output speed of rotation $n_{vs}$ of the primary planetary gear set 10, whereby an empty run of the piston space or the pressure compensation space of the clutches A, B (when in the non-engaged state) are avoided.

Figure 13:
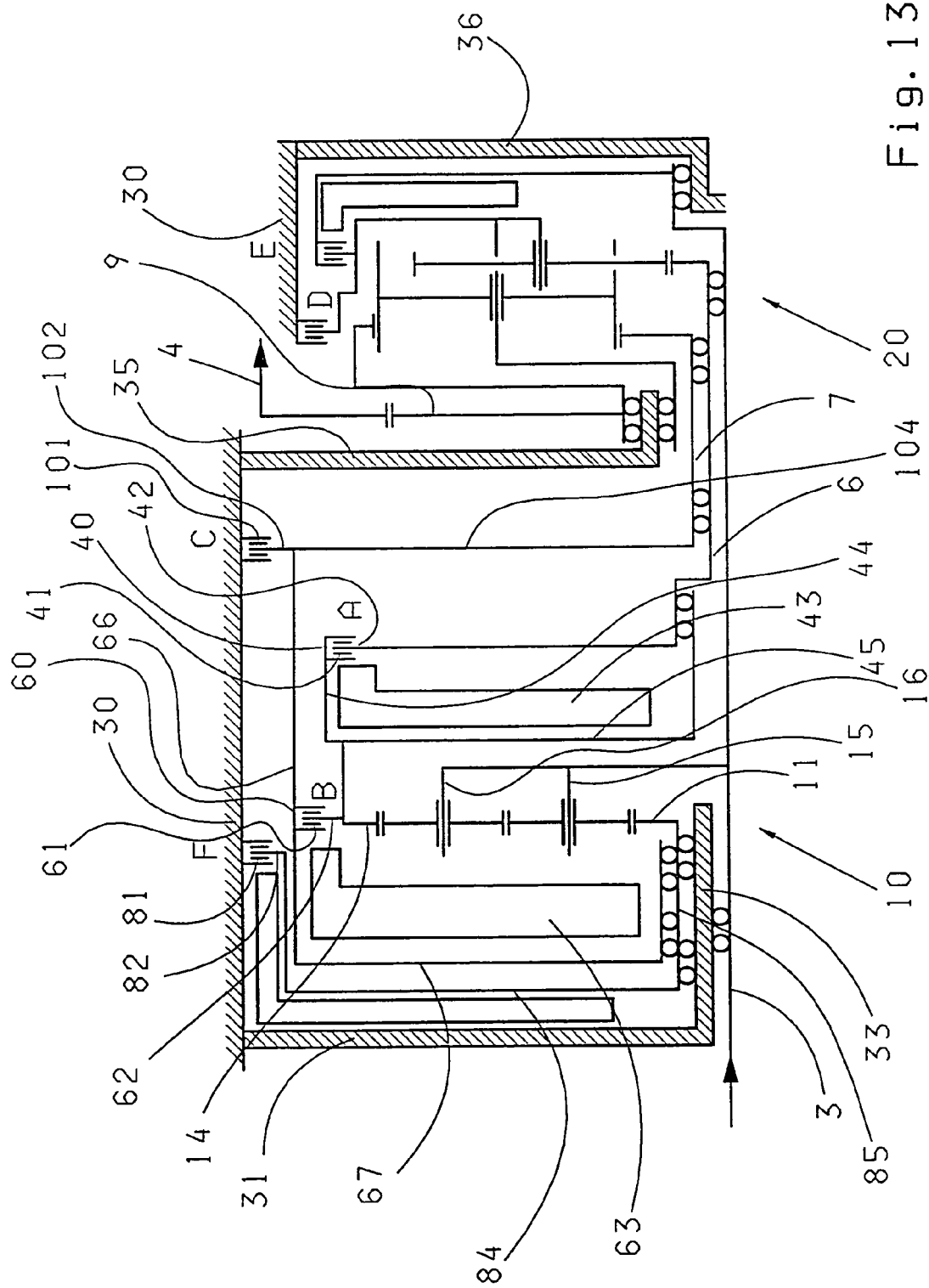
FIG. 13 is a sixth component arrangement variant of the transmission in accordance with FIG. 1, wherein the input and output drive shafts are axially parallel.

FIG. 13 now shows a sixth exemplary component arrangement variant of the multistage transmission with the first invented primary planetary gear set variant, and advantageously an axis parallel input and output drive. Under these circumstances, the basic structure of the construction of the transmission is, essentially, that same structure which was explained in a detailed manner for FIG. 10. Together in a first compartment of the transmission housing 30 are to be found: brake F, primary planetary gear set 10, clutch A, clutch B and brake C. The said first compartment extends between transmission housing wall 31 and the support plate 35. Correspondingly, the spur gear 9, the output drive shaft 4, the principal planetary gear set 20, the brake D and the clutch E are to be found together in a second compartment of the transmission housing 30, which compartment extends itself from the support plate 35 to the cover 36, which is affixed to the end of the transmission housing 30 and lies opposite to the transmission housing wall 31. Completely taken from the design shown in FIG. 10 is the component arrangement of the spur gear 9, output drive shaft 4, the principal planetary gear set 20, brake D and clutch E as located within this second compartment. Likewise, taken from FIG. 10 is the power path type connection of the principal planetary gear set 20 and the clutch E on the input drive shaft 3 and the first and second sun gear shafts 6, 7, whereby all three shafts 3, 6, 7 run coaxially, one above the other and penetrate centrally through the support plate 35.

The illustrated arrangement of the brake F, as seen in FIG. 13, this being within the first compartment of the transmission housing 30, wherein the brake F borders directly on the transmission housing wall 31, represents the arrangement explained in FIG. 10. The disk shaped section 84 of the inner disk carrier 82 of the brake F extends along the transmission housing wall 31 radially in the direction of the input drive shaft 31 up to the sun gear shaft 85 of the primary planetary gear set 10, which is placed above the input drive shaft 3 on the cylindrical shaped projection 33 of the transmission wall 31, which projection extends itself to the primary planetary gear set 10. The sun gear shaft 85 is connected to the sun gear 11 of the primary planetary gear set 10. Accordingly, the primary planetary gear set 10—similar to FIG. 10—is placed axially in the direction of the support plate 35, that is to say, toward the principal planetary gear set 20 beside the brake F, and its input element is connected on its side which is proximal to the principal planetary gear set 20 with a input drive shaft 3, but however, no longer borders directly on the disk shaped section 84 of the inner disk carrier 82 of the brake F.

The input element of the clutch B, which is connected with the internal gear 14 of the primary planetary gear set 10, is now designed as the inner disk carrier 62. The disks 61 of the clutch B are placed at least partially, in the radial direction, above the internal gear 14. The output element of the clutch B functions as an outer disk carrier 60, and is a cylinder opening in the direction of the principal planetary gear set 20 with a cylindrical section 66, which extends axially in a wide range of the first compartment of the transmission housing 30, extending itself from the disk shaped section 84 of the inner disk carrier 82 of the brake F up to the disks 101 of the brake C. In this way, the brake C borders directly on that side of the support plate 35 which is proximal to the primary planetary gear set 10. A portion of the cylindrical section 66 runs radially underneath the disks 81 of the brake F. On the side of the outer disk carrier 60, which is proximal to the transmission housing wall 31, a disk-like section 67 of the output element of the clutch B connects itself onto the cylindrical section 66 which—directly bordering on the disk-like section 84 of the inner disk carrier 82 of the brake F—extends centrally in the direction of the input drive shaft 3 up to a support section, which is placed on the sun gear shaft 85 of the primary planetary gear set 10. On the open side of the cylinder shaped, outer disk carrier 60 of the clutch B, is found the cylindrically shaped section 66 connected with the inner disk carrier 102 of the brake C, which has a disk-like section 104, which is conducted centrally inward up to the second sun gear shaft 7, by means of which it is connected to the second input element of the principal planetary gear set 20. In an assembled example, the second sun gear shaft 7 is placed coaxially above the first sun gear shaft 6, this can, however, additionally or exclusively be placed in the support plate 35.

The servo apparatus 63 of the clutch B is placed axially between the disk-like section 67 of the output element of the clutch B, which is serving as an outer disk carrier 60 and the primary planetary gear set 10, preferably directly bordering thereon. Because of the necessary construction width of the servo apparatus 63, the positioning base of the outer disk carrier 60 of the clutch B must necessarily be relatively wide.

The clutch A is placed on that side of the primary planetary gear set 10, which is proximal to the principal planetary gear set 20, and borders on the primary planetary gear set 10. The outer disk carrier 40 of the clutch A, functioning as its input element, is connected with the internal gear 14 of the primary planetary gear set 10 and is constructed as a cylinder, which is open in the direction of the principal planetary gear set 20. The input element of the clutch A includes a cylindrical section 44 and a disk-like section 45. The disk-like section 45 borders, in this arrangement, the coupled spiders 15, 16 of the primary planetary gear set 10 and extends itself centrally in the direction of the input drive shaft 3 up to a support section, where, advantageously, it finds itself closely placed above the outside diameter of the input drive shaft 3 and can also be supported on the input drive shaft 3. The output element of the clutch A is designed as an inner disk carrier 42, which, in the finished product, is essentially disk-like and extends centrally in the direction of the input drive shaft 3 up to a support section on which the outer disk carrier 60 of the clutch A is located and there to connect with the first input element of the principal planetary gear set 20.

The servo apparatus 43 of the clutch A is spatially positioned between the primary planetary gear set 10 and the disks 41 of the clutch A, completely inside of the cylinder shaped outer disk carrier 40 of the clutch A, preferably bordering on the disk-like section 45 of the input element of the clutch A. In an advantageous manner, the servo apparatus 43 of the clutch A rotates continually with the output speed of rotation $n_{vs}$ of the primary planetary gear set 10.

Figure 14:
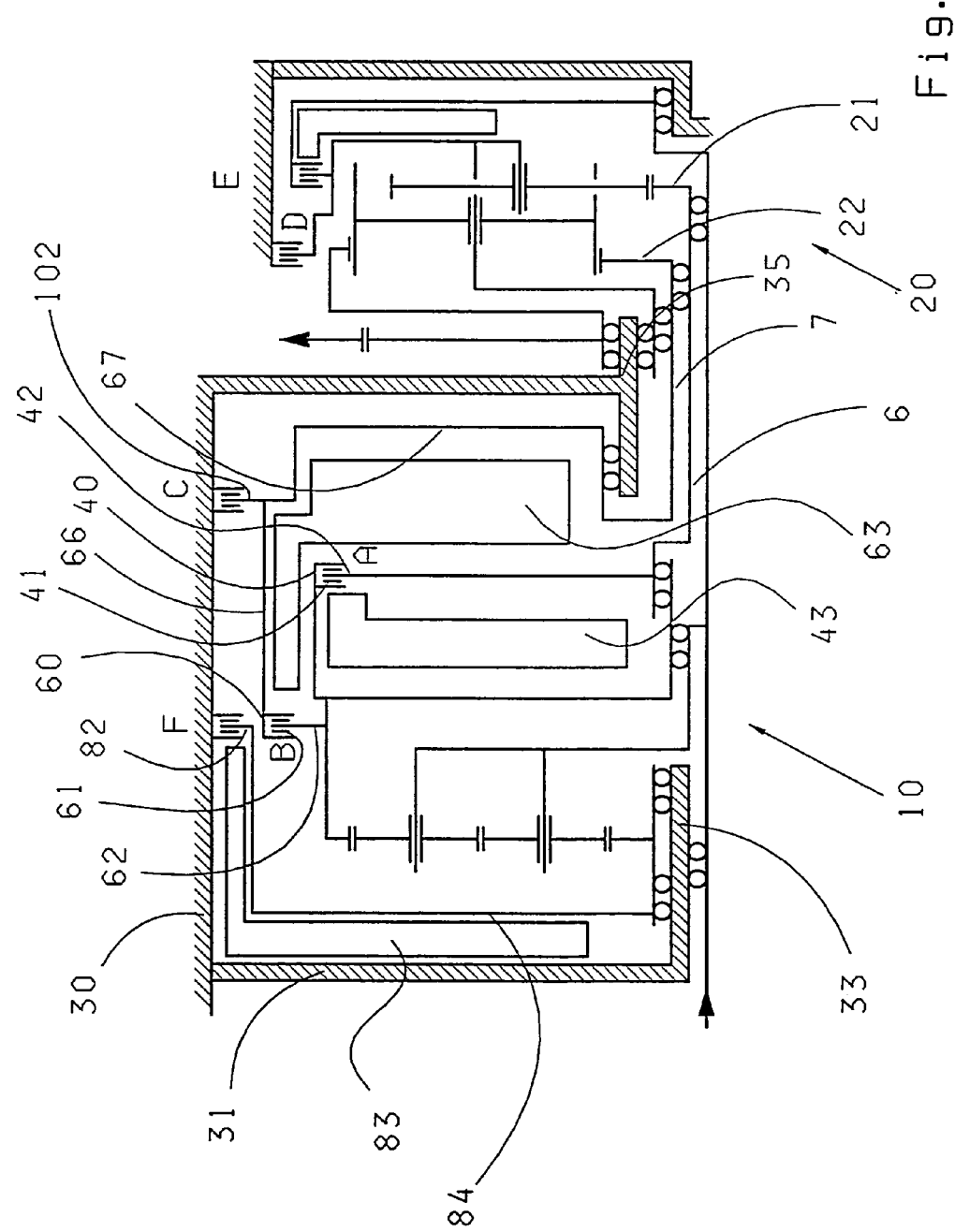
FIGS. 14 and 15 are a forward and a second embodiment of the sixth component arrangement variant in accordance with FIG. 13.
Figure 15:
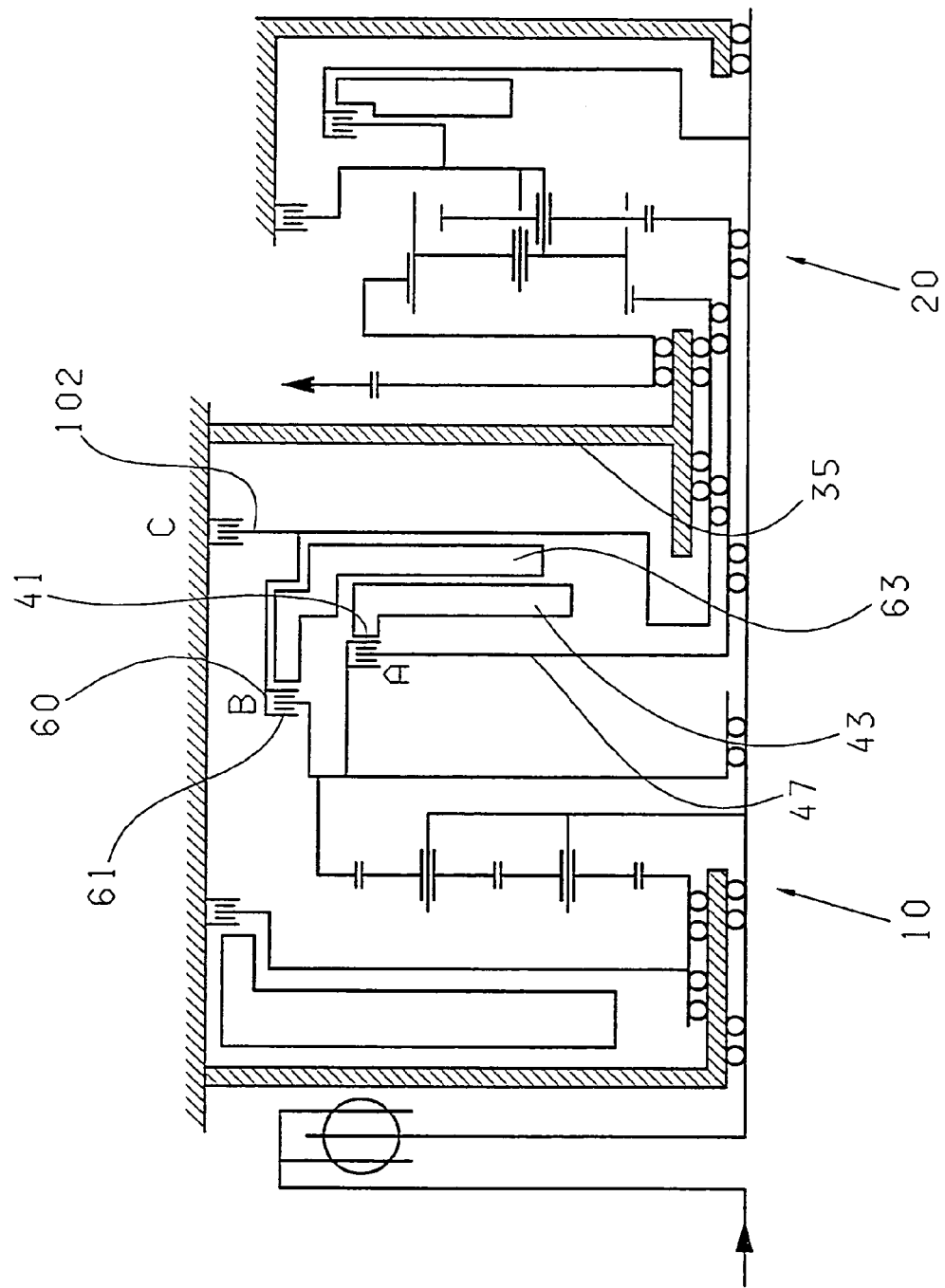

Using the exemplary component arrangement as shown in FIG. 13, FIGS. 14 and 15 show two embodiments for the arrangement of the servo apparatuses 43, 63 of the clutches A and B. As is to be seen in FIG. 14, in a first embodiment, proposed is, that the servo apparatus 63 of the clutch B—where the position of disks 61 of the clutch B is not changed, at least partially in the radial direction above the primary planetary gear set 10—onto which is to be placed that side of the primary planetary gear set 10 which is proximal to the principal planetary gear set 20, the position being axially in the direction of the principal planetary gear set and bordering on the clutch A. Advantageously, in this arrangement, a portion of the servo apparatus 63 of the clutch B borders directly on the predominately disk-like designed inner disk carrier 42 of the clutch A. An activation element of the servo apparatus 63 extends radially between the outer disk carrier 40, which forms the input element for the clutch A, and a cylindrical section 66 of the output element of the clutch B, serving as outer disk carrier 60 of the clutch B, this being axial in the direction of the primary planetary gear set 10 up to the disks 61 of the clutch B. The disks 61 of the clutch B were also, as a difference to FIG. 13, now activated on their side which is proximal to the principal planetary gear set 20.

Correspondingly, the outer disk carrier 60 of the clutch B is designed as a cylinder opening in the direction of the primary planetary gear set 10 of the transmission housing wall 31. On the cylindrical section 66 of the output element of the clutch B, there is connected an at least partially disk-like section 67 of the output element of the clutch B, which borders on the support plate 35 and, within the zone of its outside diameter, is in connection with the inner disk carrier 102 of the brake C. In the area of its inside diameter, it is bound to the second sun gear shaft 7. In an advantageous manner, the outer disk carrier 60, is placed by means of a relatively broad bearing connection on a cylindrical projection of the support plate 35, which extends in the direction of the primary planetary gear set 10.

As may be seen in FIG. 14, the servo apparatus 83 of the brake F, as a result of the other spatial arrangement of the servo apparatus 63 of the clutch B is now nearer to the primary planetary gear set 10 than is the case in accordance with FIG. 13. Especially, now the disk-like section 84 of the inner disk carrier 82 of the brake F borders directly axially to the primary planetary gear set 10.

In an advantageous manner, this arrangement enables a simple means of mounting of the individual components. Thus, it is possible, that the cylindrical outer disk carrier 60 of the clutch B, which, advantageously, forms simultaneously the inner disk carrier 102 of the brake C can be preassembled with the servo-apparatus 43, the disks 41 and the inner disk carrier 42 of the clutch A, together with the inner disk carrier 62 of the clutch B, all as a first component group, as well as the cylindrical outer disk carrier 60 with the servo apparatus 63 and the disks 61 of the brake B can be preassembled as a second component group. Subsequently these first and second component groups themselves can be simply preassembled together and placed in the transmission housing 30 as one complete, installable component.

In FIG. 15, presented as a second embodiment of the spatial arrangement of the servo apparatuses 43, 63 of the clutches A, B, the proposal is made, which deviates from the previously described component arrangements in accordance with FIG. 13 and FIG. 14, that the respective disks 41, 61 of both clutches A, B are now to be activated from that side which is proximal to the support plate 35. The spatial position of the disks 41, 61, relative to the planetary gear sets and other shifting elements, is now at least essentially identical to FIGS. 13 and 14.

The spatial location and design of the outer disk carrier 60 of the clutch B, which are presented in FIG. 15, along with the spatial positioning of the servo apparatus 63 of the clutch B within the cylindrical outer disk carrier 60 were entirely taken over from FIG. 14. In the differences to FIG. 14 and as well to FIG. 13, provision has been made, that the servo apparatus 43 of the clutch A on that side of the disks 41 remote from the primary planetary gear set 10, between the disks 41 of the clutch A and the servo apparatus 63 of the clutch B, advantageously axially directly bordering on the disk-like section 47 of the output element of the clutch A which is serving as the inner disk carrier 42. In this way, the servo apparatuses 43, 63 of the clutches A, B now lie together, whereby the clutch A is placed entirely within the clutch space of the clutch B, which is formed by the cylindrical outer disk carrier 60 of the clutch B.

The components A and B which are proposed in FIG. 15 to be boxed within one another enable a very simple pre-assembly of both clutches A, B as one construction entity.

Figure 16:
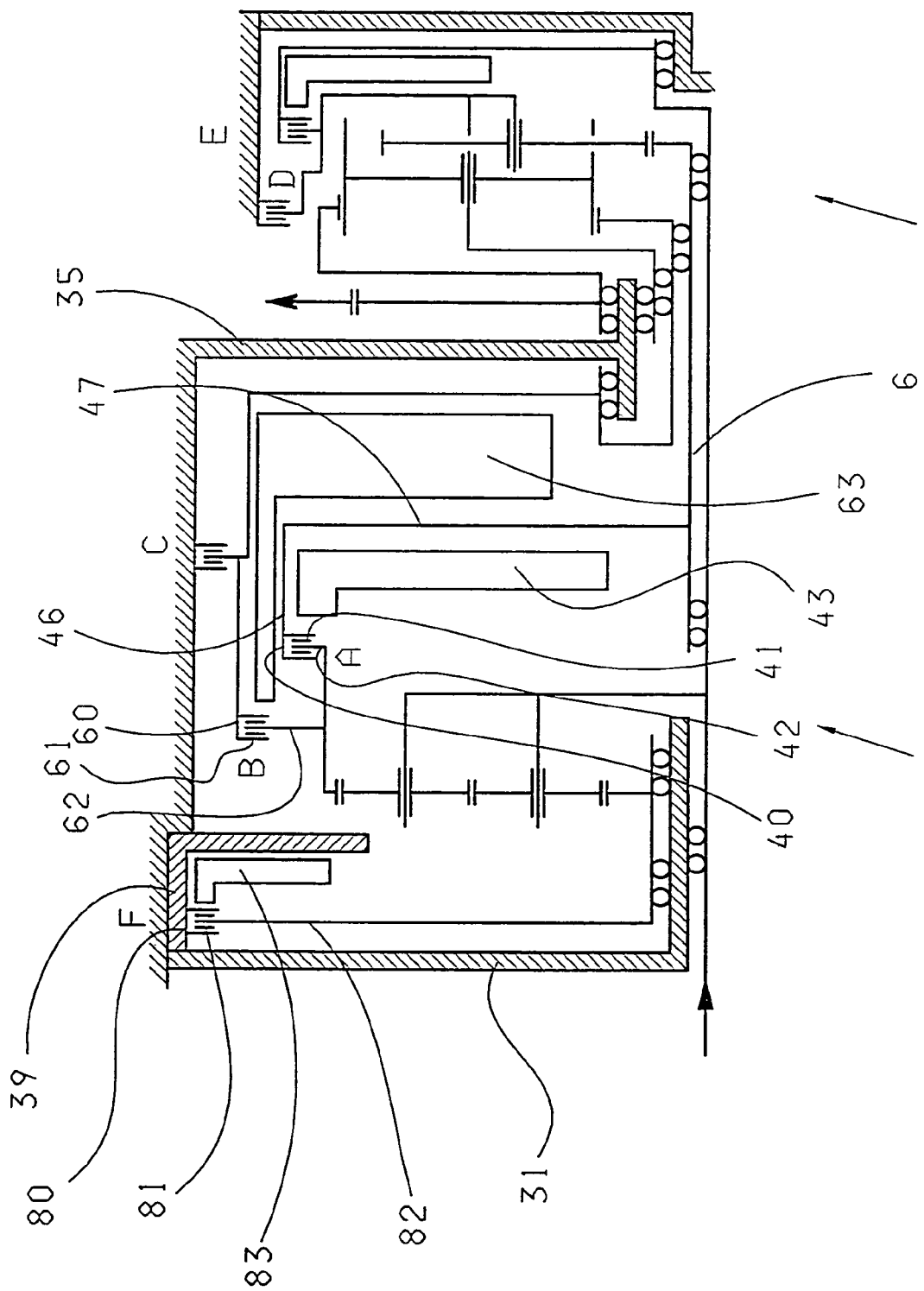
FIGS. 16 to 33 are a seventh up to a twenty-fourth component arrangement of the transmission in accordance with FIG. 1, wherein the input and the output shafts are axially parallel.

FIG. 16 shows now a seventh exemplary component arrangement variant of a multistage transmission with the first invented primary planetary gear set variant and the advantageous axis parallel input and output drive shafts. In this embodiment, the proposed variant in FIG. 16 exceeds by far the previous component arrangement as shown in FIG. 14. Essentially different is the conception of an input and output element of the clutch A and the placement of the servo apparatus 43 of the clutch A which emerged therefrom. The input element of the clutch A is now designed as an inner disk carrier 42, which is located on the inner disk carrier 62 of the clutch B, which is above the primary planetary gear set 10, in the direction of the principal planetary gear set 20. The outer disk carrier 40 of the clutch A forms its output element and is constructed as a cylinder, which opens in the direction of the primary planetary gear set 10. Accordingly, a cylindrical section 46 of the output element of the clutch A extends radially underneath the cylindrical outer disk carrier 60 of the clutch B, axially in the direction of the support plate 35, that is to say, in the direction of the principal planetary gear set 20 up to the servo apparatus 63 of the clutch B, which is placed within the cylindrical outside disk carrier 60. Onto this cylindrical section 46, there is connected a disk-like section 47 of the output element of the clutch A, which extends centrally to the inside to the first sun gear shaft 6, by means of which the outer disk carrier 40 of the clutch A is connected to the first input element of the principal planetary gear set 20. In this arrangement, the outer disk carrier 40 of the clutch A, advantageously has a smaller outside diameter than the inside diameter of the disks 61 of the clutch 5.

The servo apparatus 43 of the clutch A is spatially situated between the disks 41 of the clutch A and the disk-like section 47 of the output element of the clutch A which is serving as an outer disk carrier 40, and advantageously borders directly on the disk-like section 47. Thus the clutch A is entirely situated within the clutch B space formed by the cylindrical outer disk carrier 60.

The proposed component arrangement in FIG. 16 permits, especially, a simple installation of the necessary air play of the two clutches A and B. The outer disk carrier 40 of the first clutch A, which said carrier is preassembled with servo apparatus 43 and the disks 41, can, in a very simple manner, be inserted into the likewise preassembled outer disk carrier unit 60 of the clutch B with the servo apparatus 63 and disks 61. The subsequent assembly operation of the inner disk carriers 42, 62 of the clutches A, B in the respective disk packets can still be somewhat simplified, in that inner disk carriers 42, 62 can be made as one-piece.

As a variant of the arrangement of the servo apparatus 83 of the brake F, the proposal is, for example, to place this now between the inner disk carrier 82 and the primary planetary gear set 10. As is evident in the embodiments shown in FIGS. 1 and 5, the disks 81 of the brake F are also activated in the direction of transmission housing wall 31. For the reinforcement of the servo apparatus in the counter direction of the disks 81, in the presented embodiment a cylinder 39 is provided, which is bound with the transmission housing 30 and possesses a vertical wall, which borders, in that direction which is axially counter to that of the disks 81 and borders directly onto the servo apparatus 83. In this way, the cylinder 39 accepts the outer disk carrier 80 of the brake F. Obviously, it is possible, that cylinder 39 and the outer disk carrier 80 can also be made in one-piece, as was proposed, for example, in FIG. 5. Also, it is possible that the cylinder 39 can be integrated into the transmission housing 30.

Figure 17:
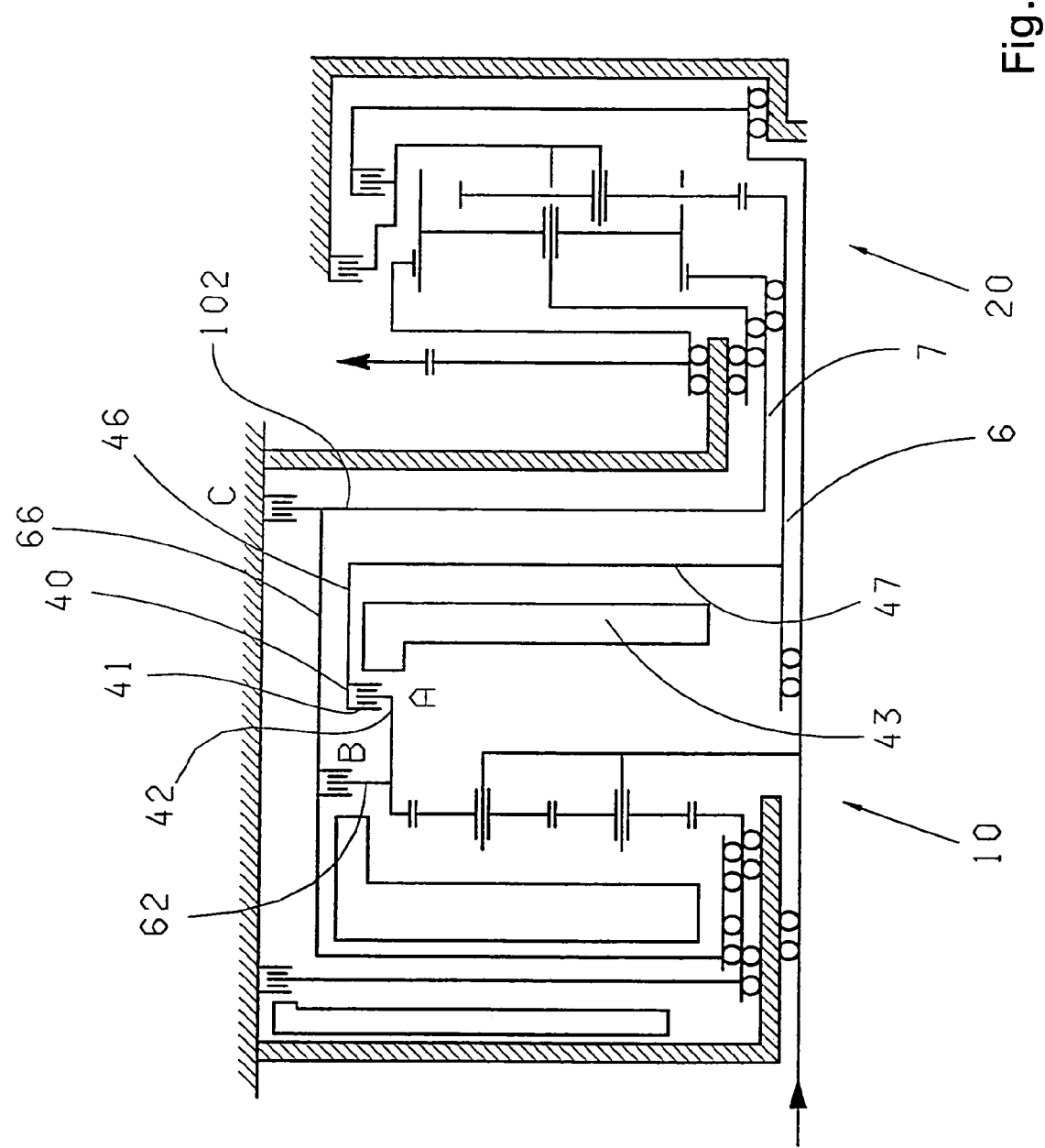

FIG. 17 shows a eighth example of a component arrangement variant of the multistage transmission with the first invented primary planetary gear set variant and advantageously, an axis parallel input and output drive shaft assembly. In this embodiment, the proposed variant shown in FIG. 17 far exceeds the previously described (as in FIG. 13) component arrangement. The difference in design lies mainly in the input and output element of the clutch A and the therefrom resulting advantageous arrangement of the servo apparatus 43 of the clutch A. The input element of the clutch A is now serving as an inner disk carrier 42, which locates itself on the inner disk carrier 62 of the clutch B which is found radially above the primary planetary gear set 10 in the direction of the principal planetary gear set 20. The outer disk carrier 40 of the clutch A forms its output element and is made as a cylinder which opens in the direction of the primary planetary gear set 10. Correspondingly, a cylindrical section 46 of the output element of the clutch A extends itself radially underneath cylindrical outer disk carrier 60 of the clutch B, axially in the direction of the principal planetary gear set 20, somewhat up to a disk-like inner disk carrier 102 of the brake C, which is connected to the second sun gear shaft 7. On this cylindrical section 46 of the output element of the clutch A serving as an outer disk carrier 40, there is connected a disk-like section 47, which extends centrally to the inside up to the first sun gear shaft 6, by means of which the outer disk carrier 40 of the clutch A connects with the first input element of the principal planetary gear set 20. Advantageously, the outside diameter of the outer disk carrier 40 of the clutch A, in this case, is slightly smaller than the inside diameter of the cylindrical section 66 of the output element of the clutch B, which said element is serving as an outer disk carrier 60, in order to achieve the greatest possible torque transmission capability of the clutch A upon a simultaneously, smallest possible number of disks.

The servo apparatus 43 of the clutch A is spatially located between the disks 41 of the clutch A and the disk-like section 47 of the output element of the clutch A, which said output element is serving as the outer disk carrier 40 and advantageously, the servo apparatus 43 is directly bordering on the disk-like section 47. The activation of the disks 41 of the clutch A is carried out, however, by their side which is remote from the primary planetary gear set 10. In this way, the output element of the of the clutch B completely bypasses the clutch A.

In the following FIGS. 18 to 22, are a ninth to a thirteenth exemplary component arrangement variant of a multistage transmission with the first invented primary planetary gear set variant and advantageously axis parallel input and output drives, wherein respectively, the sixth shifting element F is placed on that side of the primary planetary gear set 10 which is remote from the principal planetary gear set 20, on that side of the transmission housing 30 which is proximal to the drive shaft of the motor 1, and bordering on the transmission housing wall 31. Respectively, the first and the second shifting elements A, B are placed between the primary planetary gear set 10 and the principal planetary gear set 20. Accordingly, the primary planetary gear set 10 and both shifting elements A, B are placed together and the second shifting element B borders in the direction of the principal planetary gear set 20 on the primary planetary gear set 10. The first shifting element A borders on the second shifting element B, and the third shifting element C, by means of which the second input element of the principal planetary gear set 20 can be made fixed, is continually on that side of the principal planetary gear set 20 which is remote from the primary planetary gear set 10 and borders on an outer wall of the transmission housing 30 lying opposite to the drive motor 1, that is, opposite to the transmission housing wall 31. The second shifting element B is thus always placed nearer to the primary planetary gear set 10 than is the first shifting element A. The fifth shifting element E is placed, as seen in the direction of the input drive, always before the principal planetary gear set 20.

Figure 18:
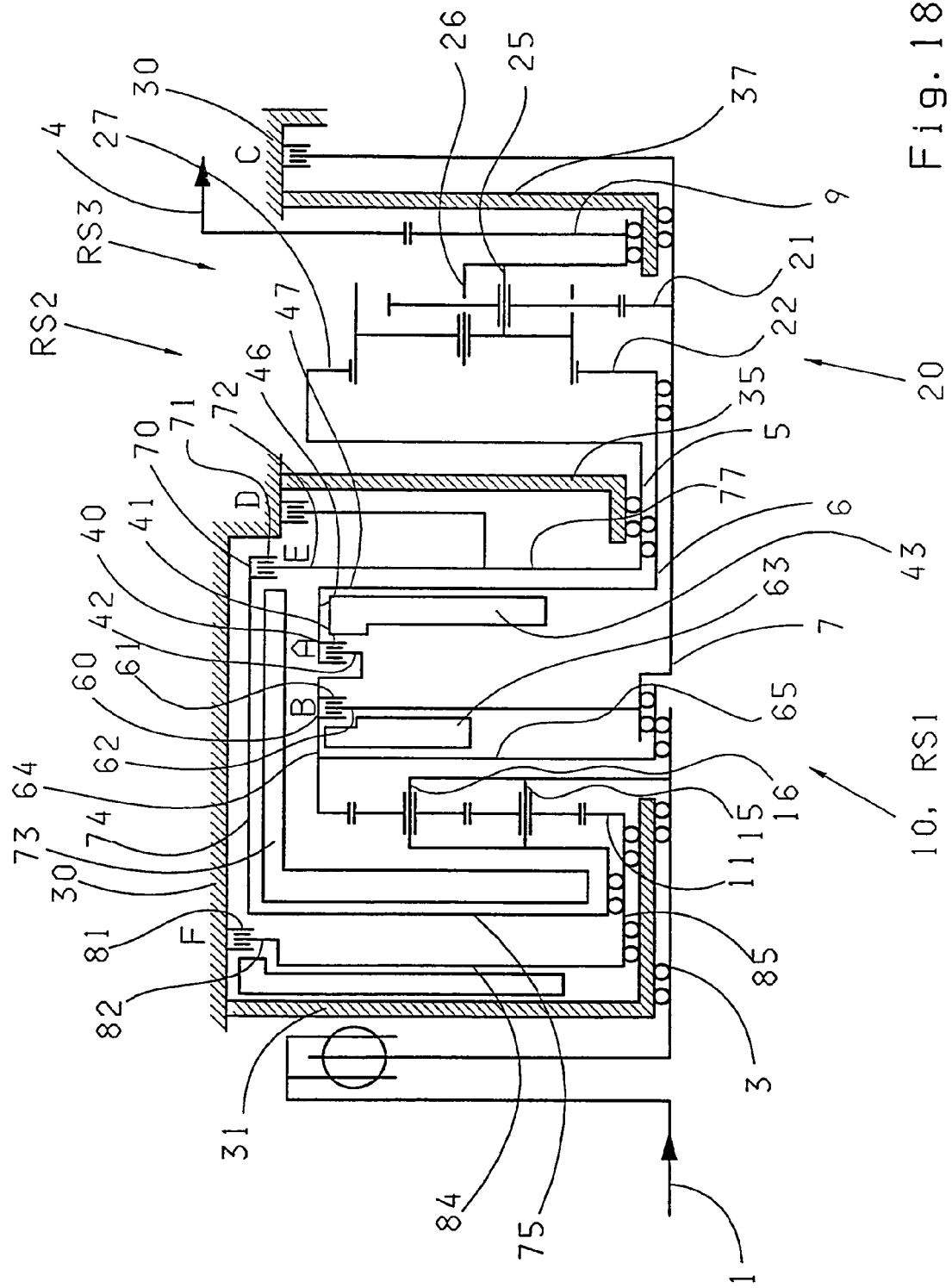
Figure 19:
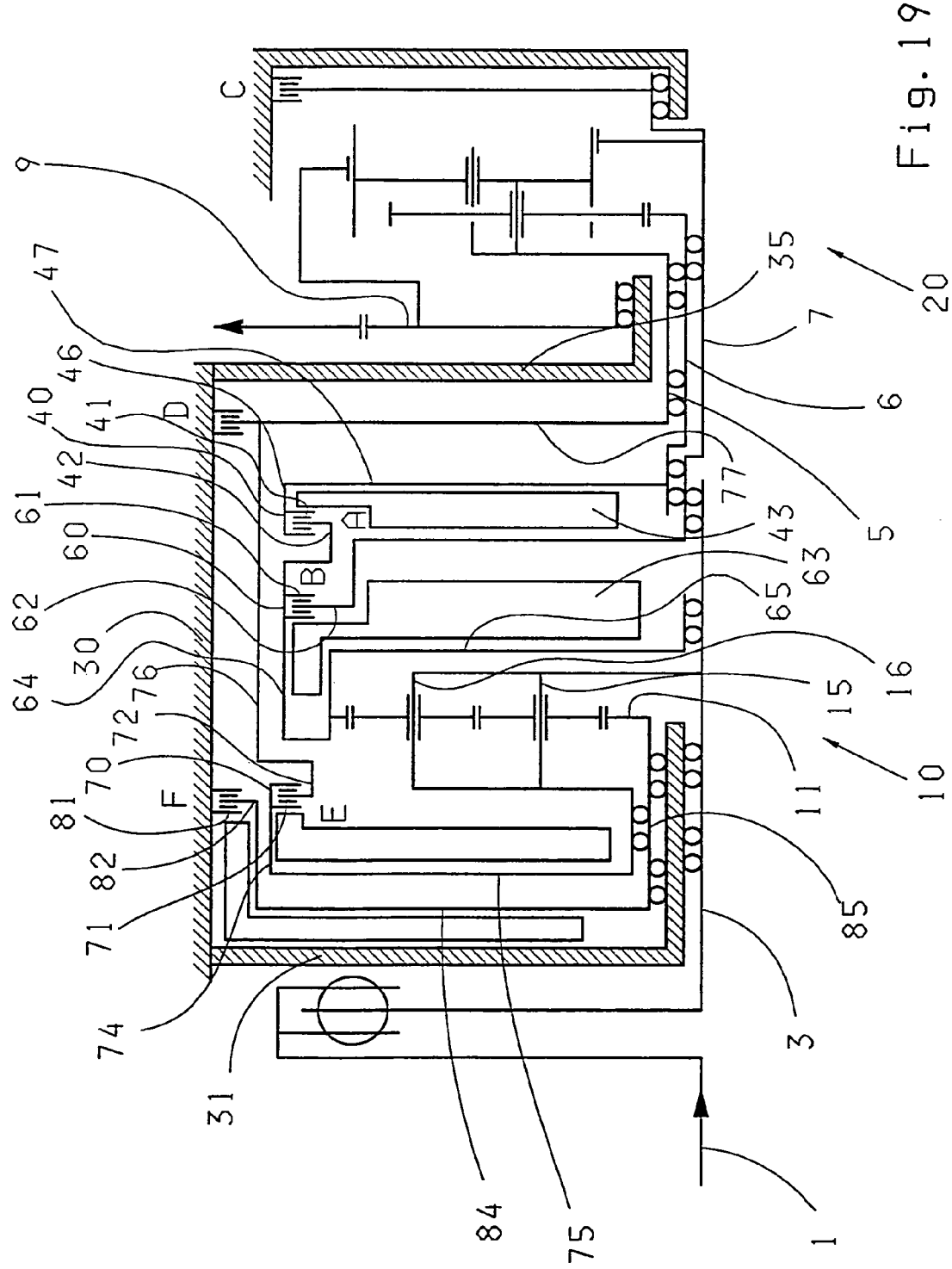
Figure 20:
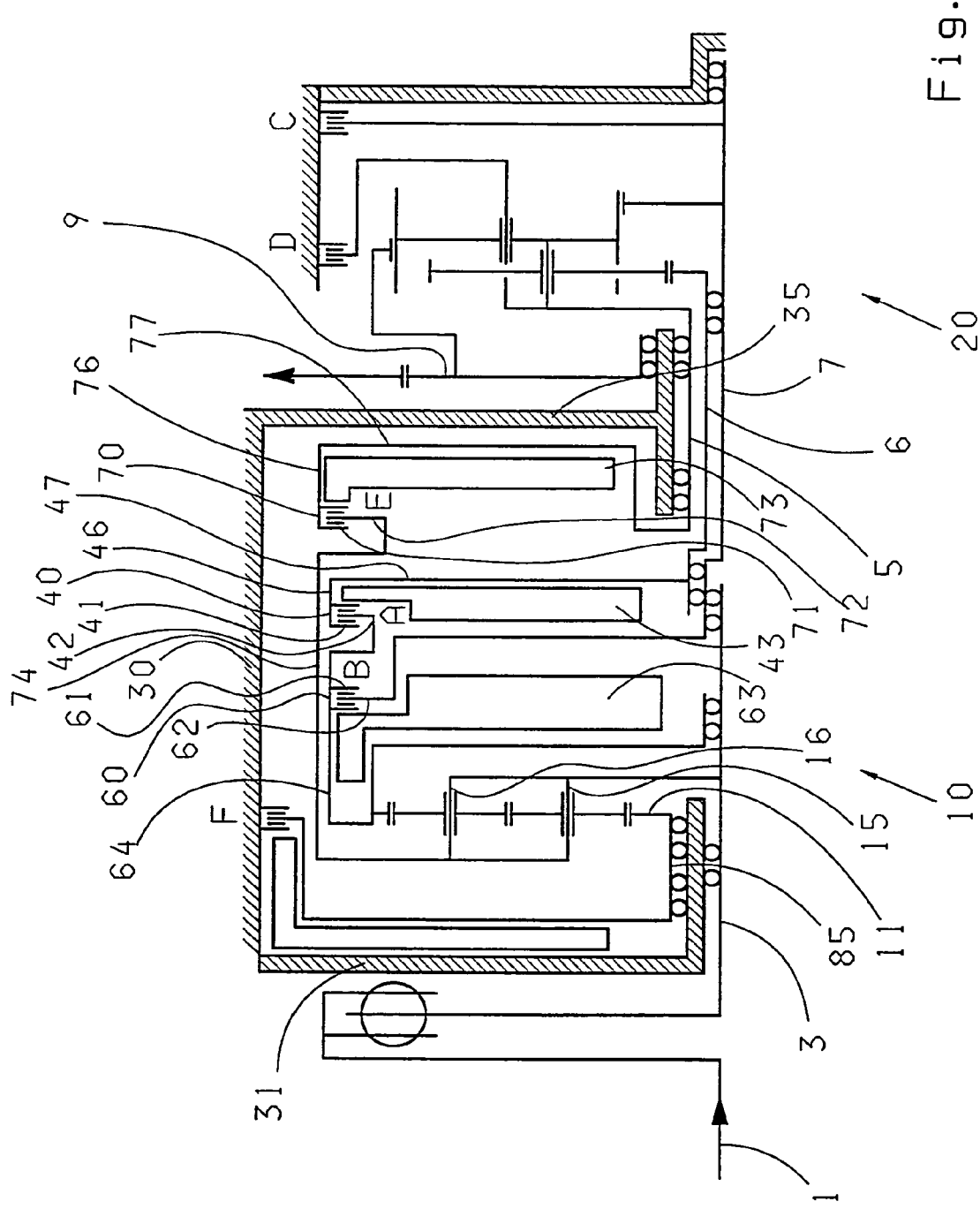

As in the case of the previously described arrangement-variants as shown in FIG. 3 to FIG. 17 as well as in the FIGS. 18 to 20, the inner disk carrier 82 of the sixth shifting element F, which is serving as a brake, and the sun gear 11 of the primary planetary gear set 10, are connected by means of the sun gear shaft 85 of the primary planetary gear set 10, which is bearingly supported on the projection 33 of the transmission housing wall 31. The already coupled spiders 15, 16 of the primary planetary gear set 10 are upon the side thereof, which is opposite to the brake F and bound to the input drive shaft 3. The internal gear 14 of the primary planetary gear set 10 is, respectively, connected to the outer disk carrier 60 of the second shifting element B which acts as a clutch and is likewise connected with the inner disk carrier 42 of the first shifting element A which also serves as a clutch. Respectively, by means of second sun gear shaft 7, which said shaft, different from the previous embodiment examples, is now centrally penetrating through the principal planetary gear set 20, the inner disk carrier 62 of the clutch B is joined with the second input element of the principal planetary gear set 20. Respectively, by means of the first sun gear shaft 6, which said shaft, different from the previous embodiment examples, is now coaxially aligned above the second sun gear shaft 7 is now connected to said shaft, the outside disk carrier 40 of the clutch A is connected to the first input element of the principal planetary gear set. The input element of the clutch E, by means of the coupled spiders 15, 16 of the primary planetary gear set 10 is continually bound with the input drive shaft 3. The output element of the clutch E is continually, by means of the third shaft 5, which, differentiated from the previous embodiment examples, is now placed on the second sun gear shaft 7 and/or secured in the support plate 35, and is connected to first input element of the principal planetary gear set 20. With this arrangement, the support plate 35, placed on the side of the existing component comprised of the spur gear 9 and the principal planetary gear set 20 is proximal to the primary planetary gear set 10, that is to say, to the clutches A, B. The disks 41 and 61 of the clutches A, B possess nearly the same diameter. The diameter of the disks 71 of the clutch E is approximately of equal, or greater size than the diameter of the disks 41, 61 of the clutches A, B. From the standpoint of the technology of the manufacture, it is advantageous if in this way, for instance, the same disks can be used for the clutches A and B.

In the ninth component arrangement variant, in accordance with FIG. 18, the proposal is, that the disks 71 of the clutch E be placed in the axial direction between the clutch A and the principal planetary gear set 20, preferably axially bordering on the outer disk carrier 40 of the clutch A, the servo apparatus 73 of the clutch E, at least partially, however, bordering on the that side of the primary planetary gear set 10, to which the clutch A is remote. The disks 71 of the clutch E are activated by their side which is proximal to the primary planetary gear set 10. In this arrangement, the input element of the clutch E is designed as an outer disk carrier 70, with a cylindrical section 74, which extends itself in the axial direction, radially above the clutches A and B from the disks 71 of the clutch E up to the area of the disks 81 of the brake F. In the area of the disks 81 the brake F connects on to this cylindrical shaped section 74 a disk-like section 75 of the input element of the clutch E and extends—directly bordering on the disk-like section 84 of the inner disk carrier 82 of the brake F—centrally in the direction of the input shaft 3 up to a support section, which extends axially to the sun gear shaft 85 of the primary planetary gear set 10 in the direction of the primary planetary gear set 10 and is located on this sun gear shaft 85. On that side of the support plate which is proximal to that of the primary planetary gear set 10, the outer disk carrier 70 of the clutch E is connected to the coupled spiders 15, 16 of the primary planetary gear set 10. With this arrangement, the coupled spiders 15, 16 penetrate the primary planetary gear set 10 in the axial direction. The servo apparatus 73 of the clutch E lies thereby within the cylindrical outer disk carrier 70, whereby an activation element of the servo apparatus 73 extends radially over the clutches A and B.

The fourth shifting element D, serving as a brake, by means of which the third input element of the principal planetary gear set 20 is fixed in place, borders, for example, axially in the direction of the principal planetary gear set 20 on the disks 71 of the clutch E, before the support plate 35. Remote from the primary planetary gear set 10, that is, on that side of the support plate 35 remote from the brake D, there immediately borders, for example, the principal planetary gear set 20, whereby the spur gear 9 is placed on that side of the principal planetary gear set 20 which is remote from the primary planetary gear set 10, that is to say, that side of the principal planetary gear set 20 which is remote from the (not shown) drive motor. On the side of the spur gear 9 which is remote from the principal planetary gear set 20 borders to the spur gear, a second support plate 37 by means of which the spur gear 9 is supported. The third shifting element C, serving as a brake, by means of which the second input element of the principal planetary gear set 20 is fixed in place, connects axially onto this said second support plate 37 and thus locates on the opposite side of the multistage transmission from the (not shown) drive motor.

In another embodiment provision can be made, that the support plate 35 axially borders, in the direction of the principal planetary gear set 20, the disks 71 of the clutch E and the brake D can be placed on that side of the support plate 35 which is remote from the primary planetary gear set 10.

For the arrangement of the servo apparatus 63 of the clutch B, FIG. 18 proposes to design the outer disk carrier 60 of the clutch B, which said carrier is connected with the internal gear 14 of the primary planetary gear set 10, as a cylinder opening in the direction of the principal planetary gear set 20. This input element of the clutch B possesses a cylindrical section 64 and a disk-like section 65, whereby the disk-like section 65 borders directly on the primary planetary gear set 10 and by means of a support section is placed upon the input drive shaft 3. Further, the proposal includes also the construction of the inner disk carrier 62 of the clutch B as the output element thereof, building this at least predominately in a platelike shape and that the servo apparatus 63 of the clutch B be placed axially between the platelike section 65 of the input element of the clutch B, which input element serves as outer disk carrier 60 and the disk-like inner disk carrier 62 of the clutch B. In this way, the servo apparatus 63 of the clutch B always rotates with the output speed of rotation $n_{vs}$ of the primary planetary gear set 10.

In another embodiment, the clutch B can also be so provided, that the servo apparatus 63 of the clutch B is placed on that side of the inner disk carrier 62 of the clutch B which is proximal to the principal planetary gear set 20.

For the arrangement of the servo apparatus 43 of the clutch A, in FIG. 18, the proposal is, that the inner disk carrier 42 of the clutch A be connected with the outer disk carrier 60 of the clutch B, also to construct the output element of the clutch A as an outer disk carrier 40 in the form of a cylinder opening in the direction of the primary planetary gear set 10 with a cylindrical section 46 and a thereon attached, disk-like section 47, as well as placing the servo apparatus 43 of the clutch A axially between the disk-like sections 67, 47 of the output element of the clutches B and A. In this arrangement, the disk-like section 47 of the output element of the clutch A, which element is also serving as an outer disk carrier 30, centrally connected with the first sun gear shaft 6 and by means of this, for example, becomes affixed on the support plate 35. Advantageously, the disk-like section 47 borders on its side which is remote from the primary planetary gear set 10 directly on a disk-like section 77 of the inner disk carrier 72 of the clutch E.

In another embodiment the clutch A can also be so provided, that the servo apparatus 43 of the clutch A is to be placed on that side of the outer disk carrier 40 of the clutch A which is proximal to the principal planetary gear set 20, whereby an activation element of the servo apparatus 43 radially bypasses the disks 41 of the clutch A in the axial direction of the primary planetary gear set 10 and activates the disks 41 from their side which is proximal to the primary planetary gear set 10.

In one embodiment, wherein the disk 71 of the clutch E possesses a greater diameter than the outside diameter of the outer disk carriers 60, 40 of the clutches B and A, it is possible that the brake F, the clutch E up to its inner disk carrier 72, the primary planetary gear set 10, the complete clutch B and the complete clutch A, successively, in a simple manner, can be placed within the transmission housing 30. In another embodiment, wherein the inner diameter of the disks 71 of the clutch E is smaller than the outside of the outer disk carriers 60, 40 of the clutches B and A, by means of generally the same assembly succession operations, naturally after the assembly of the clutch A, whereby—upon a given outside diameter of the transmission housing 30—compared to the previously proposed embodiment a totally larger disk diameter is allowable for the clutches A and B. The latter has favorable aspects for the dimensioning of the clutches A and B, which, when compared with the clutch E, must undergo in the most circumstances of shifting, a higher torque.

In the differences to the previous component arrangement variants, FIG. 18 displays a modified principal planetary gear set 20. The basic construction remains a Ravigneaux-Gear-Set with the individual planetary gear sets RS2 and RS3, however, in this case with a changed connection of the their so-called free shafts. The planetary gear set RS2 remains unchanged in its binding with the first shifting element A. The planetary gear set RS3 remains on the second and third shifting element B, C. The first input element of the principal planetary gear set 20 is now its large sun gear 22, the second input element is its small sun gear 21 and the third input element is its internal gear 27. In this arrangement, the large sun gear 22 is also now assigned to the planetary gear set RS2 and placed on that side of the principal planetary gear set 20 which is proximal to the primary planetary gear set 10. Correspondingly, the small sun gear 21 is now assigned to the planetary gear set RS3. The coupled spiders 25 and 26 form now the output element of the principal planetary gear set 20 and are actively bound with the output element of the output drive shaft 4. In the presented example of the multistage transmission, having an output drive transverse to its input drive, this effective binding is carried out as, possibly a helical spur gear 9 interlock with the transverse shaft. The takeoff drive over the coupled spiders 25, 26 has advantages in respect to lubrication means, since, upon the rotating output drive shaft 4—for example, while the vehicle is rolling—always a relative movement is present at the bolts of the planetary gears. In the under part of the FIG. 18 are shown the exemplary and deviating still ratios of FIGS. 2A, 2B of the individual gear sets RS1, RS2, RS3. In this matter, the single planetary gear set is denoted by RS1 of the primary planetary gear set 10, and RS2 and RS3 respectively stand for the individual planetary gear sets of the multistage, principal gear set 20.

In the tenth component arrangement variant in accordance with FIG. 19, is proposed, as an essential deviation from the variant according to FIG. 18, not only is the servo apparatus 73 of the clutch E placed on that side of the primary planetary gear set 10 which is remote from the principal planetary gear set 20, but also the disks 71 of the clutch E are so located. In the illustrated embodiment, the disks 71 are thus, in radial dimensioning, underneath the disks 81 of the brake F. Showing no change from FIG. 18, the input element of the clutch E is designed as an outer disk carrier 70 and servings as a cylinder opening in the direction of the primary planetary gear set 10 with a disk-like section 75, which borders on the disk-like section 84 of the inner disk carrier 82 of the brake F, upon which the sun gear shaft 85 of the primary planetary gear set 10 is supported in bearings and is bound with the coupled spiders 15, 16 of the primary planetary gear set 10, as well as with a cylindrical section 74, which extends itself in the radial direction underneath the disks 81 of the brake F. The servo apparatus 73 of the clutch E is now thus fully installed within the outer disk carrier 70 of the brake E.

The output element of the clutch E is made to serve as the inner disk carrier 72 and possesses a cylindrical section 76 and a disk-like section 77. The cylindrical section 76 extends itself in the axial direction completely over the clutches A and B. The disk-like section 77, which in the direction of the principal planetary gear set 20 attaches itself onto the disk-like section 76, extends itself centrally in the direction of the centerline axis up to the third shaft 5, which penetrates the support plate 35 coaxially above the second and first sun gear shafts 7, 6 and binds the inner disk carrier 72 with the third input element of the principal planetary gear set 20. Spatially, the disk shaped section 77 of the output element of the clutch E is placed axially between the disk-like section 47 of the output element of the clutch A, which said output element is doing duty as an outer disk carrier 40 and is placed on the support plate 35 and in the area of its outer diameter, is bound to an inner disk carrier of the brake D which borders on the support plate 35.

The principal planetary gear set 20, depicted in FIG. 19 represents again the exemplary Ravigneaux-Gear-Set described previously in FIG. 1 and in FIG. 3 to FIG. 17. The spur gear 9 is placed on that side of the principal planetary gear set 20, which is proximal to the support plate 35, i.e. proximal to the primary planetary gear set 10. Accordingly, the spur gear 9 now borders directly on the support plate 35 and supports, by means of said support plate 35, on the transmission housing 30. In this way, a second support plate can be omitted.

In the eleventh component-arrangement-variant in accordance with FIG. 20 it is proposed, that not only the disks 71 of the clutch E are placed between the clutch A and the principal planetary gear set 20, but also the servo apparatus 73 of the clutch E. In the illustrated example, the disks 71 possess, in this case, a diameter which is slightly greater than the diameters of the disks 41, 61 of the clutches A, B. In another embodiment, the same disks could be used for all three clutches A, B and E. Deviating from FIGS. 18, 19 the input element of the clutch E is now designed as an inner disk carrier 72, with a cylindrical section 74, which extends itself axially over the clutches A and B and the primary planetary gear set 10 and is connected on that side of the primary planetary gear set 10 which is proximal to the motor drive shaft 1 and is further connected with the spiders 15, 16.

The output element of the clutch E correspondingly is designed as an outer disk carrier 70, in the shape of an open cylinder opening in the direction of the primary planetary gear set 10 and having a short cylindrical section 76 in the area of the disks 71 of the clutch E, as well as with a far reaching disk-like section 77, which connects itself to the cylindrical section 76 and—bordering directly on the support plate 35—centrally in the direction of the transmission centerline axis extends itself to a support section of the support plate 35, up to the third shaft 5, by means of which, the outer disk carrier 70 of the clutch E is connected with the third input element of the principal planetary gear set 20. Accordingly, the outer disk carrier 70, by means of the third shaft 5 is placed on the support plate 35. Obviously, it is possible that the outer disk carrier 70 can also be affixed directly to the support plate 35. The servo apparatus 73 of the clutch E is located completely within the outer disk carrier 70 of the brake E. In this way, a simple course of action in the mounting of the clutch E is achieved in the transmission housing 30.

The positioning of the spur gear 9, relative to the support plate 35 and to the planetary gear sets, represents the arrangement graphically described in FIG. 19. However, deviating from FIG. 19, FIG. 20 provides a component arrangement, wherein the brake D, by means of which the third input element of the principal planetary gear set 20 is set, is now placed between the spur gear 9 and the brake C. This placement, above the principal planetary gear set 20 allows saving in the construction length of the transmission. As has already been mentioned, the brake C is placed on that side of the multistage transmission, which side is opposite to the motor drive shaft 1.

As has already been proposed for the component-arrangement-variant in accordance with FIG. 18, it is possible, that in other embodiments of the arrangements shown in FIGS. 19 and 20, provision can be made to so spatially locate the servo apparatuses 43, 63 of the two clutches A, B, that the servo apparatus 43 of the clutch A be placed on that side of the outside disk carrier 40 of the clutch A which is proximal to the principal planetary gear set 20. If this is done, then an activation element of the servo apparatus 43 radially bypasses the disks 41 of the clutch A axially in the direction of the primary planetary gear set 10 and activates the disks 41 on their side which is proximal to the primary planetary gear set 10, and/or that the servo apparatus 63 of the clutch B be placed on that side of the inner disk carrier 62 of the clutch B which is proximal to the principal planetary gear set 20.

Figure 21:
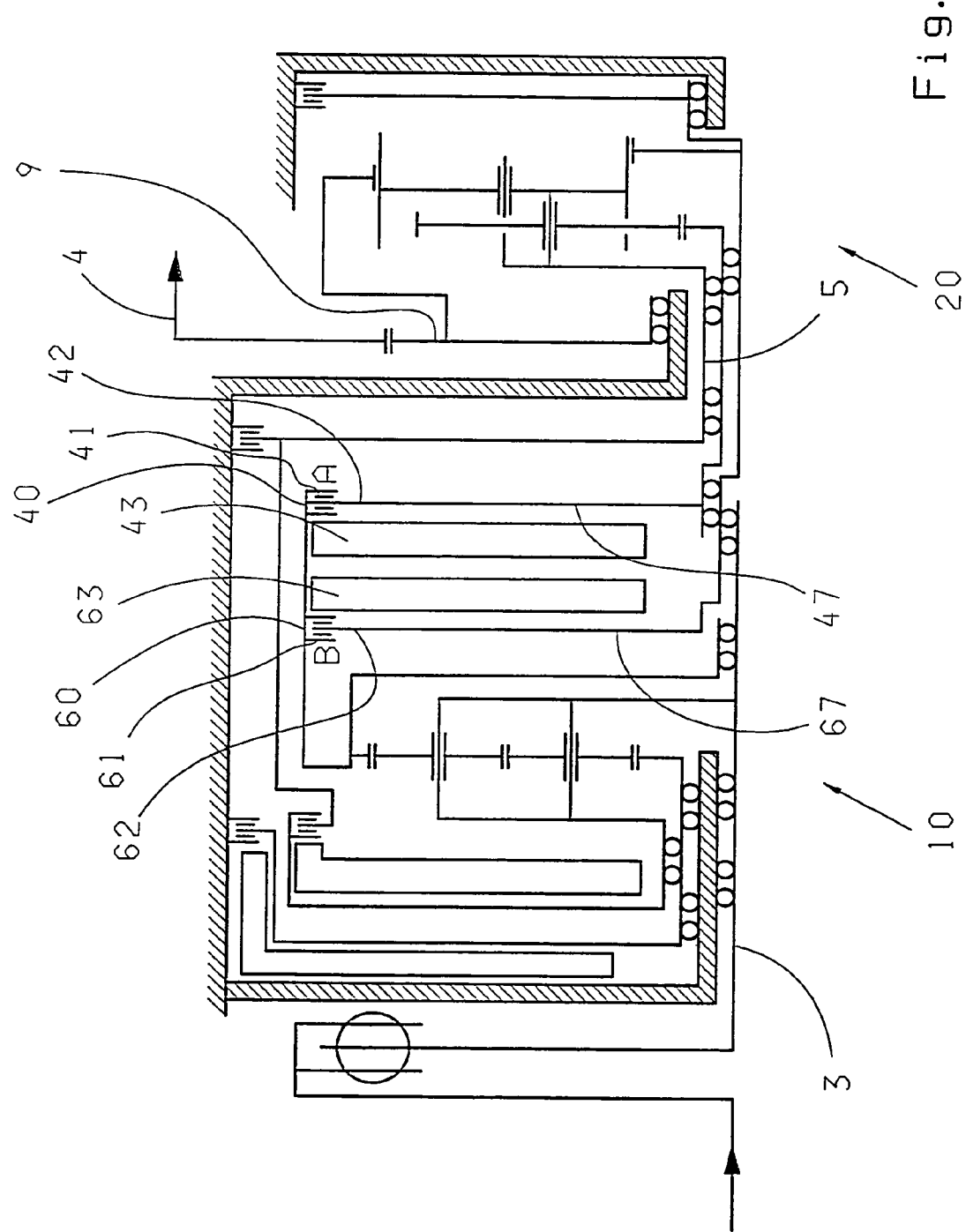

FIG. 21 shows now a twelfth exemplary component-arrangement-variant of a multi-transmission with the first invented primary planetary gear set 10 and advantageously axis parallel input and output drives, wherein the arrangement is predominately based on the detailed description of FIG. 19, which showed the tenth component-arrangement-variant. The difference to FIG. 19 concerns mainly the formation of the input and out put elements of the clutch A, the geometrical arrangement of the output element of the clutch B as well as the spatial disposition of the servo apparatuses 43, 63 of both clutches A, B. In FIG. 21, the proposal is, to construct both input elements of the clutches A, B as side-by-side arranged outer disk carriers 40, 60, advantageously in such a manner, that for the disks 41, 61 both clutches A, B can employ the same components. Both output elements of the clutches A, B are correspondingly designed as inner disk carriers 42, 62, advantageously essentially disk-like in form. The corresponding disk-like sections 47, 67 of these output elements extend themselves centrally in the direction of the input drive shaft 3. In the complete example the inner disk carrier 62 of the clutch B, which is nearer to the primary planetary gear set 10 than is the clutch A, is placed in a support section, which connects to the disk-like section 67, upon which the drive shaft 3 is rotatable borne. The inner disk carrier 42 of the clutch A is placed centrally onto the support section of the inner disk carrier 62 of the clutch B and therewith, at the same time, likewise indirectly placed on the drive shaft 3 in a rotatable manner.

Taking consideration of the servo apparatuses 43, 63, of the clutches A, B, the proposal in FIG. 21 is that both servo apparatuses 43, 63 are to be placed next to one another and axially between the inner disk carriers 42, 62 of the clutches A, B. In this arrangement, the servo apparatus 63 of the clutch B is placed nearer to the primary planetary gear set 10 than is the servo apparatus 43 of the clutch A, preferably axially, bordering on the disk-like section 67 of the output element of the clutch B, and activates the disks 61 of the clutch B in the direction of the primary planetary gear set 10. The servo apparatus 43 of the clutch A borders advantageously, axially on the disk-like section 47 of the output element of the clutch A, and activates the disks 41 of the clutch A in the direction of the principal planetary gear set 20.

In another embodiment, provision can be made, that the inner disk carriers 42, 62 of the clutches A, B are placed directly beside one another. The servo apparatus 43 of the clutch A is, in this case, on that side of the inner disk carrier 42 of the clutch A which is remote from the primary planetary gear set 10 and activates the disks 41 of the clutch A now in the direction of the primary planetary gear set 10. The servo apparatus 63 of the clutch B is correspondingly on that side of the inner disk carrier 62 of the clutch B which is proximal to the primary planetary gear set 10 and activates the disks 61 of the clutch B now in the direction of the principal planetary gear set 20. In this case of this arrangement, it is possible that the outer disk carriers 40, 60 of the clutches A, B can be advantageously made as a one-piece component, and the disks 41, 61 of both clutches A, B, upon activation, abut themselves on the same detent.

Figure 22:
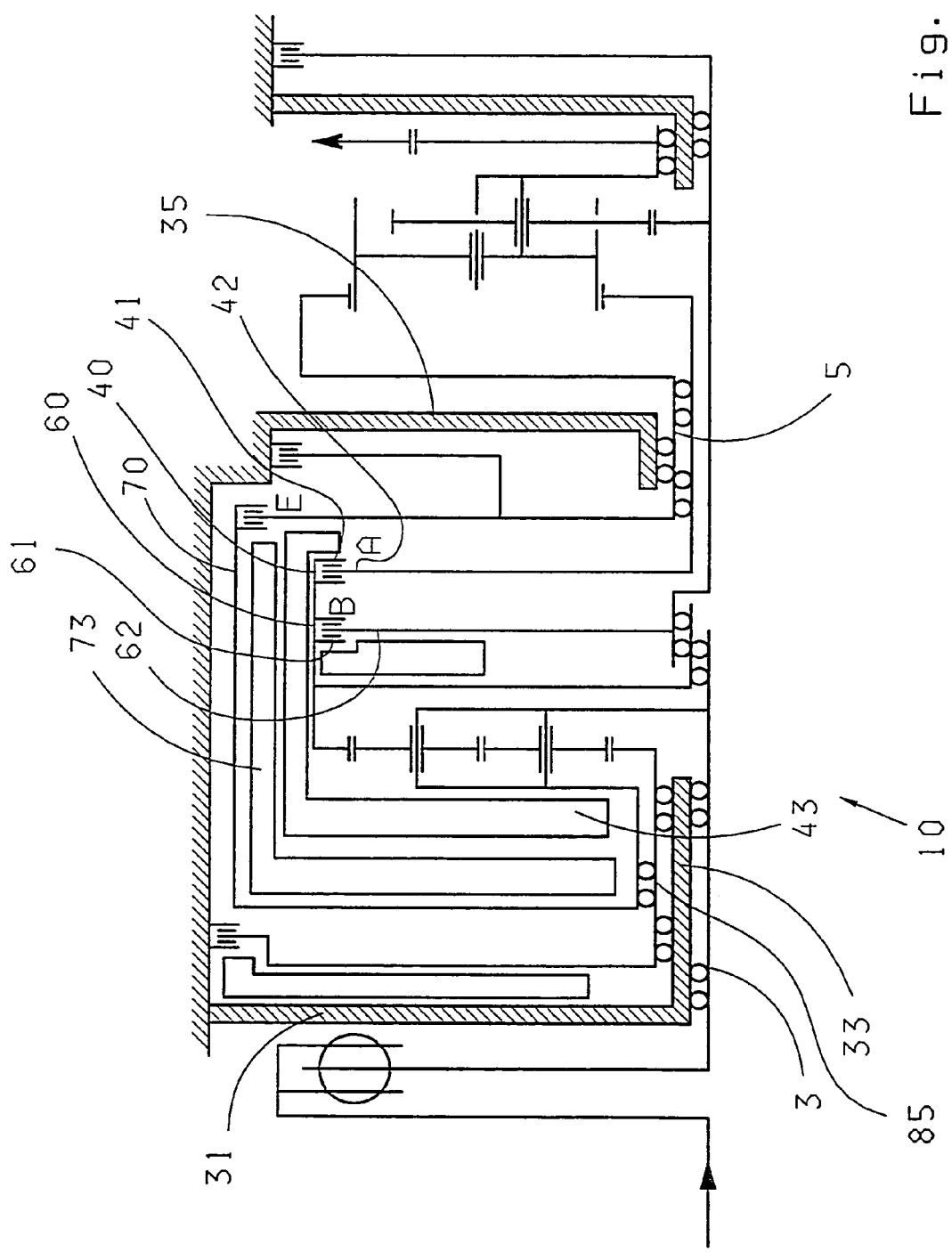

FIG. 22 shows a thirteenth exemplary component-arrangement-variant of the multistage transmission, with the first invented primary planetary gear set variant and wherein the output drive is placed transverse to the input drive, essentially based on the present detailed description of the ninth component-arrangement-variant as shown in FIG. 18. The differences to FIG. 18 concern mainly the placements of the input and output elements of the clutch A as well as the spatial arrangement of the servo apparatus 43 of the clutch A. In accordance with FIG. 22, the proposal is now, that both input elements of the clutches A, B are to be designed as contiguously placed outer disk carriers 40, 60, advantageously of such a nature, that for the disks 41, 61 both clutches A, B the same components can be used. In an unchanged feature, the disks 61 of the clutch B are placed nearer to the primary planetary gear set 10 than the disks 41 of the clutch A. Both output elements of the clutches A, B. are designed as inner disk carriers 42, 62, advantageously, predominately disk shaped. The placing of the outer and inner carriers 60, 62 of the clutch B on the drive shaft 3 corresponds to that presented in FIG. 18. Differing from FIG. 18, is now the inner disk carrier 42 of the clutch A which is located above the third shaft 5.

In accordance with FIG. 22, it is further proposed to place the servo apparatus 43 of the clutch A between the servo apparatus 73 of the clutch E and the primary planetary gear set 10. In such a case, an activation element radially bypasses the servo apparatus 43 in the axial direction over the primary planetary gear set 10, clutch B, the outer disk carrier 40 and the clutch A and activates the disks 41 of the clutch A on that side of said disks which is remote from the primary planetary gear set 10. The servo apparatus 43 of the clutch A also lies completely inside the clutch space of the clutch E, which said space is formed by the cylindrical outside disk carrier 70 and the clutch E. In an advantageous manner it is also possible to construct together as a preassembled unit the outer disk carrier 70 of the clutch E, the servo apparatus 73 of the clutch E and the servo apparatus 43 of the clutch A and to accordingly install same. The pressure medium feed for the activation of both clutches E, A and, if necessary, also the lubrication means input for a dynamic pressure compensation of one of two, or indeed both the clutches E, A can be taken care of easily by corresponding channels and borings within the projection 33 of the transmission housing wall 31 and within the sun gear shaft 85 of the primary planetary gear set 10, upon which the outer disk carrier is 70 of the clutch E is mounted. In an advantageous manner, both servo apparatuses 73, 43 of the clutches E, A continually rotate with the same rotational speed of the transmission input, this being namely, $n_1$, whereby dry running of the piston space, and if required also the pressure compensation space of both clutches E, A is prevented in their non-engaged condition.

Figure 23:
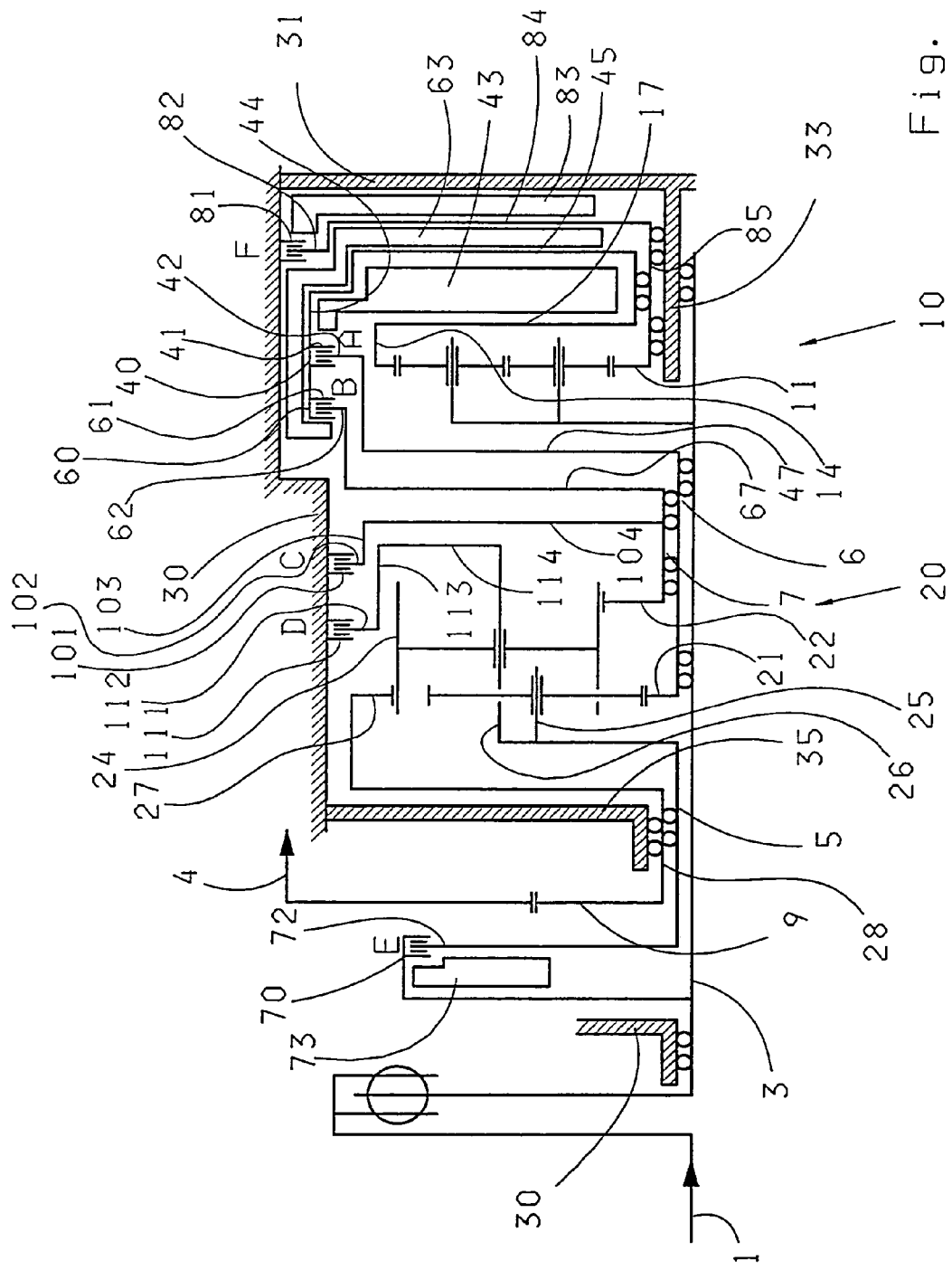

FIG. 23 shows a fourteenth exemplary component-arrangement-variant of the multistage transmission with the first invented primary planetary gear variant and with, advantageously, axis parallel input and output drives. In difference from those exemplary component-arrangements of an invented multistage transmission as presented in FIG. 1 and FIG. 2 to FIG. 22, the transmission wall 31, onto which the brake F borders, as does the servo apparatus 83 of the brake F, is now the outer wall of the transmission housing 30, which lies opposite to the motor drive shaft 1. As in the previous component-arrangement-variants, the disks 81 of the brake F are placed advantageously in the transmission housing 30 within the greatest possible diameter. In the direction of the motor drive shaft 1 a component connects itself to the brake F, wherein the component comprises the clutches A, B and the primary planetary gear set 10. In the complete example the disks 41 of the clutch A are placed above the primary planetary gear set 10. The disks 61 of the clutch B, in the direction of the motor drive shaft 1, are placed to be neighboring the disks 41 of the clutch A, and are, at least, of nearly the same diameter. The disks 61 of the clutch B are also nearer to the principal planetary gear set 20 than are the disks 41 of the clutch A and the disks 41 of the clutch A are thus nearer to the brake F than are the disks 61 of the clutch B. The outer disk carriers 40, 60 of both clutches A, B are connected with the internal gear 14 of the primary planetary gear set 10.

The primary planetary gear set 10 is above the cylindrical projection 33 of the transmission housing wall 31, which projection further extends itself in the direction of the motor drive shaft 1. The sun gear 11 of the primary planetary gear set 10 is over the sun gear shaft 85 of the primary planetary gear set 10 and is connected to the inner disk carrier 82 of the brake F, whereby this sun gear shaft 85 is supported on the projection 33. Considering the arrangement of the servo apparatuses 43, 63 of the clutches A, B, it is proposed in FIG. 23, that the outer disk carrier 40 of the clutch A is constructed as a cylinder opening in the direction of the motor drive shaft 1. A cylindrical section 44 of this input element of the clutch A extends axially in the direction of the brake F, a disk-like section 45 attaches to this cylindrical section 44 and extends centrally in the direction of the output shaft 3, up to a support section, which is placed on the sun gear 85 of the primary planetary gear set 10. On that side of the primary planetary gear set 10 which is proximal to the brake F, a disk-like output element 17 of the internal gear 14 of the primary planetary gear set 10 extends itself centrally in the direction of the input shaft 3 up to the support section of the outer disk carrier 40 of the clutch A and is there connected with this. The servo apparatus 43 of the clutch A is arranged axially between the disk-like output element 17 of the internal gear 14 and the dislike section 45 of the entrance element of the clutch A and operates the disks 41 of the clutch A in the direction of the motor drive shaft 1. The servo apparatus 63 of the clutch B is axially arranged between the disk-like section 45 of the entrance element of the clutch A and the disk-like section 84 of the inner disk carrier 82 of the brake F, whereby an activation element of the servo apparatus 63 axially bypasses the outer disk carriers 40, 60 of both clutches A, B in the direction of the motor drive shaft 1 and activates the disks 61 of the clutch B in the direction of the brake F. By means of the arrangement presented in FIG. 23, it is possible that the inner disk carrier 82 of the brake F, the servo apparatus 63 of the clutch B, both outer disk carriers 40, 60 of the clutches A, B, the servo apparatus 43 of the clutch A and the disks 41, 61 of both clutches A, B can be easily preassembled to make an installable unit. In an advantageous manner, the servo apparatuses 43, 63 of both clutches A, B continually rotate at the same rotational speed, namely $n_{vs}$, of the primary planetary gear set 10.

On that side of the transmission housing 30 which is proximal to the motor drive shaft 1 is placed the fifth shifting element E, which is designed as a clutch. With that arrangement, the outer disk carrier 70 of the clutch E serving as the input element of the clutch E is bound to the input shaft 3, which runs centrally completely through the entire transmission up to the transmission housing wall 31, which closes the transmission housing 30 from the outside on that side of said housing 30 which is remote from the motor drive shaft 1. In that arrangement, the outer disk carrier 70 is constructed as a cylinder, which is open on its side which is remote from the drive. The inner disk carrier 72 forms the output element of the clutch E and is connected with the third shaft 5. The third shaft 5 extends coaxially, directly above the drive shaft 3, axially in the direction of the principal planetary gear set 20 and is connected with the third input element of the principal planetary gear set 20. This connection is made by the coupled spiders 25, 26. The third shaft 5 can be placed, with this formation, on the input drive shaft 3. The servo apparatus 73 of the clutch E is placed within the cylindrical shape of the outer disk carrier 70 on the motor drive shaft 1, upon which that side of the inner disk carrier 72 of the clutch E.

On the input drive, that is, on that side of the clutch E which is remote from the input motor drive shaft 1, is placed the spur gear 9 with the output drive shaft 4, advantageously bordering axially on the inner disk carrier 72 of the clutch E. The spur gear 9 is, by means of an output shaft 28 of the principal planetary gear set 20—in the represented example its internal gear 27—connected with the output element of said gear set, in particular, the internal gear thereof. This output shaft 28 extends itself coaxially immediately above the third shaft 5 in the axial direction. The input drive shaft 3, the third shaft 5 and the output shaft 28 are all placed in coaxial, one over the other array and penetrate centrally through the support plate 35 which is bound to the transmission housing 30. In this arrangement, the spur gear 9 borders, on its side which is remote from the clutch E, the support plate 35. The output shaft 28 of the principal planetary gear set 20 is placed directly in the support plate 35. In the depicted embodiment, third shaft 5 is placed within the output shaft 28 and is thereby also central in the support plate 35. The principal planetary gear set 20 is placed on that side of the support plate 35 which is remote from the spur gear 9 and, advantageously, contiguous to this.

The brake D, by which the third input element of the principal planetary gear set 20 is established, for the purpose of saving structural strength, is placed partially in a radial direction above the principal planetary gear set 20 at a great diameter in the transmission housing 30. In the illustrated example, disks 111 of the brake D are located above the second (outer) planet gear 24 of the principal planetary gear set 20. In this way, the spider 26 of the second planetary gear set 24 penetrates the principal planetary gear set 20 completely and is connected with an inner disk carrier 112 of the brake D on that side of the principal planetary gear set 20 which is remote from the motor drive shaft 1. Accordingly, the inner disk carrier 112 is a cylinder opening in the direction of the motor drive shaft 1 and thereby a cylindrical section 113 and a disk-like section 114 are created and these enclose the second planet gear 24. On that side of the brake D, which is remote from the motor drive shaft 1, the brake C attaches itself axially on the brake D, by means of the second input element—in the illustrated example, that being the large sun gear 22—of the principal planetary gear set 20. The disks 101 of the brake C have the same diameter as the disks 111 of the brake D, which exhibits the obvious advantages in manufacture. In the illustrated example, the disks 101 of the brake C are placed at least predominately above the cylindrical section 113 of the inner disk carrier 112 of the brake D. In one embodiment, provision can also be made, that the disks 101 of the brake C, entirely or partially, can be placed above the second (outer) planet gear 24 of the principal planetary gear set 20. As may be seen in FIG. 23 in inner disk carrier 102 of the brake C is likewise constructed as a cylinder which is open in the direction of the motor drive shaft 1, with an axially short cylindrical section 103 and a disk-like section 104, and extends itself centrally in the direction of the input power shaft 3 up to an axially short second sun gear shaft 7. The second sun gear shaft 7 connects the large sun gear 22 of the principal planetary gear set 20 with the disk-like section 104 of the inner disk carrier 102 of the brake C and a disk-like section 67 of the output element of the clutch B, which is serving as an inner disk carrier 62. The second sun gear shaft 7 is placed upon the first sun gear shaft 6, which connects the small sun gear 21 of the principal planetary gear set 20, as the first input element thereof, with a disk-like section 47 of the output element of the clutch A serving as inner disk carrier 42. The first sun gear shaft 6, in turn, is placed directly on the input drive shaft 3, which penetrates centrally directly through the transmission. The disk-like section 67 of the output element of the clutch B borders also axially on that side of the disk-like section 104 of the inner disk carrier 102 of the brake C which is remote from the principal planetary gear set 20 and the disk-like section 47 of the output element of the clutch A, in turn, borders axially on the disk-like section 67 on that side thereof which is remote from the principal planetary gear set 20. Separate support plate or housing wall axially located between the principal and the primary planetary gear sets 20, 10 are not necessary, in order to place the three coaxial, superimposed on one another shafts (drive shaft 3, first sun gear shaft 6, second sun gear shaft 7).

Figure 24:
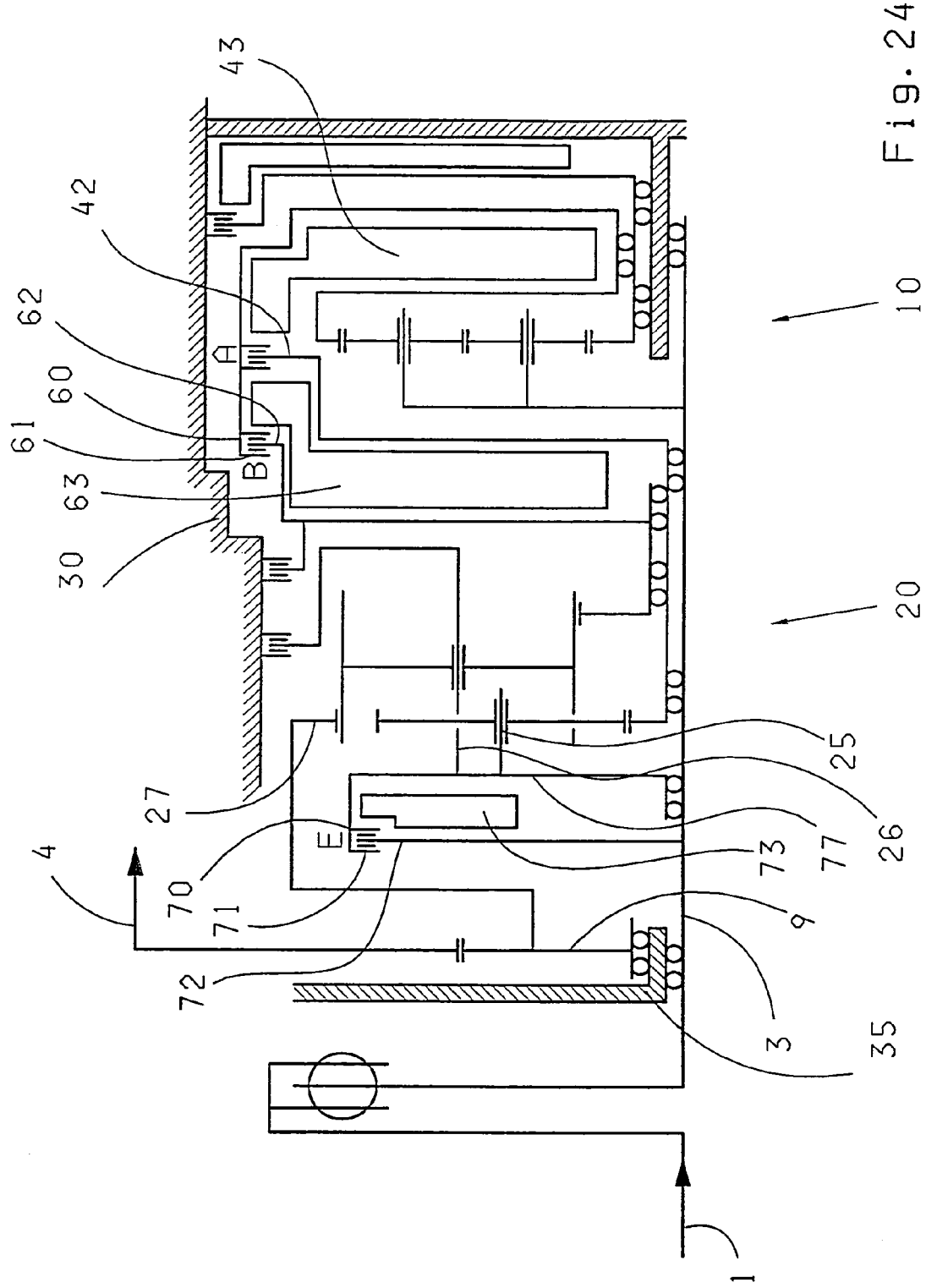

FIG. 24 shows a fifteenth exemplary component-arrangement-variant of the multistage transmission with the first invented primary planetary gear set 10 and advantageously axis parallel input and output drives, essentially based on the fourteenth component-arrangement-variant as shown in FIG. 23 and described in detail therewith. In comparison to FIG. 23, first, the spatial disposition of the clutch E relative to the spur gear 9 and to the principal planetary gear set 20 is changed. Second, the spatial placement of the servo apparatus 63 of the clutch B in relation to the disks 61 of the clutch B and to the primary planetary gear set 10, as well as to the clutch A. As is presented in FIG. 24, in the fifteenth component-arrangement-variant of an invented multistage transmission the proposal is, that the spur gear 9 and the actively therewith connected output drive shaft 4 are placed directly on the that side of the transmission housing 30, which is proximal to motor drive shaft 1 and therewith the (not shown) connected drive motor. In this way, the support plate 35 forms the outer wall of the transmission housing 30 which is proximal to the motor drive shaft 1 and takes over the support of the spur gear 9. On that side of the support plate 35, which is remote from the spur gear 9, the clutch E is connected in an axial direction. The clutch E is now, spatially located between the spur gear 9 and the principal planetary gear set 20. The output element of the clutch E, which is serving as the outer disk carrier 70 is constructed as a cylinder opening in the direction of the motor drive shaft 1, the section 77 of which borders on the coupled spiders 25, 26 of the principal planetary gear set 20 and is therewith connected and placed on the input drive shaft 3. The servo apparatus 73 of the clutch E is, advantageously, saving of construction space, is placed axially between the inner disk carrier 72 and the outer disk carrier 70 of the clutch E, upon that side of the disks 71 of the clutch E which is proximal to the principal planetary gear set 20, that is to say, also within the cylindrical shaped outer disk carrier 70 of the clutch E. One output element of the internal gear 27 of the principal planetary gear set 20, which is actively bound with the spur gear 9, thus radially bypasses the clutch E, in the axial direction.

In another embodiment, provision can be made, that the servo apparatus 73 of the clutch E be placed on that side of the inner disk carrier 72 which is proximal to the spur gear 9 and the disks 71 of the clutch E are to be activated in the direction of the principal planetary gear set 20. With this arrangement, a separate placement of the servo apparatus 73 onto the input drive shaft 3 is necessary, whereby the servo apparatus 73 of the clutch E then, however, in an advantageous manner, always rotates with the transmission input speed of $n_1$.

In accordance with FIG. 24, also proposed, is that the servo apparatus 63 of the clutch B be placed spatially between the principal and the primary planetary gear sets 10, 20, advantageously directly axially between the two inner disk carriers 62, 42 of the clutches B, A. Thus, the servo apparatus 63 of the clutch B, in reference to the primary planetary gear set 10 is placed opposite to the servo apparatus 43 of the clutch A and activates the disks 61 of the clutch B in the direction of the principal planetary gear set 20.

Figure 25:
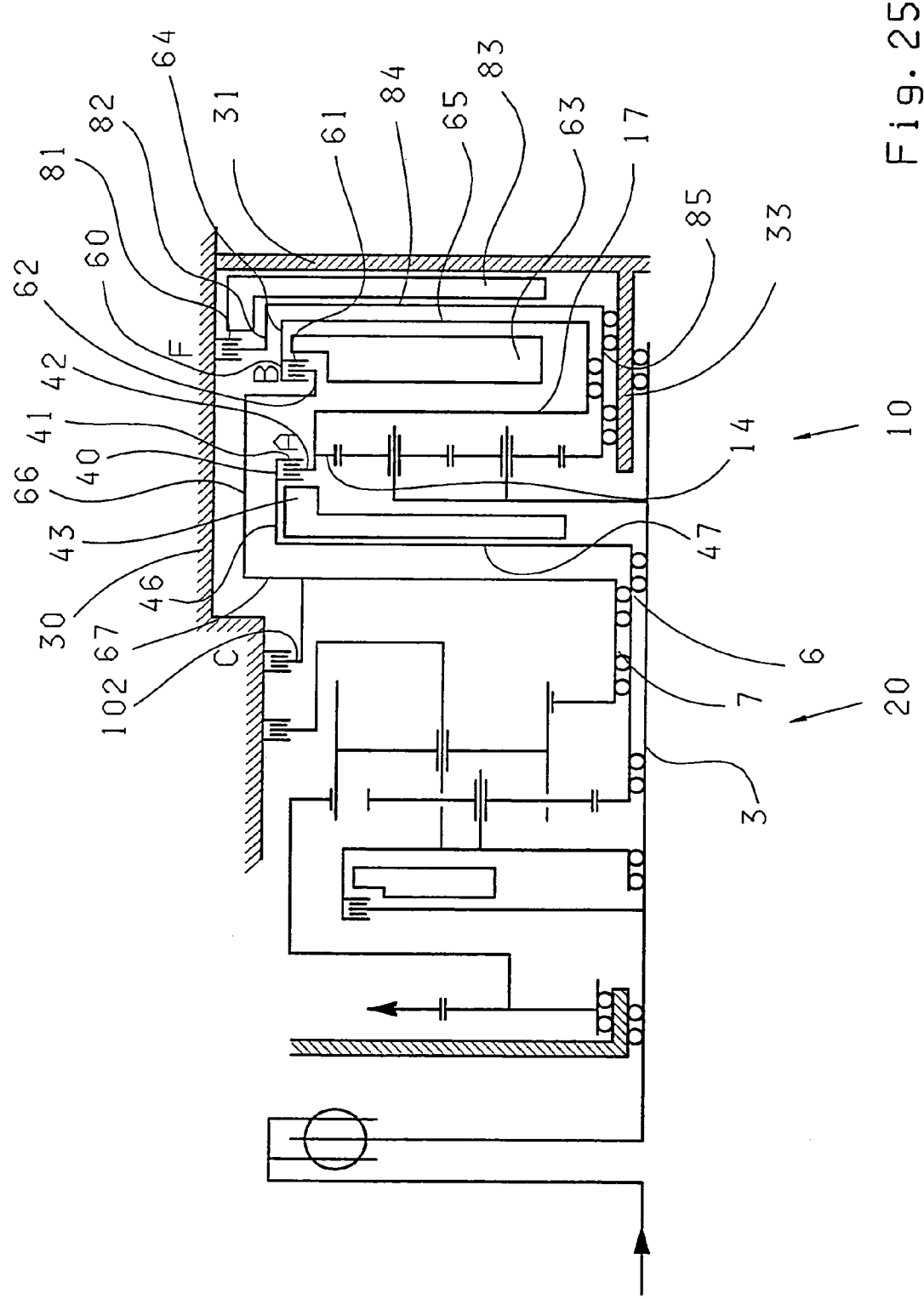

FIG. 25 shows a sixteenth exemplary component-arrangement-variant of a multistage transmission with the first invented primary planetary gear set variant and advantageously, axis parallel input and output drives, being based on the fifteenth component-arrangement-variant in accordance with FIG. 24. Contrary to the fifteenth component-arrangement-variant is now the spatial disposition of the clutch B relative to the clutch A, to the primary planetary gear set 10 and to the brake F. Beyond this, the input element of the clutch A is now designed as inner disk carrier 42 and the output element of the clutch A is to serve as outer disk carrier 40.

The placement of the brake F in the transmission housing 30, bordering on that transmission wall 31 situated opposite to the (not shown) drive motor remains unchanged from the situation in FIG. 24. Likewise the spatial position of the disks 41 of the clutch A relative to the primary planetary gear set 10 and to the brake F have not been changed. The input element of the clutch A, now serving as inner disk carrier 42 is directly above the primary planetary gear set 10 and is bound to the internal gear 10 of said gear set. The output element of the clutch A, now designed as outer disk carrier 40, possesses the shape of a cylinder opening in the direction of the brake F, with a cylindrical section 46 which extends itself from the disks 41 of the clutch A out in the direction of the principal planetary gear set 20, and connects with a disk-like section 47, which fastens itself onto the cylindrical section 46 and extends centrally in the direction of the input drive shaft 3 up to the first sun gear shaft 6 with which it is connected and which is fastened onto the input drive shaft 3. The servo apparatus 43 of the clutch A is located within the cylindrically shaped outer disk carrier 40 of the clutch A, and is axially located between the disk-like section 47 and the primary planetary gear set 10 and activates the disks 41 of the clutch A in the direction of the brake F.

Especially the disks 61 and the servo apparatus 63 of the clutch B are now placed on that side of the primary planetary gear set 10 which is proximal to the brake F, thus being on that side of the primary planetary gear set 10 which is remote from the principal planetary gear set 20. In this arrangement, the input element of the clutch B—as in FIG. 24—which is in the form of outer disk carrier 60, is constructed as a cylinder opening in the direction of the primary planetary gear set 10 and has a cylindrical section 64, which extends itself underneath the disks 81 of the brake F in the axial direction from the disks 61 of the clutch B in the direction of the transmission housing wall 31, and with a disk-like section 65, which attaches to the cylindrical section 64 and extends centrally in the direction of the input dive shaft 3 up to a support section radially above the sun gear shaft 85 of the primary planetary gear set 10, which in turn, is placed upon the projection 33 of the transmission housing wall 31. In this arrangement, the disk-like section 65 of the input element of the clutch B borders directly onto the disk-like section 84 of the inner disk carrier 82 of the brake F. The brake F is placed on that side of its servo apparatus 83, which is attached to the transmission housing wall 31 and which said side is proximal to the primary planetary gear set 10. On that side of the primary planetary gear set 10 which is proximal to the brake F as well as proximal to the transmission housing wall 31, thus on that side of the primary planetary gear set 10 which is remote from the principal planetary gear set 20, there extends an at least partially disk-like output element 17, running centrally in the direction of the input drive 3 or of the sun gear shaft 85 up to the support section of the outer disk carrier 60 of the clutch B on the sun gear shaft 85 of the primary planetary gear set 10 and, in that place is bound to the outer disk carrier 60.

The servo apparatus 63 of the clutch B is placed axially between the disk-like output element 17 of the internal gear 14 and the disk-like section 65 of the input element of the clutch B, with in the cylinder shaped outer disk carrier 60 of the clutch B and activates the disks 61 of the clutch B in the direction of the primary planetary gear set 10 or the primary planetary gear set 20 or, in other words, in the direction of the drive motor. Disks 61 and the servo apparatus 63 of the clutch B are also placed radially above the cylindrical projection 33 of the transmission housing wall 31, upon which also the inner disk carrier 82 of the brake F is placed. Outer disk carrier 60 and the servo apparatus 63 of the clutch B can also, in a very simple way, be preassembled and inserted as one combined component into the inner disk carrier 82 of the brake F.

The output element of the clutch B, which serves as inner disk carrier 62, possesses the form of a cylinder opening in the direction of brake F, with a cylindrical section 66, which extends itself in an axial direction from the disks 61 of the clutch B in the direction of the principal planetary gear set 20 (that is to say, in the direction of the brake C) passing entirely radially over the clutch A, and having a disk-like section 67, which attaches to the section 66 and is connected to the inner disk carrier 102 of the brake C and runs centrally in the direction of the drive shaft 3 up to the second sun gear shaft 7 which is found coaxially placed above the first sun gear shaft 6, and is placed upon the first sun gear shaft 6 and connects the inner disk carrier 62 of the clutch B with the second input element of the principal planetary gear set 20. Thus the output element of the clutch B completely bypasses the primary planetary gear set 10 and the clutch A.

From the standpoint of manufacturing technology, the use of identical parts for the disks 41, 61 of both clutches A, B can be provided.

Figure 26:
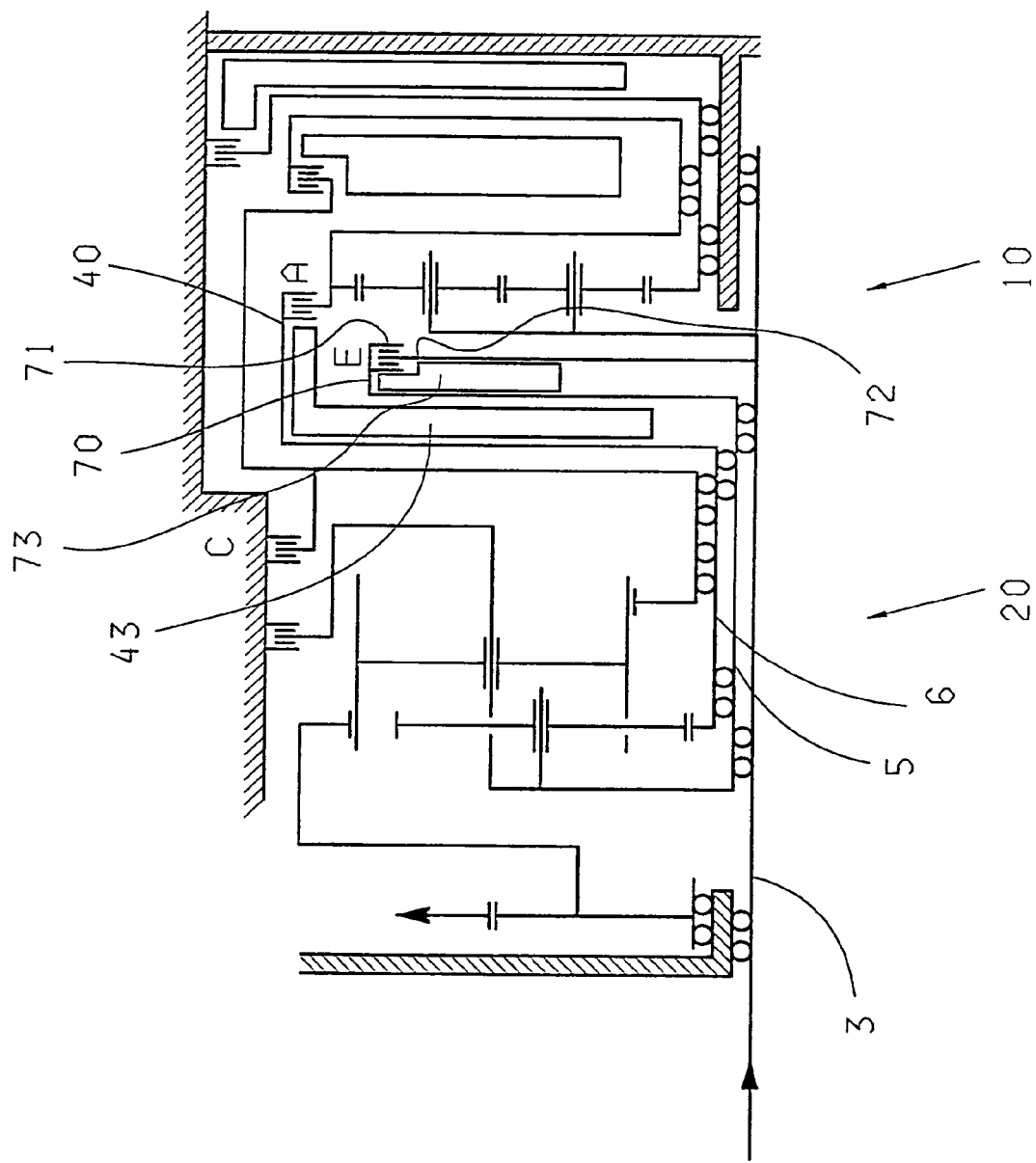

FIG. 26 shows a seventeenth exemplary component-arrangement-variant of a multistage transmission with the first invented primary planetary gear set variant and advantageously, an output drive being transverse to an input drive. Compared to the previously examined sixteenth component-arrangement-variant illustrated in FIG. 25, now the clutch E is spatially disposed between the principal and the primary planetary gear sets 20, 10, directly bordering on the primary planetary gear set 10. In this arrangement, the clutch E, especially its disks 71 and its servo apparatus 73 are placed completely within the cylindrical shaped outer disk carrier 40 of the clutch A. Advantageously, the inner disk carrier 72 of the clutch E, acting as its input element, borders directly on the primary planetary gear set 10. Accordingly, the outer disk carrier 70 of the clutch E, which said carrier is a cylinder opening in the direction of the primary planetary gear set 10, here serving as output element of the clutch E, and said carrier now borders on the servo apparatus 43 of the clutch A and is centrally bound with the third shaft 5. The third shaft 5 runs now coaxially directly above the drive shaft 3, and is placed thereon. The shaft 5 thus centrally penetrates the principal planetary gear set 20 and connects the outer disk carrier 70 with the third input element of the principal planetary gear set 20 on that side thereof which is remote from the primary planetary gear set 10. Accordingly, the first sun gear shaft 6, by means of which the outer disk carrier 40 of the clutch A is connected to the first input element of the principal planetary gear set 20, now runs coaxially above the third shaft 5 and is advantageously connected to this said shaft 5. The servo apparatus 73 activates the disks 71 of the clutch E in the direction of the primary planetary gear set 10. The arrangement in accordance with FIG. 26 enables a simple pre-assembly of the complete clutch E with the outer disk carrier 40 of the clutch A.

Figure 27:
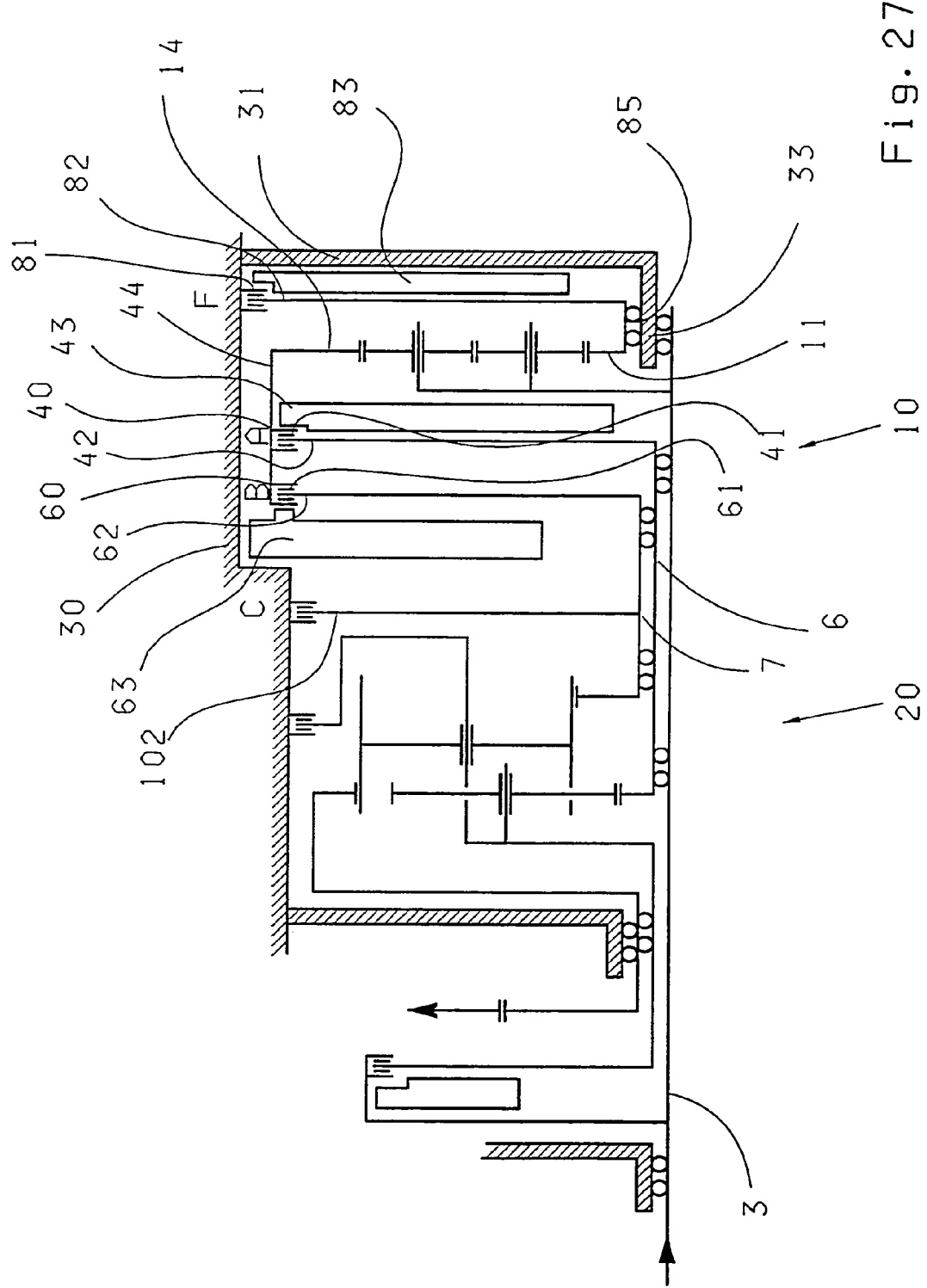

FIG. 27 shows a eighteenth exemplary component-arrangement-variant of a multistage transmission with the first invented primary planetary gear set variant and advantageously, axis parallel input and output drives, being based on the fourteenth component-arrangement-variant in accordance with FIG. 23.

Compared to FIG. 23, the component-arrangement-variant shown in FIG. 27 differs therefrom, in that a changed arrangement of the of the servo apparatuses 43, 63 of the two clutches A and B which change incorporates a slightly different spatial positioning of the disk 41 of the clutch A in relation to the primary planetary gear set 10, as well as by an altered component geometry of the inner disk carriers 42, 62 and 102 of the three shifting elements A, B. and C. Not changed are the outer disk carriers 40, 60 of the two clutches A, B with their disks 41, 61 directly next to one another, advantageously with the same disk diameter. Relative to the primary planetary gear set 10, the disks 41 of the clutch A are no axially located next to the primary planetary gear set 10, at the side of which is proximal to the principal planetary gear set 20. The outer disk carrier 40 of the clutch A, which carrier is bound to the outer disk carrier 60 of the clutch B, is, by means of an axially relatively short cylindrical section 44 connected to the internal gear 14 of the primary planetary gear set 10. The predominately disk-like constructed inner disk carrier 42 of the clutch A extends itself centrally in the direction of the input drive shaft 3 up to the first sun gear shaft, which runs coaxially with the input drive shaft 3 and is connected thereto, and is bound with the first sun gear shaft 6. The predominately disk shaped inner disk carrier 62 of the clutch B extends itself—directly axially in the direction of the principal planetary gear set 20, bordering on the inner disk carrier 42 of the clutch A—centrally in the direction of the input drive shaft 3, up to the second sun gear shaft 7, which said shaft 7 runs coaxially above the first sun gear shaft 6. The disk carrier 62, so placed, is bound to the second sun gear shaft 7.

The servo apparatus 43 of the clutch A is placed axially between the primary planetary gear set 10 and the inner disk carrier 42 of the clutch A and activates the disks 41 of the clutch A in the direction of the principal planetary gear set 20. The servo apparatus 63 of the clutch B is placed axially between the inner disk carrier 62 of the clutch B and the likewise predominately disk-like inner disk carrier 102 of the brake C, preferably axially in the direction of the principal planetary gear set 20, immediately bordering on the inner disk carrier 62 of the clutch B, and activates the disks 61 of the clutch B in the direction of the primary planetary gear set 10. The inner disk carrier 102 of the brake C extends itself, in this arrangement, centrally in the direction of the input drive shaft 3 up to the second sun gear shaft 7, with which it connects.

The disks 81 of the brake F remain unchanged and placed at the greatest possible diameter within the transmission housing 30 in that area of the transmission housing wall 31 which is distal from the motor. In the illustrated embodiment, at least predominately in the axial direction beside the primary planetary gear set 10. The inner disk carrier 82 of the brake F is now likewise constructed to be generally disk-like and is connected by means of the corresponding axial, short, sun gear shaft 85 of the primary planetary gear set 10 and is bound to the sun gear 11 thereof. The projection 33 of the transmission housing wall 31 is also correspondingly short and thereon is placed the sun gear shaft 85. The servo apparatus 83 of the brake F is placed between the disk-like inner disk carrier 82 and the transmission housing wall 31, however, it is possible that the servo apparatus 83 can be integrated into the transmission housing wall 31.

Figure 28:
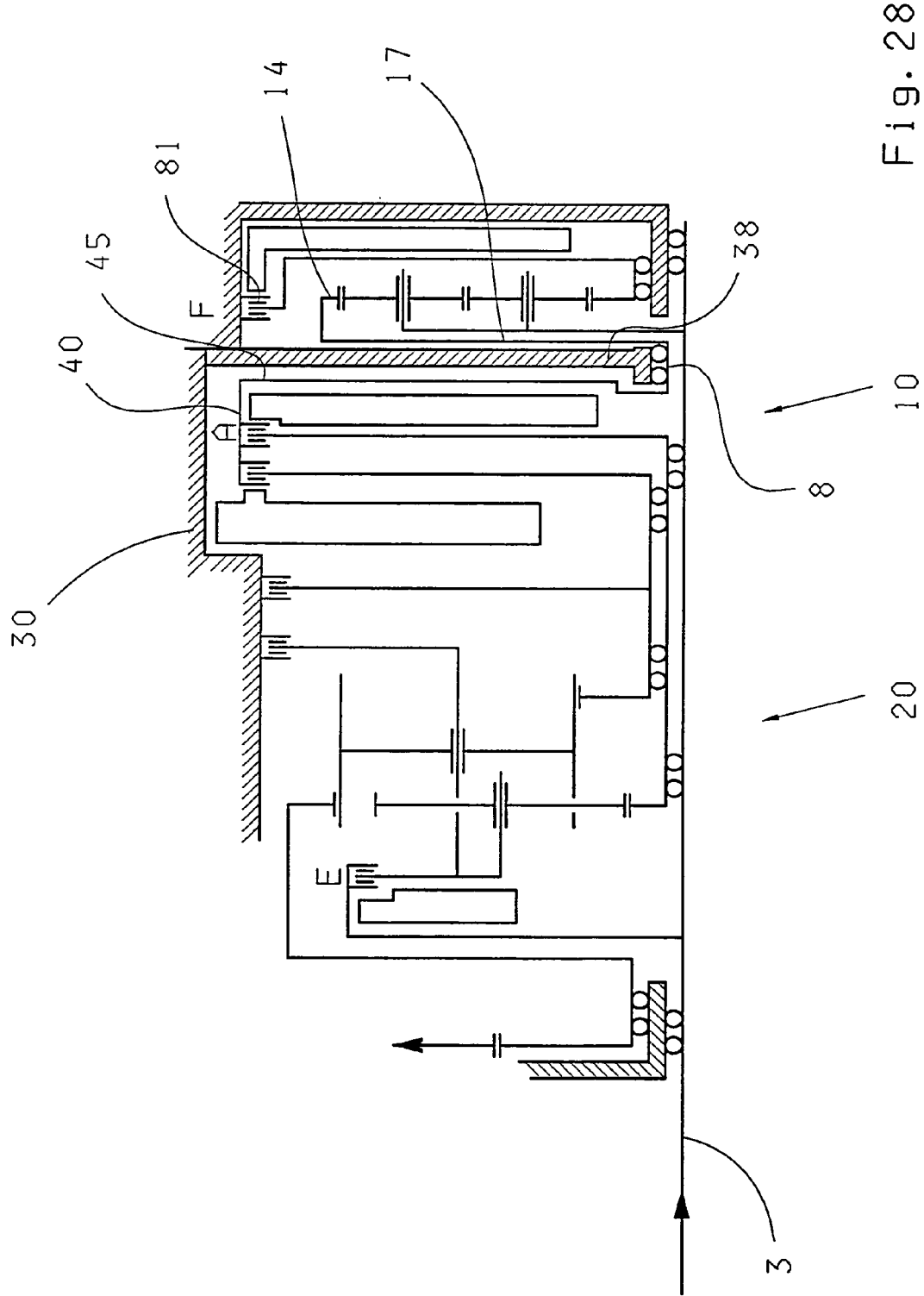

FIG. 28 shows a nineteenth exemplary component-arrangement-variant of the multistage transmission with the first invented primary planetary gear set 10 and advantageously axis parallel input and output drives. This is essentially based on the component-arrangement-variant as shown in FIG. 27. However, in FIG. 28 the proposal is to place the clutch E not between the—not shown—driving motor of the transmission and the spur gear 9, but rather to take the arrangement of the said clutch E from FIG. 24 and to locate the clutch E spatially placed between the spur gear 9 and the principal planetary gear set 20. For an improved placement of the out outer disk carrier 40 of the clutch A, it is proposed to provide between the clutch A and the primary planetary gear set 10 an additional third support plate 38, which plate is connected with the transmission housing 30. Obviously, the possibility exists, that the third support plate 38 and the transmission housing 30 can be made as one-piece. As may be seen in FIG. 28, the outer disk carrier 40 of the clutch A is constructed as a cylinder, which opens in the direction of the principal planetary gear set 20. The disk shaped section 45 of this input element of the clutch A extends itself centrally in the direction of the input drive shaft 3 up to an axially short, intervening shaft 8 which runs coaxially, directly above the input drive shaft 3, and extends itself axially in the direction of the primary planetary gear set 10, which is placed within the third support plate 38 and the outer disk carrier 40 of the clutch A, by means of the disk-like output element 17 is connected to the internal gear 14 of the primary planetary gear set 10. With this arrangement, the disk-like output element 17 on that side of the third support plate 38 which is proximal to the primary planetary gear set 10, borders this third support plate 38. Obviously, the possibility exists, that the intervening shaft 8 can also be placed directly on the drive shaft 3.

In the illustrated example, the disks 81 of the brake F—contrary to FIG. 27—are now placed predominately in a radial direction above the internal gear 14 of this primary planetary gear set 10, as has been shown in some previously described component-arrangement-variants.

Figure 29:
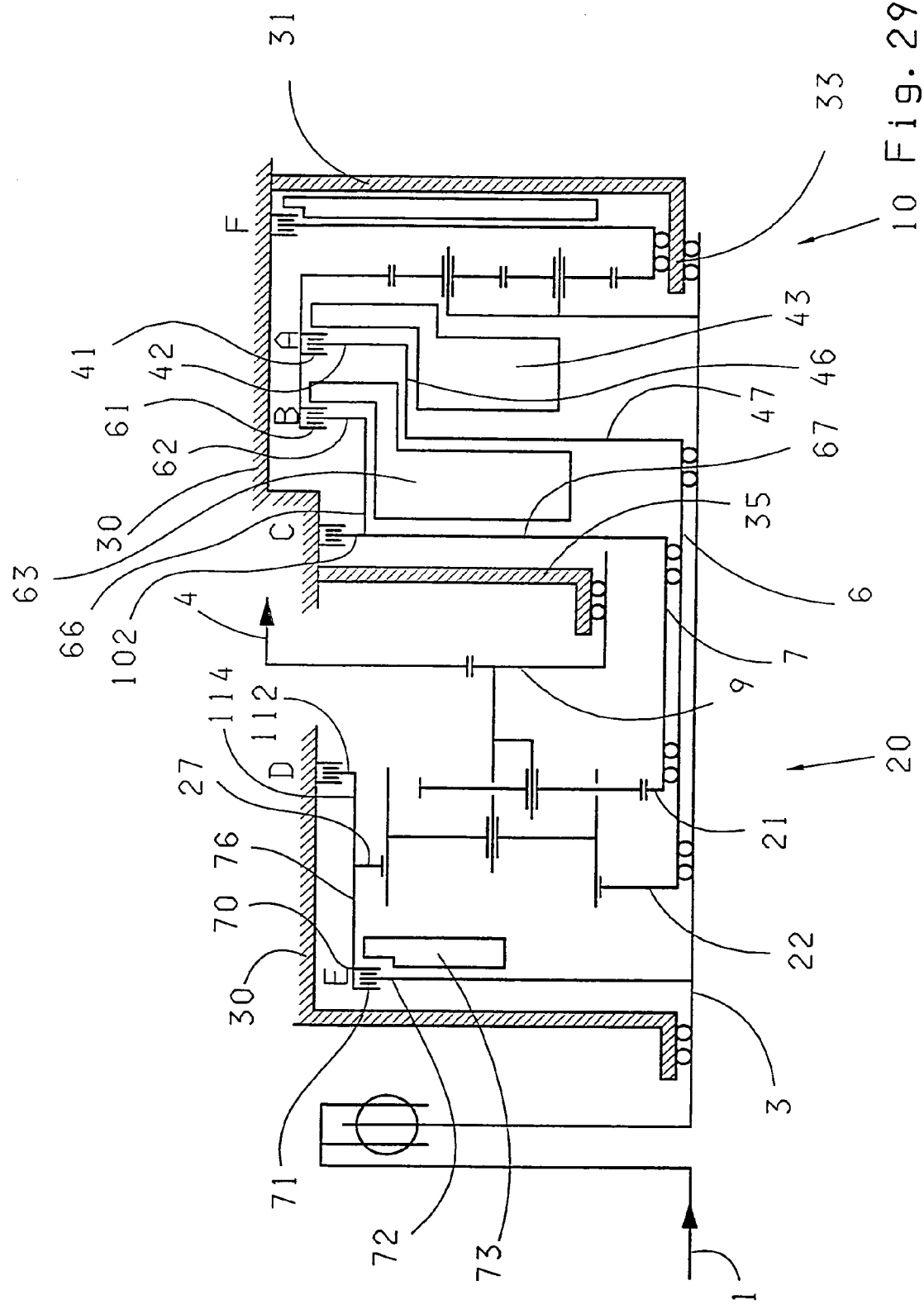
Figure 30:
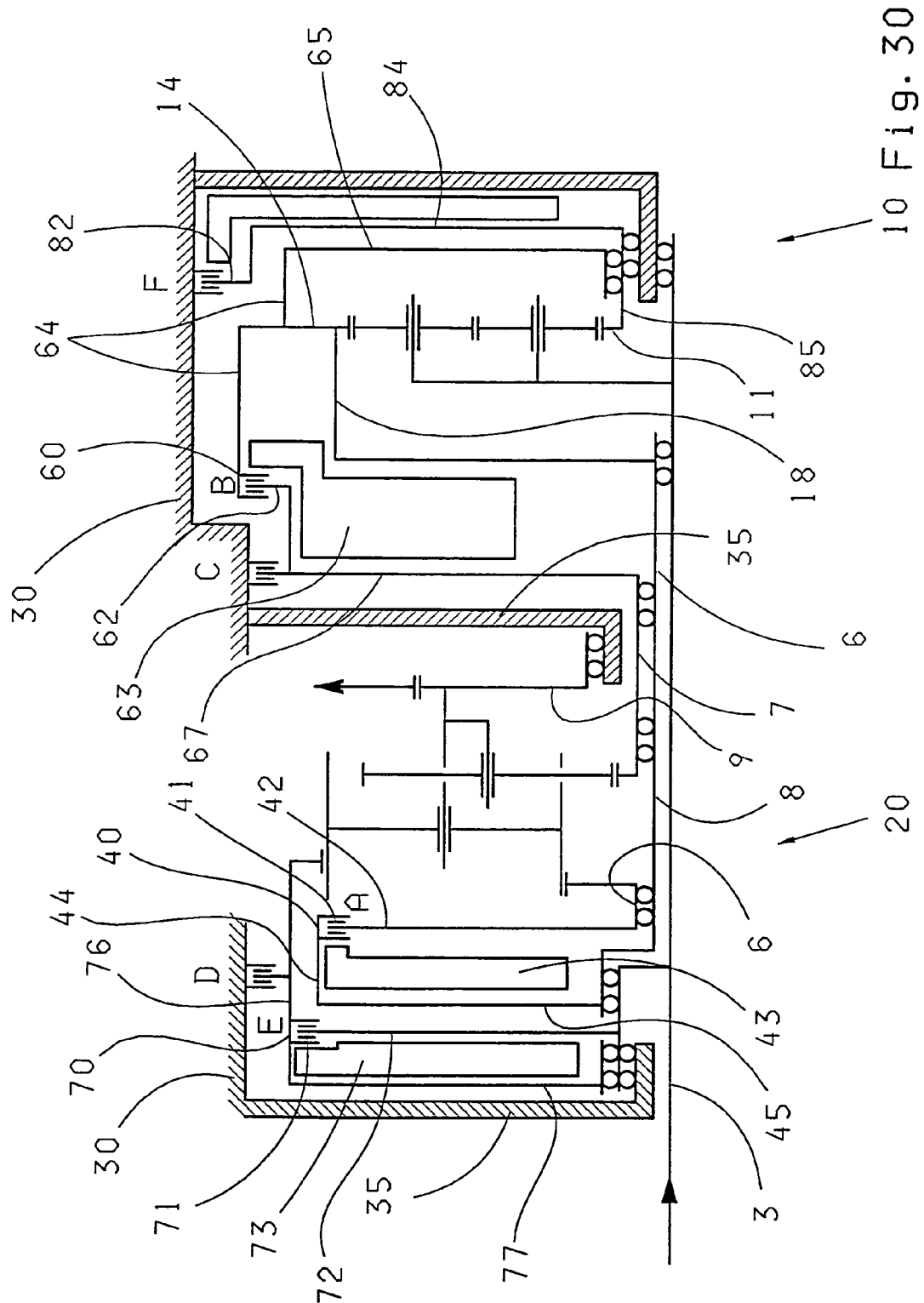
Figure 31:
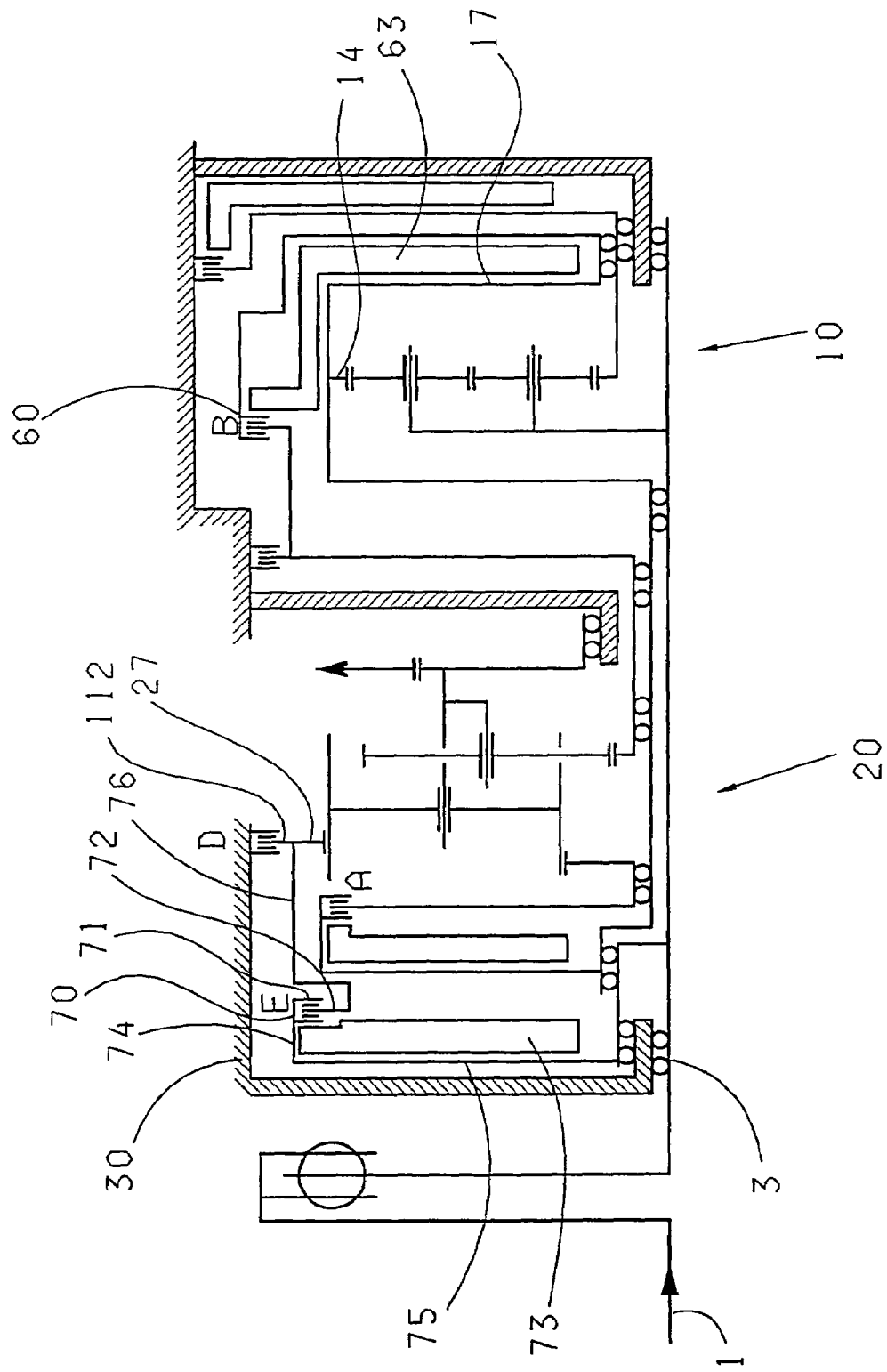

The following component-arrangement-variant of an invented multistage transmission with the first invented primary planetary gear set variant and advantageously, axis parallel input and output drives in accordance with FIGS. 29–33, possess in accordance with FIG. 18, the described and explained principal planetary gear set 20. The component item is again, unchanged, still being the Ravigneaux Gear Set, but with the large sun gear 22 as a first input element, with the small sun gear 21 as a second input element, with the internal gear 27 as a third input element, as well as with the coupled spiders 25, 26 serving as the output element of the principal planetary gear set 20. In the component-arrangement-variants as depicted in FIG. 29 to FIG. 31, as a difference to FIG. 18, the small sun gear 21 is placed on that side of the principal planetary gear set 20 which is proximal to the primary planetary gear set 10. In the component-arrangement-variant as seen in accordance with FIG. 32 and FIG. 33, analogous to FIG. 18, the large sun gear 22 is placed in that side of the principal planetary gear set 20 which is proximal to the primary planetary gear set 10. The assigned still-ratios can be taken from the table in FIG. 18.

In the component-arrangement-variants in accordance with FIG. 29 to FIG. 31, the fifth shifting element E, constructed as a clutch, is respectively placed on the input drive side, thus on that side of the transmission housing 30, which is proximal to the (not shown) drive motor. The transmission input drive shaft 3, which is actively connected with the drive shaft 1 of the motor, and with which an input element of the clutch E is connected, completely penetrates the transmission centrally in the axial direction. The sixth, shifting element F, serving as a brake, is placed on that side of the transmission which lies opposite to the motor and in a radial direction above the extending projection 33 of the transmission housing wall 31, which extends itself in the inner space of the housing 30. In this arrangement, the transmission housing wall 31 simultaneously forms the outerwall of the transmission housing 30 and in an axial direction, the sixth shifting element F borders on the housing wall 31. The principal planetary gear set 20 is nearer to the clutch E, that is to say, nearer to the drive motor than is the primary planetary gear set 10. The primary planetary gear set 10 is nearer to the brake F than is the principal planetary gear set 20. The spur gear 9 and the therewith actively connected output drive shaft 4 are, in axial direction, approximately located in the middle of the transmission, spatially between the principal and the primary planetary gear sets 20 and 10, directly bordering on the principal planetary gear set 20 on its side which is proximal to the primary planetary gear set 10. In this arrangement the spur gear 9 is always located above the support plate 35 on the transmission housing 30, whereby the support plate 35 borders, in the axial direction, on the spur gear 9 on its side which is remote from the principal planetary gear set 20 and is bound to the transmission housing 30. Obviously, it is possible, that the transmission housing 30 and the support plate 35 can also be made in a one-piece construction.

In the twentieth exemplary component—arrangement-variant illustrated in FIG. 29, proposed is that the clutch E, which is placed on the input drive side of the multistage transmission borders directly on the principal planetary gear set 20. In this arrangement, the at least most predominately disk-like designed inner disk carrier 72 of the clutch E, serving as the input element thereof, is connected with the input drive shaft 3. The disks 71 of the clutch E border on that side of the outer wall of the transmission housing 30, which is proximal to the motor drive shaft 1 and are set at the greatest diameter possible within the transmission housing 30. Obviously, it is possible that this outer wall can also be made as a separate cover, which is bound to the transmission housing 30. The output element of the clutch E is designed as an outer disk carrier 70 and possesses a cylindrical section 76, which extends in the axial direction up to the internal gear 27 of the principal planetary gear set 20 and is bound therewith. A cylindrical section 114 of the inner disk carrier 112 of the brake D attaches itself to the cylindrically shaped section 76 in a position axially in the direction of the primary planetary gear set 10 and radially above the internal gear 27. The cylindrical section 114 connected with both the cylindrically shaped section 76 as well as with the internal gear 27, which, in this detailed example forms the third input element of the principal planetary gear set 20. The servo element 73 of the clutch E is spatially placed between the inner disk carrier 72 of the clutch E and the principal planetary gear set 20 and activates the disks 71 of the clutch E from their side which is proximal to the principal planetary gear set 20. In an advantageous manner, the servo apparatus 73 of the clutch E now rotates continually with the transmission input rotary speed, namely $n_1$, whereby an undesirable dry-run situation of the rotating piston space and—insofar as provided in the practical construction of the servo apparatus—of the rotating pressure compensation space of the clutch E, when in its non-engage condition, is reliably prevented.

The large sun gear 22 of the principal planetary gear set 20 is placed on that side of the principal planetary gear set 20 which is proximal to the input motor drive shaft 1 and is connected with the first sun gear shaft 6. The first sun gear shaft 6 extends itself coaxially directly above the drive shaft 3, the extension being axial in the direction of the primary planetary gear set 10. The first sun gear shaft is further supported on the drive shaft 3 and penetrates the principal planetary gear set 20, the spur gear 9 and the support plate 35 as well as the output element of the clutch B, which here is serving as an inner disk carrier 62 and is connected with a disk-like section 47 of output element of the clutch A which is serving here as inner disk carrier 42. The small sun gear 21 of the principal planetary gear set 20 is placed on that side of the principal planetary gear set which is proximal to the primary planetary gear set and is connected with the second sun gear shaft 7. The second sun gear shaft 7 extends itself coaxially immediately above the first sun gear shaft 6 axially in the direction of the primary planetary gear set 10 and is, for example, placed on the first sun gear shaft 6 and penetrates the spur gear 9 and the support plate 35 centrally and is connected to a disk-like section 67 of the output element of the clutch B, which said output element here serves as an inner disk carrier 62.

The large sun gear 22 of the main planetary set 20 is arranged and with the first sun gear shaft 6 connected on the motor shaft 1 turned sides of the main planetary gear set 20. The first sun gear shaft 6 extends coaxially toward connecting planetary gear set 10, for example, is stored on the drive shaft 3, penetrates the man planetary gear set 20, the spur gear 9 and the base plate 35 as well as the inner disk carrier 62 trained output element of the clutch B centrically and is connected with a disk-like section 47 here as inner disk carrier 42 of the trained output element of the clutch A. The small sun gear 21 of the main planetary gear set 20 is arranged with a second sun gear shaft 7 connected on the connecting planetary gear set 10 turned side of the main planetary gear set 20. The second sun gear shaft 7 extends coaxially directly above the first sun gear shaft 6 toward connecting planetary gear set 10, for example, is stored on the first sun gear 6, penetrates the spur gear 9 and the base plate 35 centrically and is connected with a disk-like section 67 here as inner disk carrier 62 of the trained output element of the clutch B.

Attaching themselves to the support plate 35, axially in the direction of the transmission housing wall 31, thus, in the direction of that side of the multistage transmission remote from the motor, are the following components, in the given succession, namely the brake C, the clutch B, the clutch A of the primary planetary gear set 10 and the brake F. Without a detailed description of the spatial arrangement of the brake F, the connecting planetary gear set 10, the disks 41, 61, 101 of the clutches A, B, C as well as the interconnected outer disk carriers 40, 60 of the clutches A, B as their entrance elements relative to each other can be done here, because their arrangement has been taken over for placement in FIG. 29 without change from the previously mentioned eighteenth component-arrangement-variant shown in FIG. 27, a detailed explanation of the following components will be here omitted. Compared to FIG. 27 the formation of the inner disk carriers 42, 62 of both clutches A, B as well as the arrangement of the servo apparatus 63 of the clutch B has been modified. Both output elements of the clutches A, B, which here are respectively serving as inner disk carriers 42, 62 now possess the shape of a cylinder opening in the direction of the primary planetary gear set 10, having, respectively cylindrical section 46, 66 and respectively a disk-like section 47, 67. In that area, in which the cylindrical section 66 of the output element of the clutch B transitions into the disk-like shaped section 67, the inner disk carrier 102 of the brake C connects with this output element of the clutch B. The servo apparatus 43 of the clutch A is spatially placed between the primary planetary gear set 10 and the inner disk carrier 42 of the clutch A, the servo apparatus 63 of the clutch B is placed between the inner disk carrier 42 of the clutch A and the inner disk carrier 62 of the clutch B. The disks 41, 61 of both clutches are activated in the direction of the principal planetary gear set 20. The bent manner of construction and the mutual encapsulation of both inner disk carriers 42, 62, together with the servo apparatuses 43, 63 of both clutches A, B, enable a very compact assembly of this component group, whereby especially, radially under the respective cylindrical section 46, 66 of the inner disk carrier 42, 62, workroom is created for the dynamic pressure compensation of the individual clutch.

FIG. 30 shows a twenty first exemplary component-arrangement-variant of a multistage transmission with the first invented primary planetary gear set variant and advantageously, axis parallel input and output drives, derived from the previous component-arrangement-variant in accordance with FIG. 29. Compared with FIG. 29, here the arrangement of the clutch A is essentially changed. Proposed is, that the clutch A is now to be placed spatially between the clutch E and the principal planetary gear set 20, that is, on the side of the principal planetary gear set 20 which is remote from the spur gear 9 and the primary planetary gear set 10, that is, advantageously directly bordering on the principal planetary gear set 20 and the clutch E.

The servo apparatus 63 of the clutch B borders, without change, axially in the direction of the primary planetary gear set 10 on the disk-like section 67 of the output element of the clutch B, here serving as the inner disk carrier 62. Between the servo apparatus 63 of the clutch B and the primary planetary gear set 10, is now provided a cylindrical output drive element 18, which, first, is bound with the internal gear 14 of the primary planetary gear set 10 and second, with a interposed shaft 8. This interposed shaft 8 extends itself coaxially directly above the input drive shaft 3 in an axial direction from the primary planetary gear set 10 to the input element of the clutch A which is here serving as outer disk carrier 40. In doing this, the interposed shaft 8 passes centrally through the clutch space of the clutch B formed by the inner disk carrier 62, the second sun gear shaft 7 the support plate 35 and the spur gear 9 as well as the principal planetary gear set 20 and the output element of the clutch A which here serves as inner disk carrier 42. In the illustrated example, the interposed shaft 8 is placed directly on input drive shaft 3 and the third sun gear shaft 7, is in turn, placed on the interposed shaft 8. For example, provision can be made, that the second sun gear shaft 7 additionally, or even exclusively can be placed in the support plate 35.

To achieve an improved placement of the unchanged input elements of the of the clutch B, which are serving as outer disk carriers 60, the predominately cylindrical shaped section 64 extends outward, which said section is axially connected with the internal gear of the primary planetary gear set 10 in the direction of the brake F above the primary planetary gear set 10. To this cylindrical section 64, a disk-like section 65 attaches, and extends centrally in the direction of the input drive shaft 3 up to the sun gear shaft 85 of the primary planetary gear set 10, which binds the sun gear 11 to the inner disk carrier 82 of the brake F. The disk-like section 65 extends also between the primary planetary gear set 10 and the disk-like section 84 of the inner disk carrier 82 of the brake F. By means of a corresponding support section of the disk-like section 65, the outer disk carrier 60 of the clutch B is placed upon the sun gear shaft 85 of the primary planetary gear set 10.

As has already been mentioned, the clutch E is now placed on that side of the transmission housing 30, which is proximal to the (not shown) motor, whereby the inner disk carrier 72 of the clutch E is designed (without change) to be disk-like and is bound to the input shaft 3. As a variant to the arrangement of the servo apparatus 73 of the clutch E, as described in FIG. 29, it is proposed in FIG. 30 to place the servo apparatus 73 of the clutch E on that side of the disks 71 which are remote from the principal planetary gear set 20. Accordingly, the disks 71 of the clutch E are activated in the direction of the principal planetary gear set 20. For the reception of the servo apparatus 73 within the outer disk carrier 70 of the clutch E for the placement of the outer disk carrier 70 onto the input drive shaft 3, the cylindrical section 76 extends itself as an output element of the clutch E, serving as an outer disk carrier 70, axially in the direction of the motor, over the disks 71 and the servo apparatus 73, up to an approach to the outer wall of the transmission housing 30. A disk-like section 77, which borders the outer wall attaches itself to the cylindrical section 76 of the output element of the clutch E and, by means of a correspondingly designed support section, is carried by the cylindrical section 76.

As above, the clutch A is now spatially located between the clutch E and the principal planetary gear set 20. With this configuration, the input element of the clutch A is designed as an outer disk carrier 40, in the form of an cylinder opening in the direction of the principal planetary gear set 20, having a cylindrical section 44, which extends itself between the clutch A and the disks 71 of the clutch E and, with a disk-like section 45, which attaches itself onto the cylindrical section 44 and extends itself centrally in the direction of the input shaft 3 up to the interposed shaft 8—running coaxially above the input drive shaft 3—and is connected to this interposed shaft 8. With this arrangement, the disk-like section 45 borders directly onto the disk-like inner disk carrier 72 of the clutch E, The servo apparatus 43 of the clutch A is placed within the cylindrical outer carrier 40 of the clutch A, and activates the disks 41 in the direction of the principal planetary gear set 20. The inner disk carrier 42 of the clutch A, which has advantageously been designed in a disk-like manner, extends itself centrally in the direction of the input shaft 3 up to the interposed shaft 8, upon which it is placed. This support section of the inner disk carrier 42, directly radially above the interposed shaft 8 can be interpreted as a first, axial sun gear shaft 6, by which the inner disk carrier 42 of the clutch A connects with the first input element of the principal planetary gear set 20.

As may be seen in FIG. 30, the output element of the clutch E bypasses the clutch A entirely. For reasons concerning ease of assembly of the outer disk carrier 40 of the clutch A, within the outer disk carrier 70 of the clutch E, the disks 41 of the clutch A have a slightly smaller diameter than do the disks 71 of the clutch E. The brake D, shown to be radially above the clutch A can, obviously, also be above the internal gear 27 of the principal planetary gear set 20.

FIG. 31 shows a twenty-second exemplary component-arrangement-variant of the multistage transmission with the first invented primary planetary gear set variant and advantageously axis parallel input and output drives, essentially based on the previous component-arrangement-variant as shown in FIG. 30. The changes in comparison to FIG. 30 involve predominately, the formation of the input and the output elements of the clutch E as well as the geometric arrangement of the input element of the clutch B and the spatial positioning of the servo apparatus 63 of the clutch B. What is proposed here is, that the input element of the clutch E is to fulfill the function of an outer disk carrier 70. An at least generally disk-like section 75 of this input element of the clutch E is bound to the input drive shaft 3, extends parallel to the outer wall of the transmission housing 30 which said outer wall is proximal to the motor shaft 1 and, as may be seen in the attached illustrated example, is further attached to this said outer wall. A cylindrical section 74 of the input element of the clutch E attaches itself at the greatest possible diameter to the disk-like section 75, and extends axially in the direction of the principal planetary gear set 20 up to the disks 71 of the clutch E. The output element of the clutch E is to serve as inner disk carrier 72 and possesses, at least, a predominately cylindrical section 76, which extends over the internal gear 27 of the principal planetary gear set 20 and is connected to the internal gear 27. In this arrangement, the output element of the clutch E completely bypasses the clutch A. The brake D is to be found in a radial direction above the internal gear 27, the inner disk carrier 112 of said brake D, as well as the cylindrical section 76 of the output element of the clutch E are bound to the internal gear 27. The servo apparatus 73 of the clutch E borders on the disk-like section 75 of the input element of the clutch E, axially in the direction of the principal planetary gear set 20 and activates the disks 71 of the clutch E in the direction of the principal planetary gear set 20. In this arrangement, the servo apparatus 73 is placed completely within the driven outer disk carrier 70 of the clutch E and rotates in an advantageous manner, continually with the transmission input speed of rotation, namely $n_1$. Further advantages arise due to the possibility of a simple pre-assembly of the complete clutches E and A as a unified component, that is to say, additionally together with the inner disk carrier of the brake D.

Giving consideration to the placement of the servo apparatus 63 of the clutch B, the proposal is, that this is now to be predominately located on that side of the primary planetary gear set 10 which is remote from the principal planetary gear set 20, whereby an activation element of the servo apparatus 63 bypasses the internal gear 14 of the primary planetary gear set 10 and activates the disks 61 of the clutch B in the direction of the principal planetary gear set 20. The placement shown in FIG. 31 of the servo apparatus 63, the hereto assigned geometric formation of the cylindrical outer disk carrier 60 of the clutch B and the connection of the outer disk carrier 60 by means of the disk-like output element 17 by the internal gear 14 to the principal planetary gear set 10 has already been described in the second component-arrangement-variant and illustrated in FIG. 6.

Since, the input drive shaft 3, as previously described and illustrated in FIGS. 18 to 31, concerning the ninth to twenty-second component-arrangement-variant of the entire transmission, axially penetrates the entire transmission up to the outer wall of the transmission housing 30, it is possible to provide in various other designs of the ninth to twenty-second component-arrangement-variants, wherein the motor shaft 1, and therewith the drive motor of the multistage transmission can be externally placed, respectively, at the other outer end of the transmission housing 30, thus bordering on the transmission wall 31 which, in turn, is borders inside by the brake F.

Figure 32:
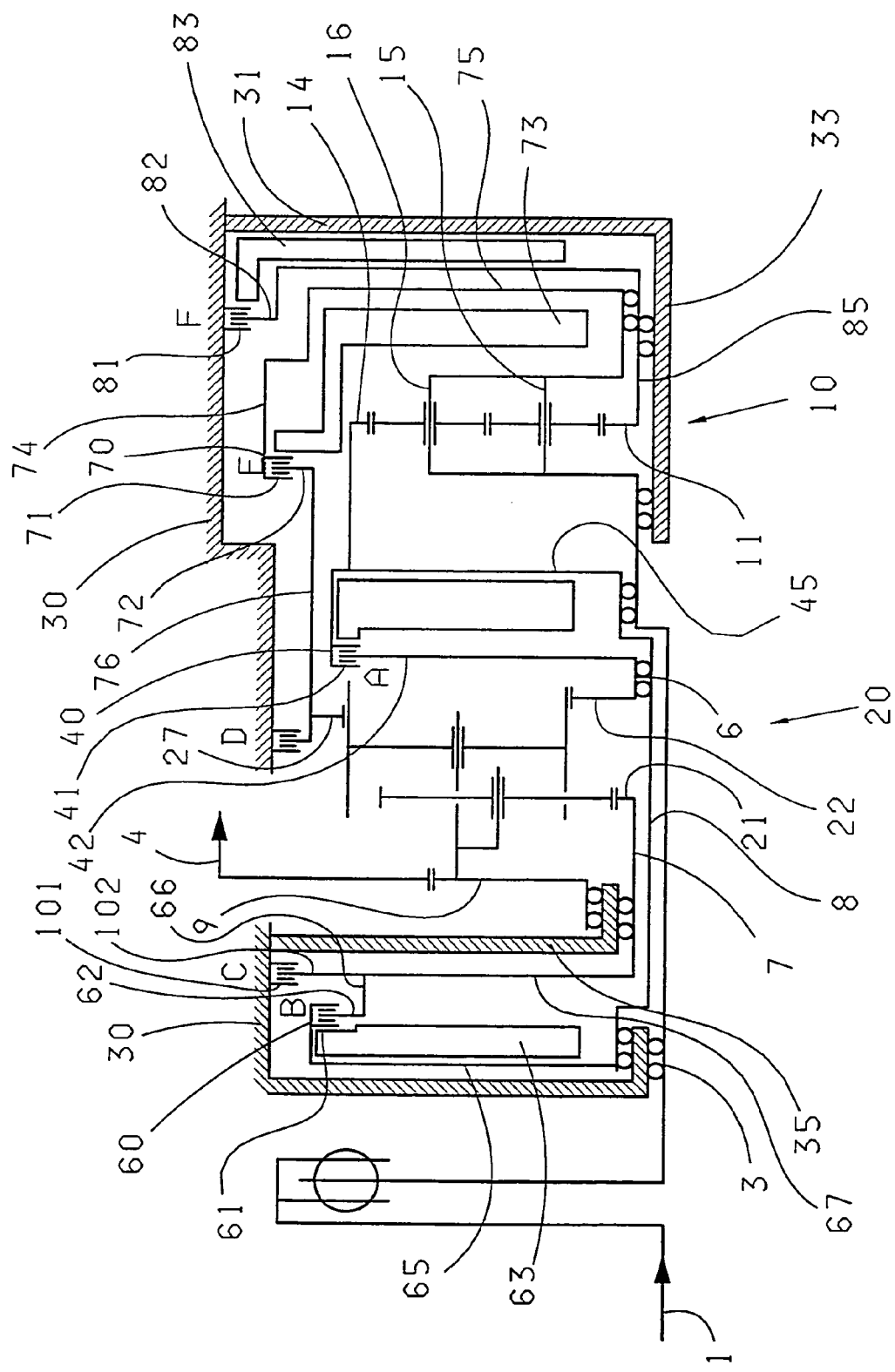
Figure 33:
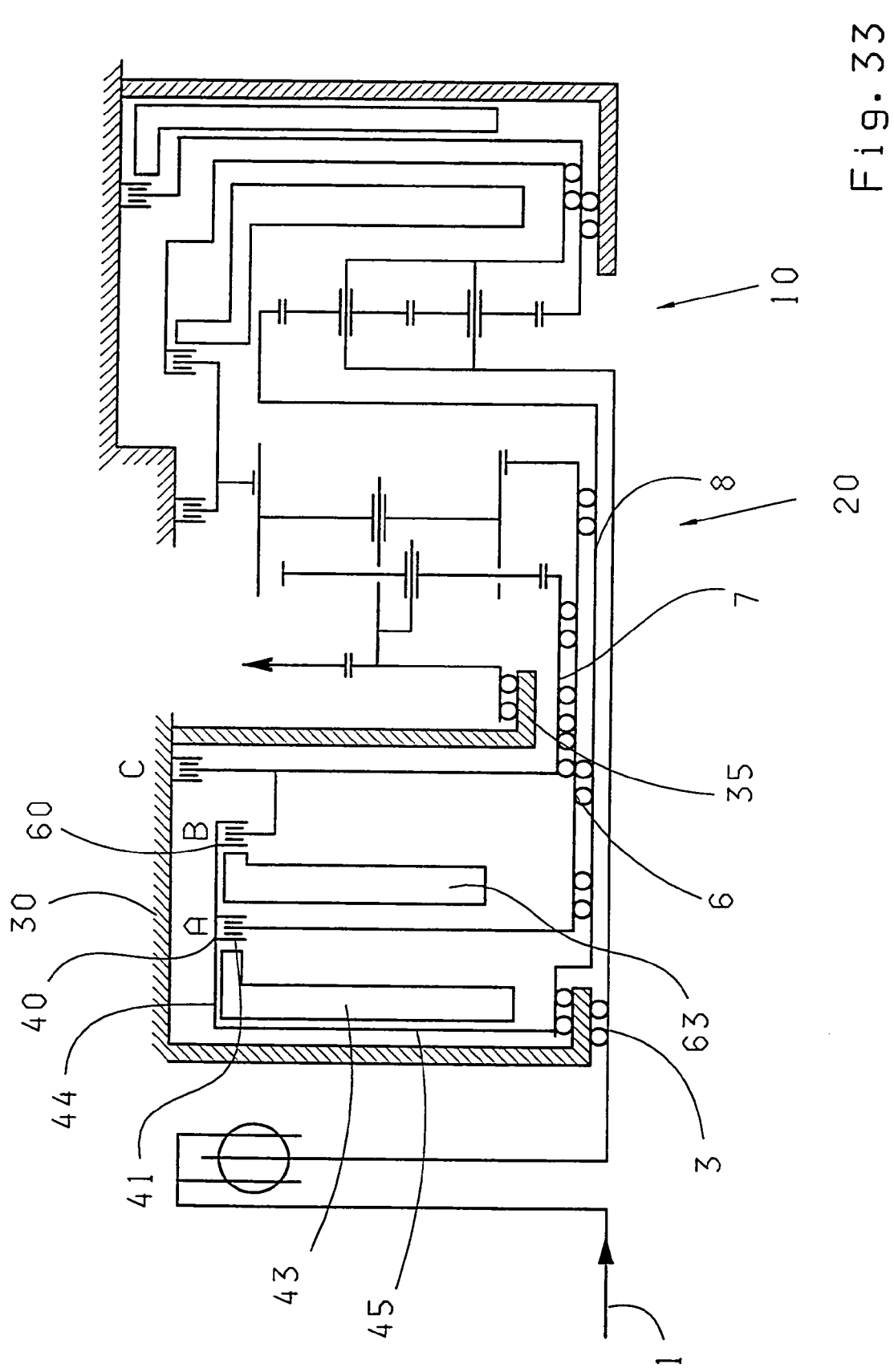

Now giving consideration to FIGS. 32 and 33, two additional exemplary component-arrangement-variant of the multistage transmission with the first invented primary planetary gear set variant and advantageously axis parallel input and output drives, are described, wherein the primary planetary gear set 10, clutch E and brake F are placed together on the side of the principal planetary gear set 20, which said gear set lies opposite to the motor shaft 1 and therewith, the (not shown) motor of the multistage transmission. The brake F is, in this arrangement, is placed directly contiguous to the transmission housing wall 31, which wall forms the outer wall of the transmission housing 30 which lies opposite to the motor shaft 1. The disks 81 of the brake F are located within the transmission housing 30, and situated at the greatest possible diameter to save on transmission length. The inner disk carrier 82 of the brake F serves as an open cylinder opening in the direction of the motor shaft 1 and in the projection 33 and is secured on the transmission wall 31 and, by means of the sun gear shaft 85 of the primary planetary gear set 10 is bound to the sun gear shaft 11 of the same. The servo apparatus 83 of the brake F is placed axially between the transmission wall 31 and the inner disk carrier 82 and activates the disks 81 of the brake F in the direction of the motor shaft 1.

The input element of the clutch E, which, in the direction of the motor shaft 1, serves as the outer disk carrier 70, borders the inner disk carrier 82 of the brake F. In this arrangement, the input element of the clutch E has a disk shaped section 75, which borders directly on the inner disk carrier 82 of the brake F, upon which the sun gear shaft 85 of the primary planetary gear set 10 is supported and, with the coupled spiders 15, 16 of said gear set, is secured on its side located opposite to the motor shaft 1. The coupled spiders 15, 16, in turn, penetrate the primary planetary gear set 10 and, on that side thereof, which is proximal to the motor shaft 1 are connected to the motor shaft 1. In the illustrated example, the coupled spiders 15, 16 are supported also on the projection 33 which protrudes from the housing wall 31 and extends correspondingly axially over the sun gear 11 of the primary planetary gear set 10. Further, the input element of the clutch E has a cylindrical section 74, which attaches onto the outer circumference of the disk-like section 75 and extends axially in the direction of the motor shaft 1 over the primary planetary gear set 10 to the disks 71 of the clutch E. The disks 71 are placed at least partially beside the primary planetary gear set 10, on the side thereof which is proximal to the motor shaft 1. The diameter of the disks 71 is, advantageously, only slightly smaller than the diameter of the disks 81 of the brake F and advantageously, clearly larger than the outer diameter of the internal gear 14 of the primary planetary gear set 10. The servo apparatus 73 of the clutch E is placed within the outer disk carrier 70, generally axially, between the disk-like section 75 and the primary planetary gear set 10, whereby an activation element of the servo apparatus 73, bypasses the internal gear 14 and activates the disks 71 in the direction of the motor shaft 1. The primary planetary gear set 10 is also placed completely within that clutch space of the clutch E, which space is formed by the outer disk carrier 70. The output element of the clutch E is correspondingly designed as the inner disk carrier 72, with a cylindrical section 76, which extends itself axially from the disks 71 in the direction of the motor shaft 1 up to the internal gear 27 of the principal planetary gear set 20, with which it is connected. In this situation, the brake D is placed above and connected to this internal gear 27 and further also connected to the cylindrical section 76. Such an arrangement for the servo apparatus 73 for the clutch E, prevents, in an advantageous manner, an empty run of the clutch space, that is to say, also the clutch compensation space, when the clutch E is not engaged. This is due to the fact, that the servo apparatus 73 continually rotates at the rotational speed of the transmission input speed, namely $n_{ein}$. In this way, the shifting ease upon successive shifting of the clutch E is improved, especially after a long idle time in a non-shifting condition.

In the twenty third component-arrangement-variant in accordance with FIG. 32, a further proposal is made, in particular, that the clutch A be spatially positioned between the primary planetary gear set 10 and the principal planetary gear set 20, in a radial direction underneath the cylindrical section 76 of the output element of the clutch E. When so carried out, then the input element of the clutch A serves as an outer dick carrier 40, in the form of a cylinder open in the direction of the motor shaft 1, and bound with the internal gear 14 of the primary planetary gear set 10. A disk-like section 45 of this input element of the clutch A extends itself on the side of the disks 41 of the clutch A, which side is proximal to the primary planetary gear set 10, and the extension continues centrally in the direction of the input drive shaft 3 and the disk-like section is attached to said shaft 3. This support section of the outer disk carrier 40 is bound with the interposed shaft 8, which runs directly above the input drive shaft 3 and axially in the direction of the motor shaft 1 up to the outer, motor sided wall of the transmission housing 30, and accordingly, centrally penetrates the principal planetary gear set 20. At the same time, the interposed shaft 8 forms the rotatable, active connection between the output element of the primary planetary gear set 10 and the input element of the clutch B. The disk-like inner disk carrier 42 of the clutch A extends itself centrally in the direction of the input shaft 3 up to the interposed shaft 8, on which it is supported, and the carrier 42 is then connected with the first input element, and in this embodiment also connected with large internal gear 22 of the principal planetary gear set 20. The short, axial support section, coaxially above the input drive shaft 3 between the inner disk carrier 42 and the sun gear 22, can be interpreted as a short, first sun gear shaft 6. The servo apparatus 43 of the clutch A is place within the cylindrical shaped outer disk carrier 40, axially between the disk-shaped section 45 and the inner disk carrier 42, and activates the disks 41 in the direction the motor shaft 1.

As may be seen in FIG. 32, the clutch B is located directly at that end of the transmission housing 30 proximal to the motor shaft 1. Accordingly, the input element of the clutch B is designed as outer disk carrier 60, that is, as a cylinder opening in the direction of the principal planetary gear set 20. A disk shaped section 65 of the input element to the clutch B is connected with the interposed shaft 8 and extends itself parallel to that outer wall of the transmission housing 30 adjacent to the motor. The extension continues into the area of the disks 61 of the clutch B. In the illustrated embodiment, the outer disk carrier 60 is supported in the area of the connection to the interposed shaft 8, at the outer wall of the transmission housing 30 which wall is close to the motor. However, the possibility exists, that the outer disk carrier 60 only, or even additionally, can be supported over the interposed shaft 8 but on the input drive shaft 3. The servo apparatus 63 of the clutch B is placed within the cylindrical outer disk carrier 60, axially borders directly on the disk-like section 65 on the side thereof which is opposite to the motor shaft 1, that is, on that side proximal to principal planetary gear set 20 and activates the disks 61 of the clutch B in the direction of the principal planetary gear set 20. In an advantageous manner, then the servo apparatuses 43, 63 of the two clutches A, B continually rotate with the output speed of rotation $n_{vs}$ of the primary planetary gear set 10.

The disks 101 of the brake C axially attach themselves on the disks 61 of the clutch B in the direction of the principal planetary gear set 20. The output element of the clutch B serves as an inner disk carrier 62, with a short, at least extensive cylindrical section 66 and a disk-like section 67. The cylindrical section 66 extends itself axially in the direction of the principal planetary gear set 20 up to an area underneath the disks 101 of the brake C and in that location is connected with the inner disk carrier 102 of the brake C. The disk-like section 67 attaches itself to the cylindrical section 66 and extends itself centrally in the direction of the input drive shaft 3 up to second sun gear shaft 7, which run coaxially directly above the interposed shaft 8. This second sun gear shaft 7 is, first, connected to the disk-like section 67 of the output element of the clutch B and, second, is connected with the second input element—in this embodiment, also with the small sun gear 21—of the principal planetary gear set 20. Thereby, the second sun gear shaft 7 penetrates the support plate 35 and the spur gear 9, which place themselves centrally in this axial succession in the direction of the principal planetary gear set 20 on the disk-like section 67 of the output element of the clutch B. The principal planetary gear set 20 borders directly on that side of the spur gear 9 which is remote from the motor. Thus, the support plate 35 divides the shifting element arrangement from clutch B and brake C, spatially from the spur gear 9 and the neighboring principal planetary gear set 20.

In the twenty-fourth component-arrangement-variant in accordance with FIG. 33 proposed, counter to the previously discussed twenty-third component-arrangement-variant as per FIG. 32, that the clutch A not be placed axially between the principal planetary gear set 20, and the primary planetary gear set 10, but be located directly on the side of the transmission housing 30, which side is proximal to the motor shaft 1, and when seen in the direction of the said motor shaft 1, thus placed in front of the clutch B. Between the motor-proximal outer wall of the transmission housing 30 and the support plate 35 are also now placed two shifting elements, namely the clutches A and B. As a result of this, now penetrate four shafts centrally through the support plate 36. These four shafts are namely: the input drive shaft 3, the interposed shaft 8, the first sun gear shaft 6 and finally, the second sun gear shaft 7. The enumerated shafts run coaxially, one above the other and in the given succession. Since the clutch A is placed on that side of the clutch B, which is remote from the principal planetary gear set 20, now the first sun gear shaft 6, which binds the output element of the clutch A with the first input element of the principal planetary gear set 20, and the sun gear shaft 6 now runs coaxially between first, the interposed shaft 8, which connects the output element of the primary planetary gear set 10 with the two input elements of the clutches A and B, and second, the second sun gear shaft 7, which connects the output element of the clutch B with the second input element of the principal planetary gear set 20.

The input element of the clutch A is designed as an outer disk carrier 40, now as a cylinder open in a direction toward the motor. A disk-like section 45 of this input element of the clutch A is bound to the interposed shaft 8 and extends itself parallel to the outer transmission housing wall 30 which runs close to the motor. On a diameter, which is nearly so large as that of the outside diameter of the disks 41 of the clutch A, a cylindrical section 44 of this input element of the clutch A attaches itself to disk-like section 45 and extends itself in the axial direction up to the area of the disks 41 and the clutch A. The outer disk carrier 60 of the clutch B, which is placed next to the clutch A, is bound to the outer disk carrier 40 of the clutch A. Thereby it is possible to provide, that both outer disk carriers 40, 60 can be made in one piece and/or identical disks can be employed for both clutches A, B. The servo apparatus 43 of the clutch A is placed within the cylindrical outer disk carrier 40 and activates the disks 41 in the direction of the principal planetary gear set 20. The inner disk carrier 42 of the clutch A, serving as the output element thereof, is made, for example, considerably very disk shaped and centrally located and bound with the first sun gear shaft 6. The servo apparatus 63 of the clutch B is placed, in the radial direction, underneath the outer disk carrier 60 of the clutch B, borders axially against the disk-like inner disk carrier 42 of the clutch A—upon that side thereof, which is proximal to the principal planetary gear set 20—and activates the disks 61 of the clutch B in the direction of the principal planetary gear set 20.

From the standpoint of production, in an advantageous manner, the proposed arrangement shown in FIG. 33 enables first, the use of a plurality of identical parts for the intended speed of rotation and equally torque-loaded clutches A and B, and second, also a very simple assembly operation as grouped construction by pre-assembly and ready to insert components into the transmission housing 30. In regard to functionality, advantageously, the servo apparatus 43 of the clutch A rotates continually with the output speed of rotation $n_{vs}$ of the primary planetary gear set 10.

In another embodiment to FIG. 33, provision can be made, that—with an unchanged arrangement—the input element of the clutch B is to be designed not as an outer disk carrier, but rather as an inner disk carrier, whereby the servo apparatus of the clutch B activates the disks of the clutch B in the direction of the motor shaft, for example, in a similar manner to FIG. 3. In an effective, technical-functional manner, in this embodiment, the servo apparatuses of both clutches A and B rotate continually with the output speed of rotation $n_{vs}$ of the primary planetary gear set 10.

As has previously be described in the embodiment of the fifth component-arrangement-variant in accordance with FIG. 10, it is possible, in the case of all component-arrangement-variants, where among them, the drive shaft 3 fully, axially penetrates the transmission, the driving motor of the transmission can be placed, very simply, on both end faces of the transmission housing. Also, with those proposed component-arrangement-variants as given in FIG. 11 to FIG.

17, and FIG. 23 to FIG. 31, the input drive shaft 3 does indeed axially penetrate completely through the transmission. For example, it is also possible to provide, respectively, other arrangements of the component-arrangement-variant proposals described individually in FIG. 11 to FIG. 17, so that the motor shaft 1 need not be placed so as to neighbor the sixth shifting element F, but rather the said shaft can be placed on that side of the multistage transmission on which the principal planetary gear set 20 and the clutch E are located, thus, on that side of the principal planetary gear set 20 which is remote from the primary planetary gear set 10 and on that side of the clutch E which is remote from the principal planetary gear set 20. The acoustic advantages of such an arrangement have already been described above. Obviously, it is possible that the input drive shaft 3 in such a case, must always be of one piece construction.

If, in a case of the previously described ninth to thirteenth component-arrangement-variant as set forth in FIG. 18 to FIG. 22, the innermost shaft of the multistage transmission is designed as a hollow shaft, then it is possible, with such an arrangement, that the motor shaft 1—thus the drive of the transmission—can be placed on a side opposite to that shown in the applicable figures.

All of the previously described component-arrangement-variants relate to the first invented, primary, planetary gear set variant, wherein the sun gear of the said primary planetary gear set 10 can be shifted.

Figure 34:
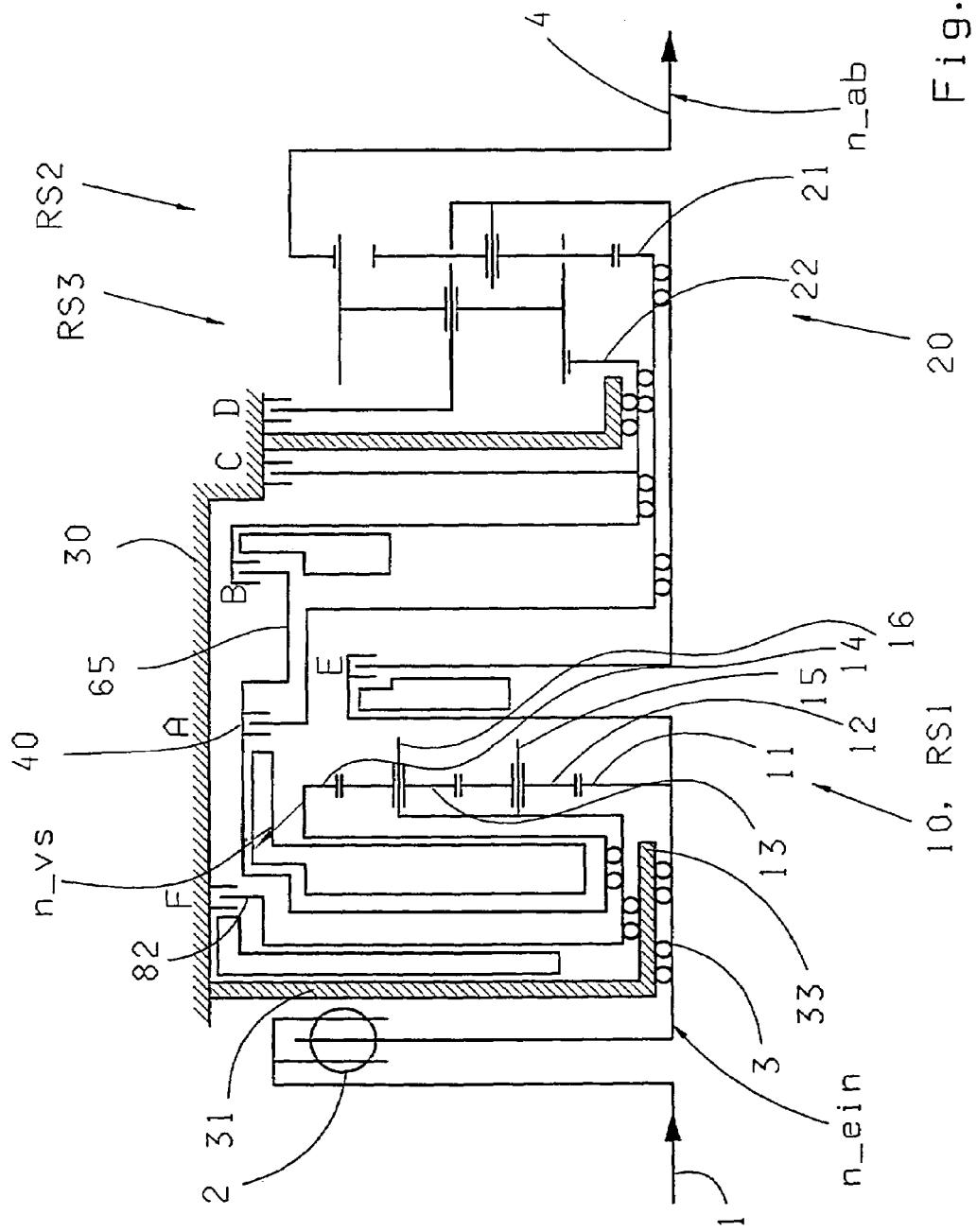
FIG. 34 is an exemplary transmission schematic view of a second primary-planetary gear set variant.

In FIG. 34 is presented an exemplary, schematic presentation of the second primary, planetary gear set variant, wherein with the primary, planetary gear set, the coupled spiders thereof can be shifted. Up to the connection of the components of the primary, planetary gear set 10, the component arrangement represents the embodiment essentially given in the previously described multistage transmission as shown by FIG. 3.

In accordance with the invention, the primary, planetary gear set 10 is designed as a shiftable, plus-transmission with inner and outer planet gears 12 and 13, the spiders 15, 16 of which are securely bound together. Thus, the sun gear 11 of the primary, planetary gear set 10 serves as the input element thereof and is bound with the drive shaft 3, and the internal gear 14 of the primary, planetary gear set 10, serves as the output element thereof and is bound, respectively, with the input elements of the first and the second shifting elements A, B. Further, the coupled spiders 15, 16 of the primary, planetary gear set 10 are immobilized by the sixth shifting element F serving as a brake which abuts on the transmission housing 30. As in the case of the previous embodiments, the output speed of rotation is $n_{vs}$, which, by the two shifting elements serving as clutches A, B this rotational speed can be transferred to two non-connected input elements (in the illustrated example, the small and the large sun gears 21, 22) of the principal planetary gear set 20. The spatial arrangement of the individual components involved therein represents the same arrangement, which has already been explained in FIG. 3.

The brake F is spatially placed between the motor side of the transmission wall 31 and the primary, planetary gear set 10. The transmission wall 31 and the brake F are also located on that side of the multistage transmission which is proximal to the motor shaft 1, that is, the torsion damper 2. The inner disk carrier 82 of the brake F is supported on the projection 33, which extends itself in the direction of the primary, planetary gear set 10 which projection extends itself from the transmission housing wall 31. In other words, the disk carrier 82 of the brake F is affixed to a hub protruding from the housing wall 31. In accordance with the invention, the inner disk carrier 82 of the brake F is now connected with the coupled spiders 15, 16 of the primary, planetary gear set 10. The setting of the outer disk carrier 40 of the clutch A, as the input element thereof—again as in FIG. 3—is placed in a radial direction below the location of the inner disk carrier 82 of the brake F on the projection 33, i.e., the hub. The inner disk carrier 82 of the brake F is placed in an axial direction between the transmission housing wall 31 and the primary, planetary gear set 10. There is no need, at this point, to enter into a detailed description of the formation and the arrangement of the other components of the multistage transmission in accordance with FIG. 34 and such a description is accordingly omitted.

The advantages of such an arrangement of the individual components relative to one another have already been described and explained in the description of FIG. 3.

As has been accomplished in the case of the multistage transmission with the first primary, planetary gear set variant, consideration should also be granted to the multistage transmission as presented in FIG. 34 in regard to the design of the principal planetary gear set 20 and the component arrangement as a major example. Obviously, it is also possible that other planetary gear set combinations, wherein the output speed of rotation $n_{vs}$ of the primary planetary gear set 10 can be transferred by means of two shifting elements to two free input elements of the principal planetary gear set 20 and the transmission input speed of rotation $n_{ein}$ can be transferred to a third free input element of the principal planetary gear set 20, as a principal planetary gear set 20 can be combined with the given gear set-scheme in accordance with FIG. 34. Likewise, it is also possible, that combined, proposed component arrangements of the shifting elements, as put forth in FIGS. 3 to 33, can be combined with the gear set arrangement of FIG. 34. Obviously, another possibility is that the proposed variants of assembly as shown in FIGS. 9 to 33 of a spur gear can be combined with the gear set arrangement of FIG. 34. Instead of the coaxial arrangement of input drive, primary planetary gear set 10 and principal planetary gear set, it is possible that also a straight line, or an angular dispositio, or even a parallel connection between the primary planetary gear set 10 and the principal planetary gear set 20 can be provided.

As in the case of the multistage transmission with the first primary, planetary gear set variant, also with the invented multistage transmission shown in FIG. 34, the input speed of rotation $n_1$ of the input drive shaft 3, by means of selective closure of the shifting elements A to F can be so transferred to the rotating output drive shaft 4, which is rotating at a speed of $n_{ab}$, that at least six forward stages can be achieved without group-shifting. In FIG. 35 is a corresponding shifting logic of the multistage transmission in accordance with FIG. 34, wherein seven forward speeds are presented, as well as the thereto pertaining ratios, stage-stepping, and total spreads. Likewise presented in FIG. 34 are the still-ratios of the individual gear sets RS1, RS2 and RS3, whereby, with RS1 the single planetary gear set of the primary, planetary gear set 10 and with RS2, RS3 the single planetary gear sets of the multi-component principal planetary gear set 20 are defined. Compared to the multistage transmissions described in FIGS. 1 to 33, with a shiftable (by means of the sun gear) plus-primary, planetary gear set, the proposed second primary, planetary gear set variant with shiftable, coupled spiders, a notable clearly increased spread is made possible, with unchanged, more favorable gear-stage stepping of all seven forward stages. By means of a simple omission of the direct stage, also a six stage transmission can be made available, similar to the first invented primary, planetary gear set variant.

REFERENCE NUMERALS

A, B, C, D, E, F Shifting elements, i.e. clutches/brakes
$n_{ein}$ Speed of rotation of transmission input
$n_{vs}$ Speed of rotation of item 10, i.e., primary planetary gear set
$n_{ab}$ Speed of rotation of final output drive shaft 4
1 Drive shaft from motor
2 Torsion damper, torque converter
3 Input drive shaft to transmission
4 Output shaft from transmission
5 Third shaft
6 First sun gear shaft
7 Second sun gear shaft
8 Interposed shaft
9 Spur gear
10 Primary planetary gear set (shiftable)
11 Sun gear of 10
12 Inner planetary gear of 10
13 Outer planetary gear of 10
14 Internal gear of 10
15 Spider of 12
16 Spider of 13
17 Output element, disk-like in shape, coacts with 14
18 Cylindrical output element of 14
20 Principal planetary gear set (4 shafts-Ravigneaux design)
21 Small sun gear of 20
22 Large sun gear of 20
23 First planet gear of 20
24 Second planet gear of 20
25 Spider of 23
26 Spider of 24
27 Internal gear of 20
28 Output shaft of 20
30 Transmission housing
31 Transmission housing wall
32 Intermediate plate
33 Projection, an extension protruding from 31
34 Hub assembly
35 Support plate
36 Cover for housing
37 Second support plate
38 Third support plate
39 Cylinder of the transmission housing
40 Outer disk carrier of the clutch A
41 Disks 41 of clutch A
42 Inner disk carrier of the clutch A
43 Servo Apparatus for the clutch A
44 Cylindrical section of the input element of the clutch A
45 Section (disk-like) of 44
46 Cylindrical section of the output element of the clutch A
47 Section (disk-like) of the output element of the clutch A
48 Piston of the clutch A
49 Reset spring for the piston of the clutch A
50 Baffle plate related to clutch A
51 Piston space of clutch A
52 Pressure compensation chamber of the clutch A
60 Outer disk carrier of the clutch B
61 Disks of clutch B
62 Inner disk carrier of the clutch B
63 Servo apparatus (clutch B)
64 Section (cylindrical) of the input element of the clutch B
65 Section (disk-like) of the input element of the clutch B
66 Cylindrical section of the output element of the clutch B
67 Disk-like section of the output element of the clutch B
70 Outer Disk carrier of the clutch E
71 Disks of clutch E
72 Inner disk carrier of the clutch E
73 Servo apparatus of the clutch E
74 Cylindrical section of the input element of the clutch E
75 Disk-like section of the input element of the clutch E
76 Cylindrical section of the output element of the clutch E
77 Disk-like section of the output element of the clutch E
80 Outer disk carrier of the brake F
81 Disks (Brake F)
82 Inner disk carrier (brake F)
83 Servo apparatus for the brake F
84 Disk-like section of the inner disk carrier of the brake F
85 Sun gear shaft of the primary planetary gear set 10
86 Pressure medium channel of the brake F
87 Piston of the brake F
88 Reset spring of the piston of the brake F
89 Support binding for the hub projection for the reset spring of brake
90 Piston chamber for the brake F
100 Outer disk carrier of the brake C
101 Disks for the brake C
102 Inner disk carrier (Brake C)
103 Cylindrical section of the inner disk carrier of the brake C
104 Disk-like section of the inner disk carrier of the brake C
105 Servo apparatus of the brake C
111 Disks of the brake D
112 Inner disk carrier for the brake D
113 Cylindrical section of the inner disk carrier of the brake D
114 Disk-like section of the inner disk carrier of the brake D

The invention claimed is:

1. A multistage transmission with an input drive shaft (3), which is connected to a primary planetary gear set (10), with an output drive shaft (4), which is connected with a principal planetary ger set (20), with a plurality of shifting elements (A to F), by means of which, selective closure of at least six forward stages can be shifted to and a transmission input speed of rotation ($n_{ein}$) of the input drive shaft (3), which is so transferable to the output drive shaft (4), that for shifting from one stage into a next higher successive stage or a next lower successive stage from an existing activated shifting element, respectively, only one shifting element is opened and another shifting element is closed, whereby the principal planetary gear set (20) possesses three non-coupled input elements, one output element of the primary planetary gear set (10) by means of a first shifting element (A) can be connected with a first input element of the principal planetary gear set (20) and by means of which a second shifting element (B) can be connected with a second input element of the principal planetary gear set (20), further, the input drive shaft (3) can be connected by means of a fifth shifting element (E) with a third input element of the principal planetary gear set (20) and an element of the primary planetary gear set (10) by means of a sixth shifting element (F) fixed in position, whereby the sixth shifting element (F) is secured on a side of the primary planetary gear set (10) which is remote from the principal planetary gear set (20) wherein the primary planetary gear set (10) serves as a plus-transmission with inner and outer planet gears (12, 13), spiders (15, 16) of which are bound together.

2. The multistage transmission according to claim 1, wherein the coupled spiders (15, 16) of the primary planetary gear set (10) are bound to the input shaft (3), an internal gear (14) of the primary planetary gear set (10) can be connected to the first and the second input elements of the principal planetary gear set (20), a sun gear (11) of the primary planetary gear set (10) can be affixed by means of the sixth shifting element (F).

3. The multistage transmission according to claim 1, wherein a sun gear (11) of the primary planetary gear set (10) is connected to the input drive shaft (3), an internal gear (14) of the primary planetary gear set (10) can be connected with the first and the second input element of the principal planetary gear set (20) and the coupled spiders (15, 16) of the primary planetary gear set (10) can be affixed by the sixth shifting element (F).

4. The multistage transmission according to claim 1, wherein the sixth shifting element (F) is placed in an axial direction bordering on a transmission housing wall (31), upon one of a projection (33) of the transmission housing wall (31) or on a hub (34) immovably affixed to the transmission housing wall (31), whereby the transmission housing wall (31) is designed as one of a part of the transmission housing (30) or as an interposed plate (32) securely affixed to the transmission housing (30).

5. The multistage transmission according to claim 4 wherein at least one pressure medium channel (86) for a pressurized means feed to a servo apparatus (83) of the sixth shifting element (F) is placed in one or more of the projection (33) of the transmission housing wall (31), the hub (34) and in the transmission housing wall (31), the interposed plate (32) and in the transmission housing (30) in spatial proximity to the servo apparatus (83) of the sixth shifting element (F).

6. The multistage transmission according to claim 4, wherein the transmission housing wall (31) is placed at an end of the transmission housing (30), which is proximal to a motor shaft (1) of a drive motor of the multistage transmission.

7. The multistage transmission according to claim 4, wherein the transmission housing wall (31) is placed on one end of the transmission housing (30), which lies opposite to a motor shaft (1) of a drive motor of the multistage transmission.

8. The multistage transmission according to claim 4, wherein a disk-like section of an inner disk carrier (82) of the sixth shifting element (F) is placed directly contiguous to one of the transmission housing wall (31) and the interposed plate (32).

9. The multistage transmission according to claim 4, wherein a servo apparatus (83) for a activation of the sixth shifting element (F) is placed immediately neighboring to one of the transmission housing wall (31), to the interposed plate (32) or is integrated in one of the transmission housing wall (31) into the interposed plate (32).

10. The multistage transmission according to claim 4, wherein a servo apparatus (83) of the sixth shifting element (F) is placed, in the axial direction, between one of the transmission housing wall (31), or the interposed plate (32) and the primary planetary gear set (10).

11. The multistage transmission according to claim 4, wherein a servo apparatus (83) of the sixth shifting element (F) activates disks (81) of the sixth shifting element (F) in one of a counter direction toward the transmission housing wall (31), and in a counter direction to the interposed plate (32).

12. The multistage transmission according to claim 4, wherein a servo apparatus (83) of the sixth shifting element (F) activates disks (81) of the sixth shifting element (F) in a direction toward the transmission housing wall (31), that is, toward the interposed plate (32).

13. The multistage transmission according to claim 4, wherein a servo apparatus (83) of the sixth shifting element (F) is placed, in axial direction, between the transmission housing wall (31), that is the interposed plate (32) and a second servo apparatus (43) for a activation of the first shifting element (A), whereby, a disk-like section of an inner disk carrier (82) of the sixth shifting element (F) borders directly on the transmission housing wall (31), that is, on the interposed plate (32).

14. The multistage transmission according to claim 13, wherein one or more of the second servo apparatus (43) and disks (41) of the first shifting element (A) are at least partially placed on a side of the primary planetary gear set (10), which is remote from the principal planetary gear set (20).

15. The multistage transmission according to claim 4, wherein the servo apparatus (83) of the sixth shifting element (F) is placed, in the axial direction, between the transmission housing wall (31), that is, the interposed plate (32) and a servo apparatus (63) for the activation of the second shifting element (B).

16. The multistage transmission according to claim 15, wherein a third servo apparatus (63) for activation of a second shifting element (B) is placed on a side of the primary planetary gear set (10) which is remote from the principal planetary gear set (20).

17. The multistage transmission according to claim 1, wherein disks (81) of the sixth shifting element (F) are of a greater diameter than is an internal gear (14) of the primary planetary gear set (10).

18. The multistage transmission according to claim 1, wherein the sixth shifting element (F) is designed as a start-shifting element of the multistage transmission.

19. The multistage transmission according to claim 1, wherein an output element of a first shifting element (A) bypasses a fifth shifting element (E) in an axial direction, especially disks (71) of the fifth shifting element (E).

20. The multistage transmission according to claim 1, wherein disks (41) of the first shifting element (A) are placed at one or more of at least partially radially above the primary planetary gear set (10) and at least partially radially above disks (71) of the fifth shifting element (E).

21. The multistage transmission according to claim 1, wherein an output element of the first shifting element (A) at least partially penetrates a clutch space of the second shifting element (B).

22. The multistage transmission according to claim 19, wherein the first shifting element (A) is placed in greater proximity to the sixth shifting element (F) than the second shifting element (B), especially in that at least one of disks (41) and a servo apparatus (43) of the first shifting element (A) are placed nearer to a servo apparatus (83) of the sixth shifting element (F) than are disks (61) of the second shifting element (B).

23. The multistage transmission according to claim 19, wherein on a side of the first shifting element (A) which is proximal to the principal planetary gear set (20), the second shifting element (B) is placed axially next to the first shifting element (A), especially in that on a side of the disks (41) which is proximal to the principal planetary gear set (20) of the first shifting element (A), disks (61) of the second shifting element (B) are placed axially next to disks (41) of the first shifting element (A).

24. The multistage transmission according to claim 19, wherein one or more of the disks (41) and the servo apparatus (43) of the first shifting element (A) are placed at least partially radially underneath disks (81) of the sixth shifting element (F).

25. The multistage transmission according to claim 24, wherein the servo apparatus (43) of the first shifting element (A) is placed axially beside the primary planetary gear set (10).

26. The multistage transmission according to claim 19, wherein the fifth shifting element (E) is placed between the primary and the principal planetary gear sets (10, 20), bordering in an axial direction on the primary planetary gear set (10), whereby, especially the disks (71) of the fifth shifting element (E) at least partially are placed radially beneath disks (61) of the second shifting element (B).

27. The multistage transmission according to claim 1, wherein an output element of the second shifting element (B) at least partially bypasses the first shifting element (A) in the axial direction, especially disks (41) of the first shifting element (A).

28. The multistage transmission according to claim 27, wherein the second shifting element (B) is placed nearer to the sixth shifting element (F) than the first shifting element (A), especially in that one or more of disks (61) and a servo apparatus (63) of the second shifting element (B) is nearer to a servo apparatus (83) of the sixth shifting element (F) than are the disks (41) of the first shifting element (A).

29. The multistage transmission according to claim 27, wherein on a side of the second shifting element (B) which is proximal to the principal planetary gear set (20), the first shifting element (A) is placed axially next to the second shifting element (B), especially in that on a side of the of the disks (61) of the second shifting element (B), which said side is proximal to the principal planetary gear set (20), the disks (41) of the first shifting element (A) are placed axially beside the disks (61) of the second shifting element (B).

30. The multistage transmission according to claim 27, wherein disks (61) of the second shifting element (B) are placed at least partially above the primary planetary gear set (10).

31. The multistage transmission according to claim 27, wherein one or more of disks (61) and a servo apparatus (63) of the second shifting element (B) are placed at least partially radially beneath disks (81) of the sixth shifting element (F).

32. The multistage transmission according to claim 27, wherein disks (61) of the second shifting element (B) are placed at least partially radially above disks (71) of the fifth shifting element (E).

33. The multistage transmission according to claim 31, wherein the servo apparatus (63) of the second shifting element (B) is placed axially next to the primary planetary gear set (10).

34. The multistage transmission according to claim 27, wherein the fifth shifting element (E) is placed between the primary and the principal planetary gear sets (10, 20), in an axial direction bordering on the primary planetary gear set (10), whereby especially disks (71) of the fifth shifting element (E) are placed at least partially radially beneath the disks (41) of the first shifting element (A).

35. The multistage transmission according to claim 1, wherein an input element of the fifth shifting element (E) at least partially bypasses the first shifting element (A) in the axial direction, especially disks (41) of the first shifting element (A).

36. The multistage transmission according to claim 1, wherein an input element of the fifth shifting element (E) of the second shifting element (B), in an axial direction, at least radially, partially bypasses, disks (61) of the second shifting element (B).

37. The multistage transmission according to claim 35, wherein the fifth shifting element (E) is placed, in axial direction, between the primary and the principal planetary gear sets (10, 20), more proximal to the principal planetary gear set (20) than the first and second shifting element (A, B).

38. The multistage transmission according to claim 35, wherein the fifth shifting element (E) is placed, in axial direction, between the primary planetary gear set (10) and the principal planetary gear set (20), bordering the primary planetary gear set (10).

39. The multistage transmission according to claim 1, wherein an output element of the fifth shifting element (E) bypasses the first shifting element (A) in axial direction, especially disks (41) of the first shifting element (A).

40. The multistage transmission according to claim 39, wherein the first and the fifth shifting element (A, E) are placed on a side of the principal planetary gear set (20) which is remote from the primary planetary gear set (10), whereby, one or more of the first shifting element (A) and the disks (41) are placed axially between the fifth shifting element (E) and the principal planetary gear set (20).

41. The multistage transmission according to claim 39, wherein the first shifting element (A) is placed between the primary and the principal planetary gear sets (10, 20), and in that the fifth shifting element (E) is placed on a side of the first shifting element (A) which is remote from the principal planetary gear set (20).

42. The multistage transmission according to claim 1, wherein the fifth shifting element (E) is placed at least partially, in a radial direction, above the primary planetary gear set (10), disks (71) of the fifth shifting element (E) are placed at least partially above the primary planetary gear set (10).

43. The multistage transmission according to claim 42, wherein a servo apparatus (73) for activation of the fifth shifting element (E) is placed on a side of the primary planetary gear set (10) which is remote from the principal planetary gear set (20), especially bordering on the primary planetary gear set (10).

44. The multistage transmission according to claim 1, wherein the first shifting element (A) is placed on a side of the primary planetary gear set (10) which is remote from the principal planetary gear set (20) and the fifth shifting element (E) is placed on a side of the principal planetary gear set (20) which is remote from the primary planetary gear set (10).

45. The multistage transmission according to claim 1, wherein disks (41) of the first shifting element (A) are axially placed between disks (71) of the fifth shifting element (E) and the principal planetary gear set (20), bordering on the disks (71) of the fifth shifting element (E).

46. The multistage transmission according to claim 45, wherein the disks (41) of the first shifting element (A) border, in the axial direction, the principal planetary gear set (20).

47. The multistage transmission according to claim 1, wherein the fifth shifting element (E) is placed on a side of the principal planetary gear set (20) which is remote from the primary planetary gear set (10).

48. The multistage transmission according to claim 47, wherein the input drive shaft (3) is penetratively conducted centrally through the principal planetary gear set (20).

49. The multistage transmission according to claim 47, wherein the fifth shifting element (E) borders, in axial direction, directly on the principal planetary gear set (20).

50. The multistage transmission according to claim 1, wherein the third input element of the principal planetary gear set (20), by means of a third shaft (5) is connected to an output element of the fifth shifting element (E), and in that the first input element of the principal planetary gear set (20), by means of a first sun gear shaft (6) is connected to an output element of the first shifting element (A), the second input element of the principal planetary gear set (20), by means of a second sun gear shaft (7) is connected with an output element of the second shifting element (B), whereby the third shaft (5) penetrates centrally through the principal planetary gear set (20) and whereby the first sun gear shaft (6) one or more of runs between the primary and the principal planetary gear sets (10, 20) coaxially above the third shaft (5) and is positioned on the same, and whereby the second sun gear shaft (7) one or more of runs between the primary and the principal planetary gear sets (10, 20) coaxially above the first sun gear shaft (6) and is positioned on the same.

51. The multistage transmission according to claim 1, wherein the input drive shaft (3) is conducted penetratively through the primary planetary gear set (10) and through the principal planetary gear set (20), the output element of the first shifting element (A), by means of a first sun gear shaft (6) is bound to the first input element of the principal planetary gear set (20), the output element of the second shifting element (B), by means of a second sun gear shaft (7) is connected with the second input element of the principal planetary gear set (20), whereby the first sun gear shaft (6) runs between the primary and the principal planetary gear sets (10, 20) and one or more of coaxially above the input drive shaft (3) and is positioned thereon, and whereby the second sun gear shaft (7) runs between the primary and the principal planetary gear sets (10, 20) and one or more of coaxially above the first sun gear shaft (6) and is positioned upon the same.

52. The multistage transmission according to claim 50, wherein the second sun gear shaft (7), is affixed by means of a support plate (35), which one or more of securely affixed to or is constructed as a part of the transmission housing (30).

53. The multistage transmission according to claim 1, wherein the third input element of the principal planetary gear set (20), by means of a third shaft (5), is connected with an output element of the fifth shifting element (E), and the first input element of the principal planetary gear set (20), by means of a first sun gear shaft (6) is connected with an output element of the first shifting element (A), the second input element of the principal planetary gear set (20), by means of a second sun gear shaft (7) is connected with an output element of the second shifting element (B), whereby the second sun gear shaft (7) is penetratively conducted centrally through the principal planetary gear set (20), and whereby the first sun gear shaft (6) runs between the primary and the principal planetary gear sets (10, 20) coaxially above the second sun gear shaft (7), and whereby the third shaft (5) runs between the primary and the principal planetary gear sets (10, 20) and one or more of coaxially above the first sun gear shaft (6) and is positioned thereon.

54. The multistage transmission according to claim 53, wherein the third shaft (5) is affixed by means of a support plate (35), which is firmly secured to the transmission housing (30) or the plate is a part thereof.

55. The multistage transmission according to claim 53, wherein the third shifting element (C), by means of which the second input element of the principal planetary gear set (20) is fixed, is placed upon a side of the principal planetary gear set (20) which is remote from the primary planetary gear set (10) especially bordering on an outer transmission housing wall (30) which lies opposite to the transmission wall (31) and a drive motor.

56. The multistage transmission according to claim 1, wherein the principal planetary gear set (20) is designed as a Ravigneaux planetary gear set, with a small sun gear (21) serving as the first input element and a large sun gear (22) serving as the second input element, and further having coupled spiders (25, 26) as a third input element, as well as having an internal gear (27) as an output element of the principal planetary gear set (20).

57. The multistage transmission according to claim 2, wherein the internal gear (14) of the primary planetary gear set (10) is connected with an outer disk carrier (40) of the first shifting element (A) and is connected with an outer disk carrier (60) of the second shifting element (B).

58. The multistage transmission according to claim 2, wherein the internal gear (14) of the primary planetary gear set (10) is connected with an outer disk carrier (40) of the first shifting element (A) and with an inner disk carrier (52) of the second shifting element (B).

59. The multistage transmission according to claim 1, wherein the internal gear (14) of the primary planetary gear set (10) is connected with an inner disk carrier (42) of the first shifting element (A) to an outer disk carrier (60) of the second shifting element (B).

60. The multistage transmission according to claim 2, wherein the internal gear (14) of the primary planetary gear set (10) is connected with an inner disk carrier (42) of the first shifting element (A) and with an inner disk carrier (52) of the second shifting element (B).

61. The multistage transmission according to claim 1, wherein the input drive shaft (3) and the output drive shaft (4) run coaxially to one another.

62. The multistage transmission according to claim 1, wherein the input drive shaft (3) and the output drive shaft (4) run approximately axis-parallel with one another.

63. The multistage transmission according to claim 1, wherein the input rive shaft (3) and the output drive shaft (4) are approximately at right angles to one another.

64. The multistage transmission according to claim 62, wherein in the power flow between the output element of the principal planetary gear set (20) and one or the output shaft (4), a spur gear (9) and a bevel gear intervenes.

65. The multistage transmission according to claim 64, wherein the spur gear (9)/bevel gear is placed on that side of the principal planetary gear set (20) which is remote from the primary planetary gear set (10).

66. The multistage transmission according to claim 64, wherein the spur gear (9)/bevel gear is placed between the primary and the principal planetary gear sets (10, 20).

67. The multistage transmission according to claim 64, wherein the spur gear (9)/bevel gear borders directly on the principal planetary gear set (20) in an axial direction.

68. The multistage transmission according to claim 64, wherein the fifth shifting element (E) is axially placed between the spur gear (9)/bevel gear and the principal planetary gear set (20), whereby the output element of the principal planetary gear set (20) radially bypasses the fifth shifting element (E).

69. The multistage transmission according to claim 64, wherein the spur gear (9)/bevel gear, is carried by means of a support plate (35, 37) which is one of securely affixed to the transmission housing (30) or serves as a part of the transmission housing 30 and borders on the spur gear (9)/bevel gear in the axial direction, whereby the support plate (35, 37) is placed on a side of the spur gear (9)/bevel gear which is remote from the principal planetary gear set (20), and borders on a disk-like section of the output element of the second shifting element (B), which is one or more of bound to the second sun gear shaft (7), and borders on a third shifting element (C), by means of which the output element of the second shifting element (B) is fixed in position.

70. The multistage transmission according to claim 64, wherein the spur gear (9)/bevel gear, is held in position by means of a support plate (35), which is securely bound to the transmission housing (30) or is a part thereof, and borders the spur gear (9)/bevel gear in the axial direction, whereby the said support plate (35) is placed on a side of the spur gear (9)/bevel gear which is distal from the principal planetary gear set (20), while bordering on a disk-like section of the output element of the fifth shifting element (E), which is one or more of connected with the third shaft (5) and bordering on a fourth shifting element (D) by means of which the output element of the fifth shifting element (E) is fixed in its position.

71. The multistage transmission according to claim 63, wherein the spur gear (9)/bevel gear, is held in position by means of a support plate (35), which is one of securely fixed to the transmission housing (30) or is a part thereof, and borders on the spur gear (9)/bevel gear in the axial direction, whereby the support plate (35) is placed axially between the principal planetary gear set (20) and the spur gear (9)/bevel gear.

72. The multistage transmission according to claim 63, wherein the spur gear (9)/bevel gear is held in position by a support plate (35, 37), which is securely bound to the transmission housing (30) or is a part thereof and further borders on the said spur gear (9)/bevel gear in the axial direction, whereby the support plate (35, 37), is placed upon that side of the spur gear (9)/bevel gear which is remote from the principal planetary gear set (20) and forms an outer wall of the transmission housing (30).

* * * * *